(12) United States Patent
Fein et al.

(10) Patent No.: US 7,566,980 B2
(45) Date of Patent: Jul. 28, 2009

(54) SYSTEM AND METHOD FOR CREATING A GEOTHERMAL ROADWAY UTILITY WITH ALTERNATIVE ENERGY PUMPING SYSTEM

(75) Inventors: Gene S. Fein, Lenox, MA (US); Edward Merritt, Lenox, MA (US)

(73) Assignee: Genedics Clean Energy, LLC, Pittsfield, MA (US)

( * ) Notice: Subject to any disclaimer, the term of this patent is extended or adjusted under 35 U.S.C. 154(b) by 102 days.

(21) Appl. No.: 11/771,539

(22) Filed: Jun. 29, 2007

(65) Prior Publication Data

US 2008/0150296 A1 Jun. 26, 2008

Related U.S. Application Data

(63) Continuation-in-part of application No. 11/765,812, filed on Jun. 20, 2007.

(51) Int. Cl.
*F03G 7/00* (2006.01)
*F01K 7/04* (2006.01)
*F03D 9/00* (2006.01)

(52) U.S. Cl. .......................... 290/2; 60/641.8; 165/45; 290/44

(58) Field of Classification Search .................. 290/1 R, 290/1 A, 2, 4 R, 6, 43, 44, 54, 55; 60/641.8; 415/4.3; 165/45
See application file for complete search history.

(56) References Cited

U.S. PATENT DOCUMENTS 4,054,176 A * 10/1977 Van Huisen .................. 165/45
4,314,160 A 2/1982 Boodman et al.

4,315,402 A 2/1982 Sadhukhan
(Continued)

FOREIGN PATENT DOCUMENTS

WO WO 2006/121414 A 11/2006
(Continued)

OTHER PUBLICATIONS

"Aqua Genesis Ltd Geothermal Desalination, A Natural Resources Company, Welcome to Aqua Genesis," Retrieved from the Internet, <URL:http://aquagenesis.us/home.html> [retrieved on Jul. 26, 2007].

(Continued)

*Primary Examiner*—Nicholas Ponomarenko
(74) *Attorney, Agent, or Firm*—Hamilton, Brook, Smith & Reynolds, P.C.

(57) ABSTRACT

A roadway system and method for energy generation and distribution are presented. This system allows a geothermal infrastructure to be tied into the roadway system electricity grid. The geothermal infrastructure may include energy exchangers that are electrically connected to the roadway system electricity grid. By connecting the energy exchangers electrically to the roadway system electricity grid, the energy exchangers may be powered by solar and/or wind generating devices. In one embodiment of the invention, a roadway system for energy generation and distribution comprises a plurality of energy harnessing devices (e.g., solar and/or wind generating devices). The roadway system electricity grid is configured for mass distribution of electricity. The energy exchangers are configured to electrically connect to the roadway system electricity grid. Each of substantially all of the energy harnessing devices, is electrically connected to the roadway system electricity grid and positioned on part of one of the roads.

26 Claims, 41 Drawing Sheets

U.S. PATENT DOCUMENTS

| | | | |
|---|---|---|---|
| 4,321,476 A * | 3/1982 | Buels | 290/55 |
| 4,883,823 A | 11/1989 | Perry et al. | |
| 5,075,564 A | 12/1991 | Hickey | |
| 5,272,378 A * | 12/1993 | Wither | 290/1 R |
| 5,606,233 A | 2/1997 | Davis | |
| 6,246,125 B1 * | 6/2001 | Axtell | 290/1 A |
| 6,391,205 B1 | 5/2002 | McGinnis | |
| 6,409,467 B1 * | 6/2002 | Gutterman | 415/4.3 |
| 6,767,161 B1 * | 7/2004 | Calvo et al. | 404/71 |
| 6,809,432 B1 | 10/2004 | Bilgen | |
| 6,897,575 B1 | 5/2005 | Yu | |
| 6,959,993 B2 | 11/2005 | Gross et al. | |
| 6,981,377 B2 * | 1/2006 | Vaynberg et al. | 60/641.8 |
| 7,098,553 B2 * | 8/2006 | Wiegel et al. | 290/55 |
| 7,127,328 B2 | 10/2006 | Ransom | |
| 7,192,146 B2 | 3/2007 | Gross et al. | |
| 7,193,332 B2 | 3/2007 | Spinelli | |
| 7,226,536 B2 | 6/2007 | Adams | |
| 7,226,542 B2 | 6/2007 | Zemel et al. | |
| 2003/0024685 A1 * | 2/2003 | Ace | 165/45 |
| 2004/0113291 A1 | 6/2004 | Klausner et al. | |
| 2004/0159536 A1 | 8/2004 | Kamen et al. | |
| 2005/0230238 A1 | 10/2005 | Klausner et al. | |
| 2006/0242983 A1 * | 11/2006 | Spadafora et al. | 62/260 |
| 2007/0062194 A1 * | 3/2007 | Ingersoll | 60/641.1 |
| 2008/0148549 A1 | 6/2008 | Fein et al. | |
| 2008/0148732 A1 | 6/2008 | Fein et al. | |
| 2008/0148733 A1 | 6/2008 | Fein et al. | |
| 2008/0149302 A1 | 6/2008 | Fein et al. | |
| 2008/0149403 A1 | 6/2008 | Fein et al. | |
| 2008/0149573 A1 | 6/2008 | Fein et al. | |
| 2008/0150284 A1 | 6/2008 | Fein et al. | |
| 2008/0150286 A1 | 6/2008 | Fein et al. | |
| 2008/0150288 A1 | 6/2008 | Fein et al. | |
| 2008/0150289 A1 | 6/2008 | Fein et al. | |
| 2008/0150290 A1 | 6/2008 | Fein et al. | |
| 2008/0150291 A1 | 6/2008 | Fein et al. | |
| 2008/0150295 A1 | 6/2008 | Fein et al. | |
| 2008/0150298 A1 | 6/2008 | Fein et al. | |
| 2008/0152492 A1 | 6/2008 | Fein et al. | |
| 2008/0154800 A1 | 6/2008 | Fein et al. | |
| 2008/0154801 A1 | 6/2008 | Fein et al. | |
| 2008/0163919 A1 | 7/2008 | Fein et al. | |

FOREIGN PATENT DOCUMENTS

| | | |
|---|---|---|
| WO | WO 2006/138516 A | 12/2006 |
| WO | WO 2008/079369 | 7/2008 |
| WO | WO 2008/118321 A2 | 10/2008 |
| WO | WO 2008/136901 A2 | 11/2008 |

OTHER PUBLICATIONS

"Aqua Genesis Ltd, Geothermal Desalination, A Natural Resources Company," Retrieved from the Internet, <URL:http://aquagenesis.us/how.html> [retrieved on Jul. 26, 2007].

"Aqua Genesis Ltd, Geothermal Desalination, A Natural Resources Company, The Need," Retrieved from the Internet, <URL:http://aquagenesis.us/why.html> [retrieved on Jul. 26, 2007].

"Aqua Genesis Ltd, Geothermal Desalination, A Natural Resources Company, The Revolutionary Delta T Device, A Decade in Development, 6 Prototypes, 5 modifications, Tested at a major California University, Classification, The Delta T technology," Retrieved from the Internet, <URL:http://aquagenesis.us/deltat.html> [retrieved on Jul. 26, 2007].

"Aqua Genesis Ltd., Geothermal Desalination, 2007, A Natural Resources Company," Retrieved from the Internet, <URL:http://www.aquagenesis.us> [retrieved on Jul. 26, 2007].

Bourouni, K., et al., Experimentation and Modelling of an Innovative Geothermal Desalination Unit, *Desalination 125*, pp. 147-153 (Nov. 9-12, 1999).

Tzen, E., et al., "Renewable Energy Sources for Desalination," *Solar Energy 75*(5), pp. 375-379 (Nov. 1, 2003).

Garcia-Rodriguez, L., "Seawater Desalination Driven by Renewable Energies: A Review," *Desalination 143*(2), pp. 103-113 (May 20, 2002).

Kalogirou, S.A., "Seawater Desalination Using Renewable Energy Sources," *Progress in Energy and Combustion Science 31*(3), pp. 242-281 (Jan. 1, 2005).

Belessiotis, V., et al., "The History of Renewable Energies for Water Desalination," *Desalination 128*, pp. 147-159 (2000).

Awerbuch, L., et al., "Geothermal Energy Recovery Process," *Desalination 19*, pp. 325-336 (1976).

International Search Report for PCT/us2008/006034, date of mailing Oct. 24, 2008.

International Search Report for PCT/US2008/003603, date of mailing Oct. 31, 2008.

* cited by examiner

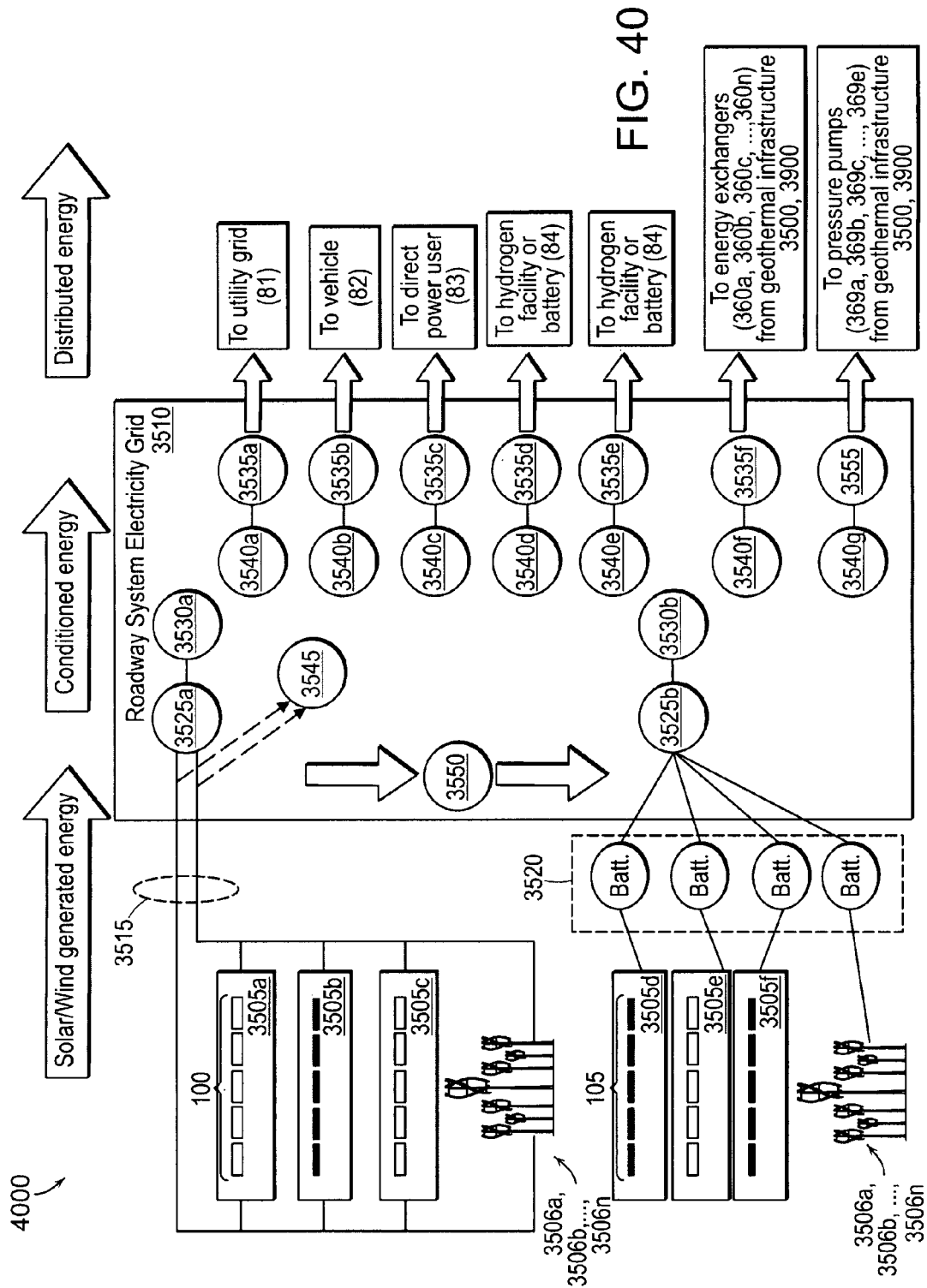

SYSTEM AND METHOD FOR CREATING A GEOTHERMAL ROADWAY UTILITY WITH ALTERNATIVE ENERGY PUMPING SYSTEM

RELATED APPLICATION

This application is a continuation in part application of U.S. application Ser. No. 11/765,812, entitled "SYSTEM AND METHOD FOR CREATING AN OPEN LOOP WITH OPTIONAL CLOSED LOOP RIPARIAN GEOTHERMAL INFRASTRUCTURE", filed on Jun. 20, 2007, which is a continuation in part application of U.S. application Ser. No. 11/747,061, entitled "SYSTEM AND METHOD FOR CREATING A CLOSED-LOOP RIPARIAN GEOTHERMAL INFRASTRUCTURE", filed on May 10, 2007, which is a continuation in part application of U.S. application Ser. No. 11/742,339, entitled "SYSTEM AND METHOD FOR CREATING A GEOTHERMAL ROADWAY UTILITY", filed on Apr. 30, 2007, which is a continuation in part application of U.S. application Ser. No. 11/645,109, entitled "SYSTEM AND METHOD FOR CREATING A NETWORKED INFRASTRUCTURE DISTRIBUTION PLATFORM OF FIXED AND MOBILE SOLAR AND WIND GATHERING DEVICES", filed on Dec. 22, 2006. The entire teachings of the above applications are incorporated herein by reference.

BACKGROUND OF THE INVENTION

It is well known that geothermal systems transfer heat or cool to homes and buildings by a heat pump, which is a mechanical device that transfers heat from one source to another. Ground-source units pull heat from the earth and transfer it to homes or buildings. Heat pumps provide both heating and cooling. The cooling process is simply the reverse of the heating process: heat is taken out of a building and returned to the Earth.

Typical ground-source heat pumps transfer heat using a network of tubes, called "closed loops." These loops are filled with either water; heating, ventilating and air conditioning (HVAC) based chemicals or an anti-freeze solution. They run through the ground in the vicinity of a building and the liquid absorbs the riparian's heat energy. Then, the warmed liquid is pumped back through the system into the building. The process provides heat to the building space (i.e. heat transfers from the warmed liquid to the building space and results in relatively cooled liquid). Once the fluid passes through the building and transfers its heat energy, it flows through the loop system back to the riparian body and the two phase process (warming of liquid and heat transfer cooling of the warm liquid) recommences.

In warm weather, these systems "reverse" into cooling mode. Technically, the system does not "run backwards." Instead, a series of valves enables the system to switch the "hot" side and the "cold" side. The heat from the building is transferred to the liquid in the loop and the resulting warmed liquid is pumped back into the ground for cooling. When the ground source heat pump is in cooling mode, it usually has an excess of warmed liquid in the system. The warmed liquid can be used to heat water for the building and eliminate the use of a hot water heater to heat water for the building.

Currently, traditional heating systems rely on combustion (the burning of fuel) either on site or at the power plant. Fuel-powered heating units, such as gas and boiler systems, burn fuel at the site to produce heat energy. Electric-powered heating and cooling systems do not require combustion at the site of the furnace; instead, the combustion occurs at power plants. In 1998, approximately 80% of the electricity in the United States was produced by burning fossil fuels. The by-products produced by combustion systems contain harmful emissions. These emissions degrade air quality and negatively impact individuals' health and contribute to environmental problems (e.g., acid rain and the greenhouse effect). For the health of individuals and communities throughout the world, it makes sense to develop heating and cooling technologies that reduce or eliminate fossil fuel combustion.

Conventional models of geothermal energy systems address homes, businesses, individual areas and municipalities on an isolated implementation basis. Schools facing sky-rocketing energy bills are searching for cost-effective alternatives. Geothermal systems represent a proven option. In addition, they utilize a renewable energy source, the Earth's naturally occurring heat energy. In Wisconsin, four school districts recently installed geothermal systems at area schools. District administrators were impressed by geothermal energy efficiency and its ability to yield long-term cost savings.

Existing conventional uses of geothermal energy systems have limitations in distribution and deployment. Each business or home owner digging his/her own underground coil, piping or closed loop system, has to pay the up front cost of work required in implementing a geothermal system. The costs may be insurmountable for many families, businesses, and municipalities. Some homes or businesses are precluded from digging the geothermal underground network system due to zoning, topographic, space or geologic factors that appear on potential geothermal system user's land sites. Moreover, the energy exchangers (e.g., heat pumps) that make up the geothermal energy system are being powered by electrical energy received from traditional power plant.

SUMMARY OF THE INVENTION

The present invention provides a solution to the problems of the prior art.

One embodiment of the present invention is a roadway system for energy generation and distribution. This system allows a geothermal infrastructure to be tied into the roadway system electricity grid. The geothermal infrastructure may include energy exchangers that are electrically connected to the roadway system electricity grid. By connecting the energy exchangers electrically to the roadway system electricity grid, the energy exchangers may be powered by solar and/or wind generating devices. In one embodiment of the invention, a roadway system for energy generation and distribution comprises a plurality of energy harnessing devices (e.g., solar and wind generating devices). The roadway system electricity grid is configured for mass distribution of electricity. The energy exchangers are configured to electrically connect to the roadway system electricity grid. Each of substantially all of the energy harnessing devices, is electrically connected to the roadway system electricity grid and positioned on part of one of the roads or near to one or more of the roads.

Another embodiment of the present invention is a method for generating and distributing geothermal energy. The method includes the step of (1) generating energy using a plurality of energy harnessing devices, along one or more roads, the plurality of energy harnessing devices forming a roadway network of harnessed energy; (2) distributing the generated energy using a roadway system electricity grid, wherein each of substantially all of the energy harnessing devices is electrically connected to the roadway system electricity grid and positioned on part of one of the roads or near to the one or more roads; and (3) connecting electrically a plurality of energy exchangers to the roadway system electricity grid.

BRIEF DESCRIPTION OF THE DRAWINGS

The foregoing and other objects, features and advantages of the present invention will be apparent from the following more particular description of preferred embodiments of the invention, as illustrated in the accompanying drawings in which like reference characters refer to the same parts throughout the different views.

FIG. 40 is an exemplary block diagram of a roadway system tied in with the geothermal energy infrastructure.

DETAILED DESCRIPTION OF THE INVENTION

Figure 1:
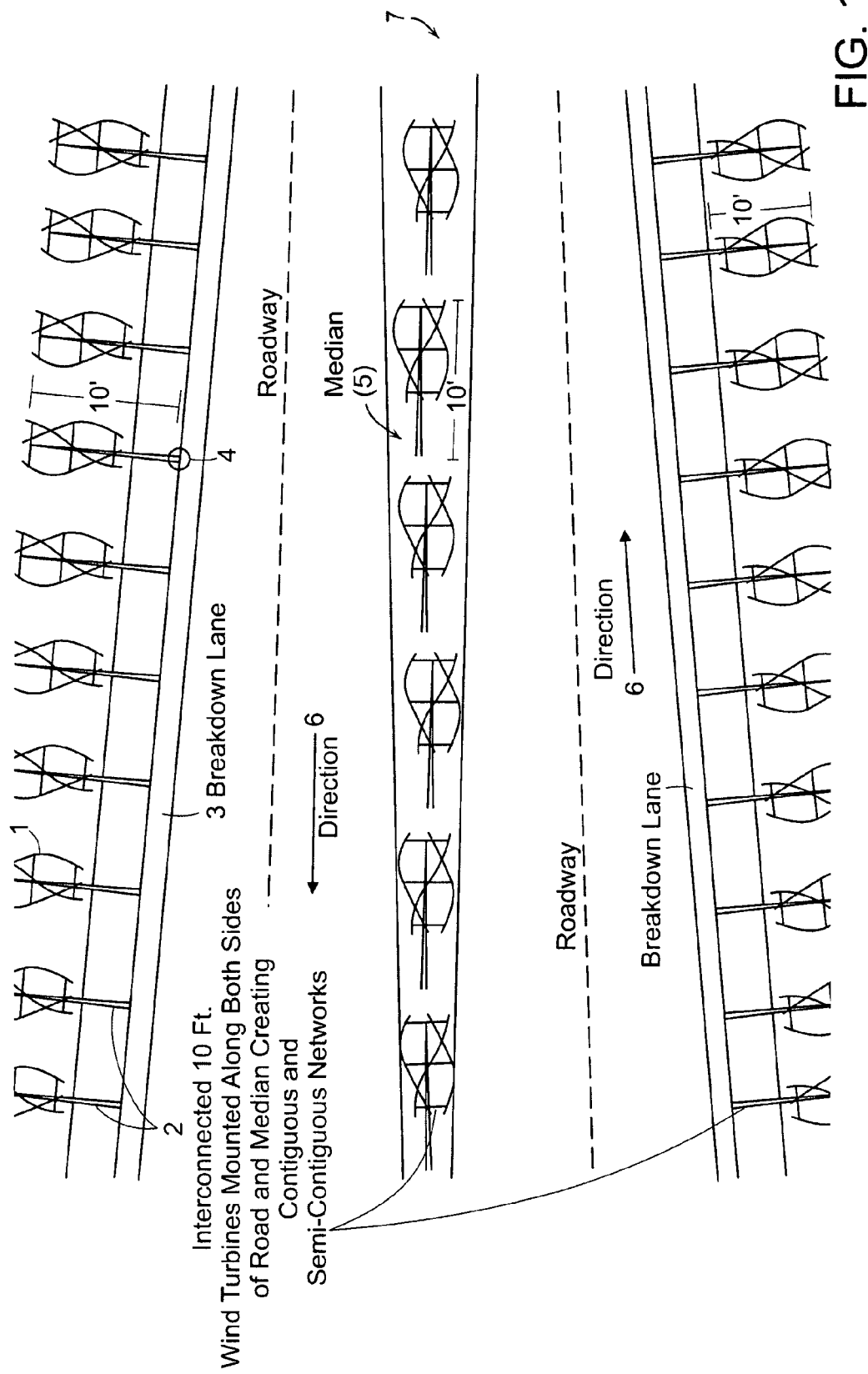
FIG. 1 illustrates the implementation of the small, fixed wind turbine arrays along the roadway by the present invention.

The present invention provides a roadway system that can provide the basis for a national or global clean or renewable energy infrastructure. A geothermal heating and cooling system can be implemented along short or long stretches of riparian body for the purposes of creating power to meet both small and large power demands. The power generated by the geothermal system can be used to power both heating and cooling of homes, businesses or systems without connecting to existing grid systems.

A "road" (hereinafter also "roadway") as used herein, is an identifiable route or path between two or more places on which vehicles can drive or otherwise use to move from one place to another. A road is typically smoothed, paved, or otherwise prepared to allow easy travel by the vehicles. Also, typically, a road may include one or more lanes, one or more breakdown lanes, one or more medians or center dividers, and one or more guardrails. For example, a road may be: a highway; turnpike; pike; toll road; state highway; freeway; clearway; expressway; parkway; causeway; throughway; interstate; speedway; autobahn; superhighway; street; track for railroad, monorail, magnetic levitation trains; track for subterranean, ground level, and elevated forms of public transit or mass transit; car race track; airplane runway; and the like.

A "vehicle" as used herein, is any device that is used at least partly for ground-based transportation, for example, of goods and/or humans. For example, a vehicle may be an automobile, a car, a bus, a truck, a tractor, a tank, a motorcycle, a train, an airplane or the like.

Preferably, a vehicle can be an automobile, a car, a bus, a truck, a tank, and a motorcycle. More preferably, a vehicle can be an automobile, a car, a bus, and a truck. Most preferably, a vehicle can be an automobile and a car.

"Wind" as used herein refers to both, wind created by the movement of vehicles (hereinafter also "dirty wind") and atmospheric wind.

A "wind energy generating device" as used herein, is a device that converts wind energy into electrical energy. Typically, a wind energy generating device can include one or more "wind turbine generators." A "wind turbine generator" (hereinafter also "wind turbine") as referred to herein, is a device that includes a turbine and a generator, wherein the turbine gathers or captures wind by conversion of some of the wind energy into rotational energy of the turbine, and the generator generates electrical energy from the rotational energy of the turbine. These wind turbine generators can employ a turbine rotating around an axis oriented in any direction. For example, in a "horizontal axis turbine," the turbine rotates around a horizontal axis, which is oriented, typically, more or less parallel to the ground. Furthermore, in a "vertical axis turbine," the turbine rotates around a vertical axis, which is oriented, typically, more or less perpendicular to the ground. For example, a vertical axis turbine can be a Darrieus wind turbine, a Giromill-type Darrieus wind turbine, a Savonius wind turbine, a "helix-style turbine" and the like. In a "helix style turbine," the turbine is helically shaped and rotates around a vertical axis. A Helix-style turbine can have a single-helix design or multi-helix design, for example, double-helix, triple-helix or quad-helix design. The "height" of a wind energy generating device or wind turbine generator as used herein, is the height measured perpendicularly from the ground adjacent to the device or generator to the highest point of the device or generator. Wind energy generating devices can have a height between about a few micrometers and several hundred feet. Wind energy generating devices that employ a plurality, for example, up to millions of small wind turbine generators in one device unit are also referred to herein as "wind turbine installation sheets", "wind turbine installation placards." Wind energy generation devices can be spatially positioned in any pattern or distribution that conforms to safety and other regulations. Generally the distribution can be optimized in view of the given road and road environment. For example, they can be positioned in a linear equidistant distribution, a linear non-equidistant distribution and a stratum configuration. Wind energy generating devices can optionally include solar energy generating devices as described below.

A "stratum configuration" as used herein, is a distribution of wind energy generation devices, in which wind energy generation devices that are further away from the nearest lane of a road, are higher. For example, a stratum configuration of wind energy generation devices results from positioning the smallest wind energy generation devices nearest to a road and successively larger wind energy generation devices successively further from the road.

Typically, the average distance between any two closest ground-based wind energy generating devices is in the range between about 5 micrometer and about 200 meters.

Wind energy generating devices can be "vehicle-based," that is, they are affixed to any part of the surface of a vehicle that allows normal and safe operation of the vehicle. Vehicle-based wind energy generating devices can be permanently affixed or mounted to the car, for example, during the vehicle manufacturing process or overlay bracing, or they can be removable affixed using, for example, one or a combination of snap on clips, adhesive magnetic bonding, a locking screw mounting system, Thule-type locking and the like. A vehicle and a vehicle-based wind energy generating device can also include directional spoilers or wings that are positioned to thereby decrease air resistance of a moving vehicle and increase wind energy generation. A vehicle and a vehicle-based wind energy generating device can also include a device for measuring the direction of the atmospheric wind at or near the positions of one or more vehicle-based wind energy generating devices and movable directional spoilers or wings that are moved based on the measured wind direction information to thereby decrease air resistance of a moving vehicle and increase wind energy generation. Vehicle-based wind energy generating devices can generate energy while a vehicle is parked or moving. Typically, vehicle-based wind energy generating devices have a height of between about a few micrometers and about a few feet.

Any wind energy generating device that is not affixed to a vehicle or a non-stationary (portable, moveable) host or carrier is hereinafter referred to as "ground-based." Typically, a ground-based wind energy generating device can be positioned on part of a road on which its presence does not hinder the flow of traffic or pose a safety risk, near to a road, and on any road object on or near to a road. Examples of road objects are traffic signs, for example, traffic lights, guardrails, buildings and the like. Ground-based wind energy generating devices can be permanently affixed or mounted into the ground multiples of feet deep and sometimes set into a foundation, or they can be affixed such that they are easily removed using, for example, one or a combination of snap on clips, adhesive magnetic bonding, a locking screw mounting system, magnets, braces and ties to metal structures, Thule-type locking and the like.

The phrase "near" a road as used herein, refers to the distance of a given ground-based wind energy generating device from a given road that allows the ground-based wind energy generating device to capture wind from passing vehicles (hereinafter also "dirty wind") to generate energy. This distance can be determined in view of the height of the turbine and the average velocity of an average vehicle passing the wind energy generating device. Typically, this distance can be up to about 40 feet. For example, for a helical axis turbine of 10 feet height, positioned along a road on which vehicle travel with an average velocity of 55 miles per hour, the distance can be up to about 20 feet and for one of 5 feet height, the distance can be up to about 25 feet.

A "wind turbine array" as used herein is a plurality of wind energy generating devices.

A "roadway system electricity grid" as used herein, refers to any network of electrical connections that allows electrical energy to be transported or transmitted. Typically, a roadway system electricity grid can include energy storage systems, systems for inverting energy, single power source changing units, electricity meters and backup power systems.

An "utility grid" (hereinafter also "grid") as used herein, refers to the existing electrical lines and power boxes, such as Edison and NStar systems.

A "direct power load" is any system, that is directly electrically connected to the roadway system electricity grid, that is, without electrical energy being transmitted via a utility grid, and has a demand for electrical energy, for examples, any business or home.

An "energy storage system" as used herein is any device that can store electrical energy. Typically, these systems transform the electrical energy that is to be stored in some other form of energy, for example, chemical and thermal. For example, an energy storage system can be a system that stores hydrogen, which for example, is obtained via hydrogen conversion electrolysis. It can also be any rechargeable battery. "Ground-based energy storage systems" can be positioned below or above the ground. "Vehicle-based energy storage systems" can be permanently affixed or mounted in or on the car, for example, during the vehicle manufacturing process, or they can be removable affixed using, for example, one or a combination of snap on clips, adhesive magnetic bonding, a locking screw mounting system, Thule-type locking and the like.

The phrase "connected to the roadway system electricity grid" as used herein, refers to any direct or indirect electrical connection of a solar or wind energy generating device to the roadway system electricity grid that allows energy to be transferred from the energy generating device to the grid.

A "solar energy generating device" as used herein, is any device that converts solar energy into electricity. For example, a solar energy generating device can be a single solar or photovoltaic cell, a plurality of interconnected solar cells, that is, a "photovoltaic module", or a linked collection of photovoltaic modules, that is, a "photovoltaic array" or "solar panel." A "solar or photovoltaic cell" (hereinafter also "photovoltaic material") as used herein, is a device or a bank of devices that use the photovoltaic effect to generate electricity directly from sunlight. For example, a solar or photovoltaic cell can be a silicon wafer solar cell, a thin-film solar cell employing materials such as amorphous silicon, poly-crystalline silicon, micro-crystalline silicon, cadmium telluride, or copper indium selenide/sulfide, photoelectrochemical cells, nanocrystal solar cells and polymer or plastic solar cells. Plastic solar cells are known in the art to be paintable, sprayable or printable roll-to-roll like newspapers.

A "solar energy generating device" can be ground-based or vehicle based. A vehicle-based solar energy generating device can be permanently affixed or mounted to the car, for example, during the vehicle manufacturing process or overlay bracing, or they can be removable affixed using, for example, one or a combination of snap on clips, adhesive magnetic bonding, a locking screw mounting system, Thule-type locking and the like.

A ground-based solar energy generating device can be attached to any surface that allows collection of solar energy and where its installation does not pose a safety risk or is not permitted by regulations. For example, it can be positioned on part of a road on which its presence does not hinder the flow of traffic or pose a safety risk, near to a road, and on any road object on or near to a road. Examples of road objects are traffic signs, for example, traffic lights, guardrails, buildings and the like. Ground-based wind energy generating devices can be permanently affixed or mounted into the ground multiples of feet deep and sometimes set into a foundation, or they can be affixed such that they are easily removed using, for example, one or a combination of snap on clips, adhesive magnetic bonding, a locking screw mounting system, magnets, braces and ties to metal structures, Thule-type locking and the like.

A "heat exchanger" as used herein, is a device designed to transfer heat between two physically separated fluids or mediums of different temperatures.

A "geothermal heat pump" as used herein, is a heat pump that uses the earth, lakes, oceans, aquifers, ponds, or rivers as a heat source and heat sink.

A "condenser" as used herein, is a heat exchanger in which hot, pressurized (gaseous) refrigerant is condensed by transferring heat to cooler surrounding air, water or earth.

A "compressor" as used herein, is the central part of a heat pump system. The compressor increases the pressure and temperature of the refrigerant and simultaneously reduces its volume while causing the refrigerant to move through the system.

A "riparian body" as used herein, is relating to the ocean, rivers, lakes, streams, ponds, aquifers, sea, salt water body, fresh water body or any combination thereof.

A description of example embodiments of the invention follows.

The present invention, in accordance with one embodiment relates to the creation of a geothermal heating and cooling system where the geothermal heating and cooling system is implemented along short or long stretches of the riparian body, such as ocean, rivers, lakes, streams, ponds, aquifers, or any combination thereof for the purposes of creating power to meet both small and large power demands of varying degrees. The power generated by the geothermal system may be used to provide heating and cooling of homes, businesses or municipalities without connecting to existing grid systems. This system may fill the need for the average home, business, and municipality to tie into an existing geothermal "grid" constructed along, adjacent to or underneath a nearby riparian body. By so doing, the user needs not invest a large sum in the geothermal infrastructure necessary outside the home to enable a geothermal system inside the home. The user instead is only responsible for creating the interior portion of the geothermal system infrastructure of the geothermal heating and cooling system. The costly exterior of the system is provided by the closed loop riparian geothermal infrastructure.

In a closed loop geothermal system, a fluid is circulated through a continuous buried pipe. In contrast, in an open loop, a fluid is drawn from one end of a pipe, passes through a heat exchanger, and is discharged to a second end of the pipe at a distance from the first end. An advantage of an open loop system with the capability of being in a closed loop position is that the system can continue to operate independent of the condition of a riparian body. In the open loop position, fluid may be drawn from the riparian body. During the winter, for example, the riparian body may be frozen due to the cold temperature. In this situation, the open loop system can be in a closed position for the fluid to circulate through a continuous pipe. Thus the system can continue to operate because fluid will not be drawn from the frozen riparian body. It would be useful to have a geothermal system that not only can have the flexibility of being in a closed and open position, but such a system as discussed above, may relieve the user from investing a large sum of money in the geothermal infrastructure necessary outside the home to enable a geothermal system inside the home.

FIG. 1 illustrates part of a roadway system implementation that contains fixed wind turbine arrays along a roadway. These ten foot double helix type wind turbine generators (Item 1) are positioned in a linear-equidistant distribution, any consecutive pair of wind turbine generators about fifteen feet apart (Item 2) along a continuous row at the edge of breakdown lanes (Item 3), or within medians (Item 5) or center dividers of a roadway (Item 5). The wind turbine generators are either mounted into the ground multiples of feet deep and sometimes set into a foundation, or secured via magnets, braces and ties to metal structures (Item 4). Helix type wind turbine generators are not dependent on single direction wind, which is good because wind created from passing vehicles comes in uneven and multiple directions or even cross directions (Item 6) at the median point of the roadway, and helix type wind turbine generators, in particular, of the double-helix type are suited to work well in these conditions. Double helix wind turbine generators are also relatively noiseless in operation which allows using these turbines very close to humans. These double helix type wind turbine generators are linked together in an energy gathering chain with one or more turbines feeding a single or array of batteries appropriate to the power generation of the individual and groupings of turbines. There can be many, for examples, thousands of battery arrays along a single roadway implementation (Item 7).

The electrical energy of a ground-based energy storage system stores energy generated, for example, from one or more of the wind energy generating devices. The energy storage system may be, for example, a battery or battery array. This stored electrical energy can be fed to an inverter and then passed through a power meter as the power generated, for example, by the wind turbine generators is either delivered into a utility grid system, directly distributed to a home or business, or stored for later use. The later uses may be, for example, at peak energy demand times, by either larger battery arrays, or via the use of the wind energy to convert to hydrogen and then conversion of the hydrogen back to energy using a hydrogen fuel cell technology for vehicles or grid power usage (See FIG. 5).

Figure 2:
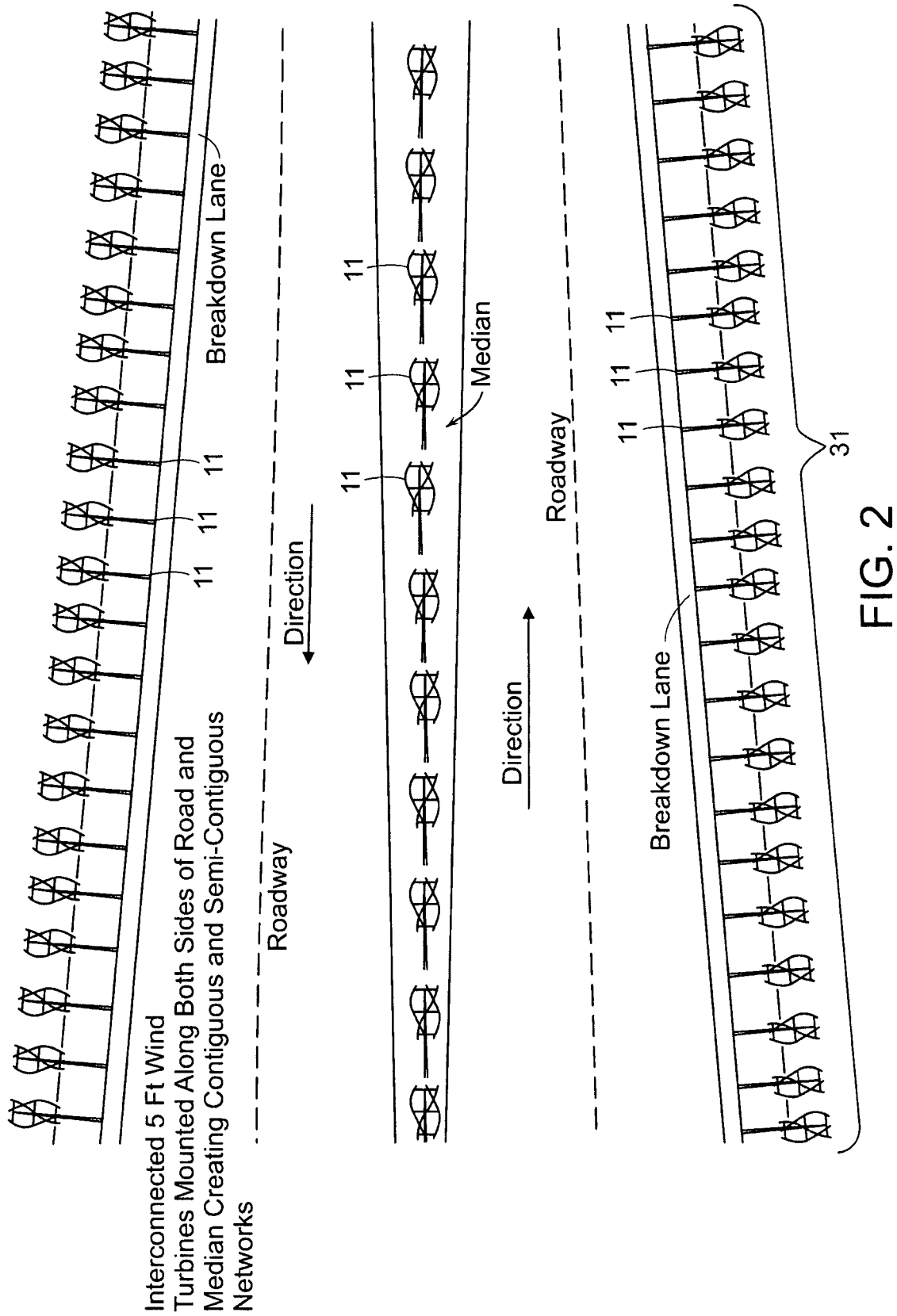
FIG. 2 illustrates the use of 5 foot high turbines by the present invention.

FIG. 2 illustrates part of a roadway system implementation that contains fixed wind turbine arrays along a roadway. Here, the use of five foot double helix type wind turbine generators (Item 11) is shown. Typically, these five foot double helix type wind turbine generators can generate less energy than the ten foot double helix type wind turbine generators, but because they are smaller, they only need to be 5 to 7 feet apart or less. Accordingly, they can be used at higher density along roadways. Because the ten foot variety is higher up, the five foot variety may be installed within the ten foot variety installation and both turbines may work along the same roadway virtually side by side creating a layered effect. Generally, this layered distribution in which different sized turbines function at their own height can be used with wind turbine generators having heights from about 25 feet down to about a few micrometers. The established concept of using battery arrays, inverters and meters and distributing the power to the grid, direct distribution or reserve storage remains in force for all sizes of turbines. The turbines may be deployed in a total contiguous manner (Item 31) or in a semi-contiguous manner based upon roadway wind conditions, roadway design constraints, access to utility grid, access to power storage and access to direct distribution sources (See FIG. 5).

Figure 3:
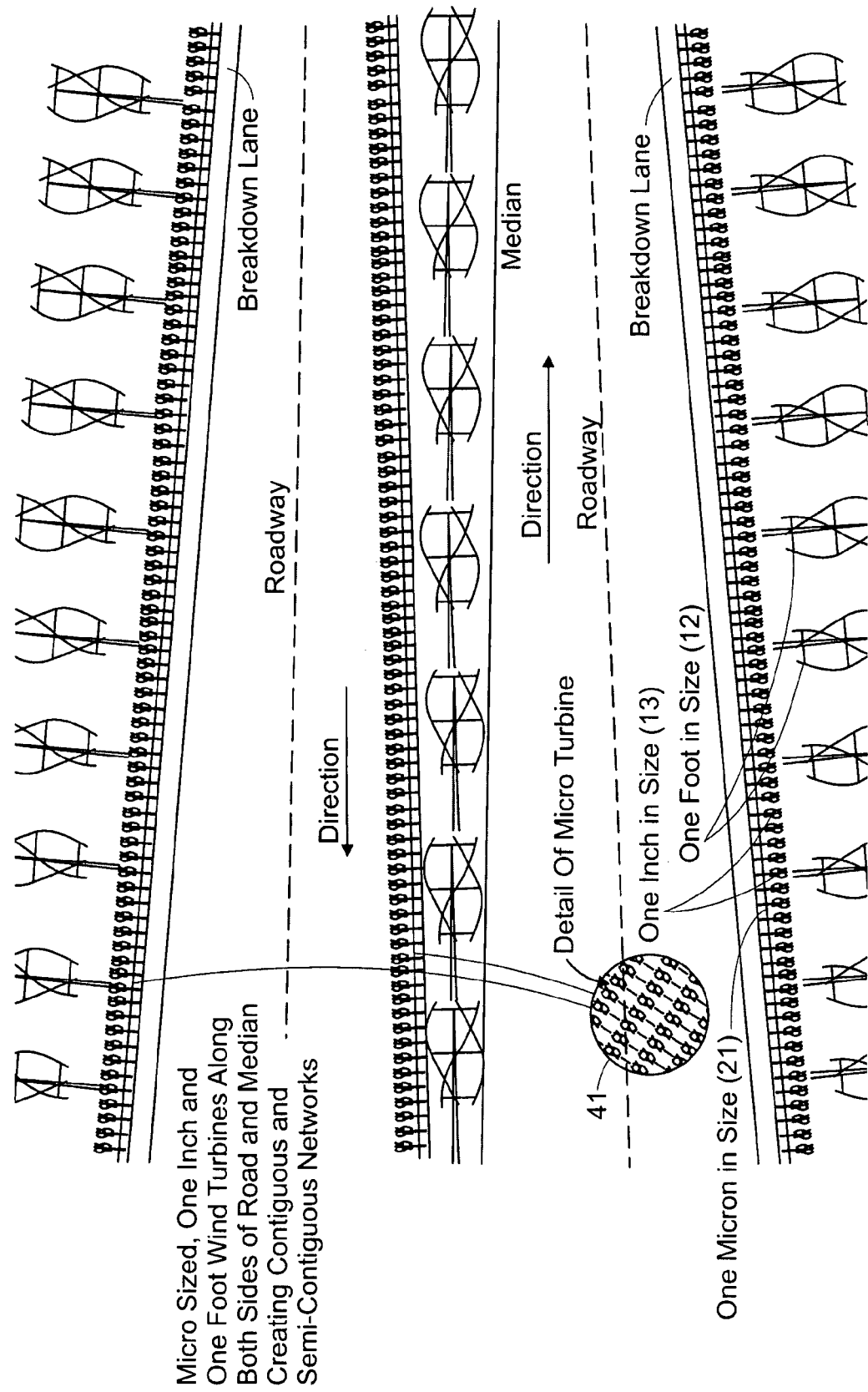
FIG. 3 illustrates the contiguous deployment of one foot long and tiny one micron to multiple micron height wind turbines by the present invention.

FIG. 3 illustrates the contiguous deployment of one foot double helix type wind turbine generators (Item 12), one inch double helix type wind turbine generators (Item 13) and one micrometer to multiple micrometer high double helix type wind turbine generators (Item 21). Smaller wind turbine generators allow a larger number of wind turbine generators to be deployed within a given area than large wind turbine generators. Foot long turbines (Item 1) may be deployed only 1.5 or less feet apart depending on the terrain and angles of deployment relative to each turbine in the contiguous or semi-contiguous installation, while micron length turbines can be deployed in the millions over a square foot (Item 41).

Figure 4:
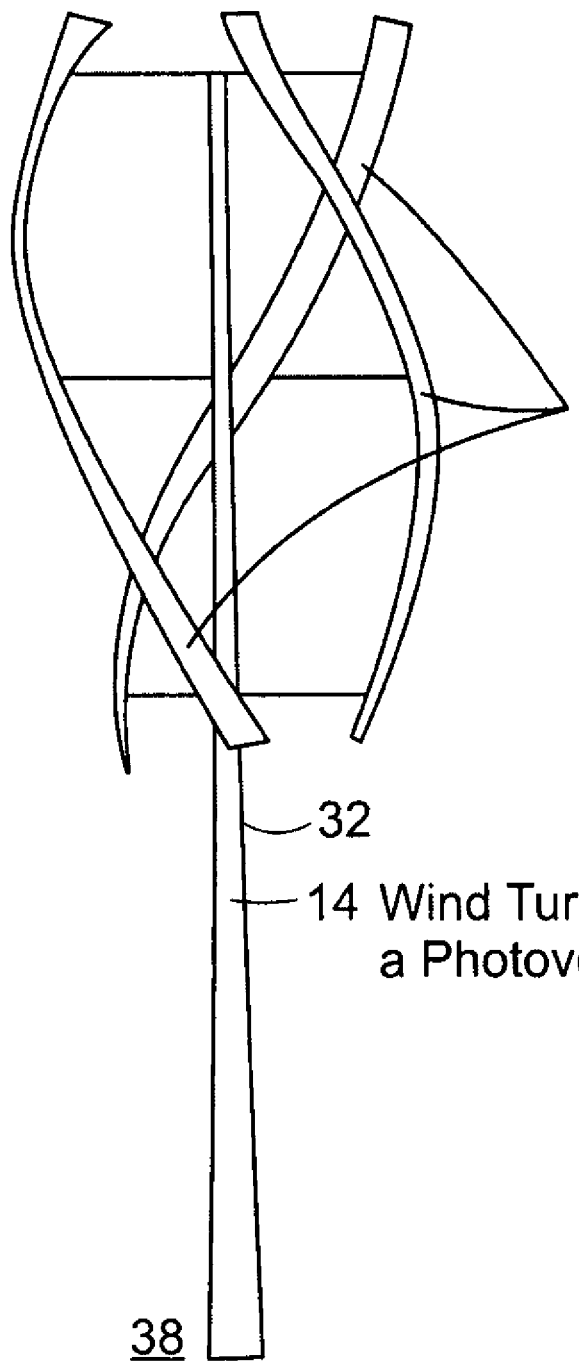
FIG. 4 illustrates the use of wind turbines that may be covered in solar gathering materials such as thin films that may be molded to parts of the turbine by the present invention.

FIG. 4 illustrates a helix type wind turbine generator (Item 14) that may be covered in solar gathering photovoltaic materials such as silicon thin films that may be molded to parts (Item 22) of the wind turbine generator that do not interfere with the wind turbine generator's fundamental operation. These parts are generally indicated by Item 22. The solar energy that is gathered is then fed to a central rod (Item 32) and carried down to the base (Item 38) of the wind turbine generator where the gathered solar energy can then be channeled via wiring typical to the industry into a ground-based energy storage system (for example, a battery pack or battery array deployment).

Figure 5:
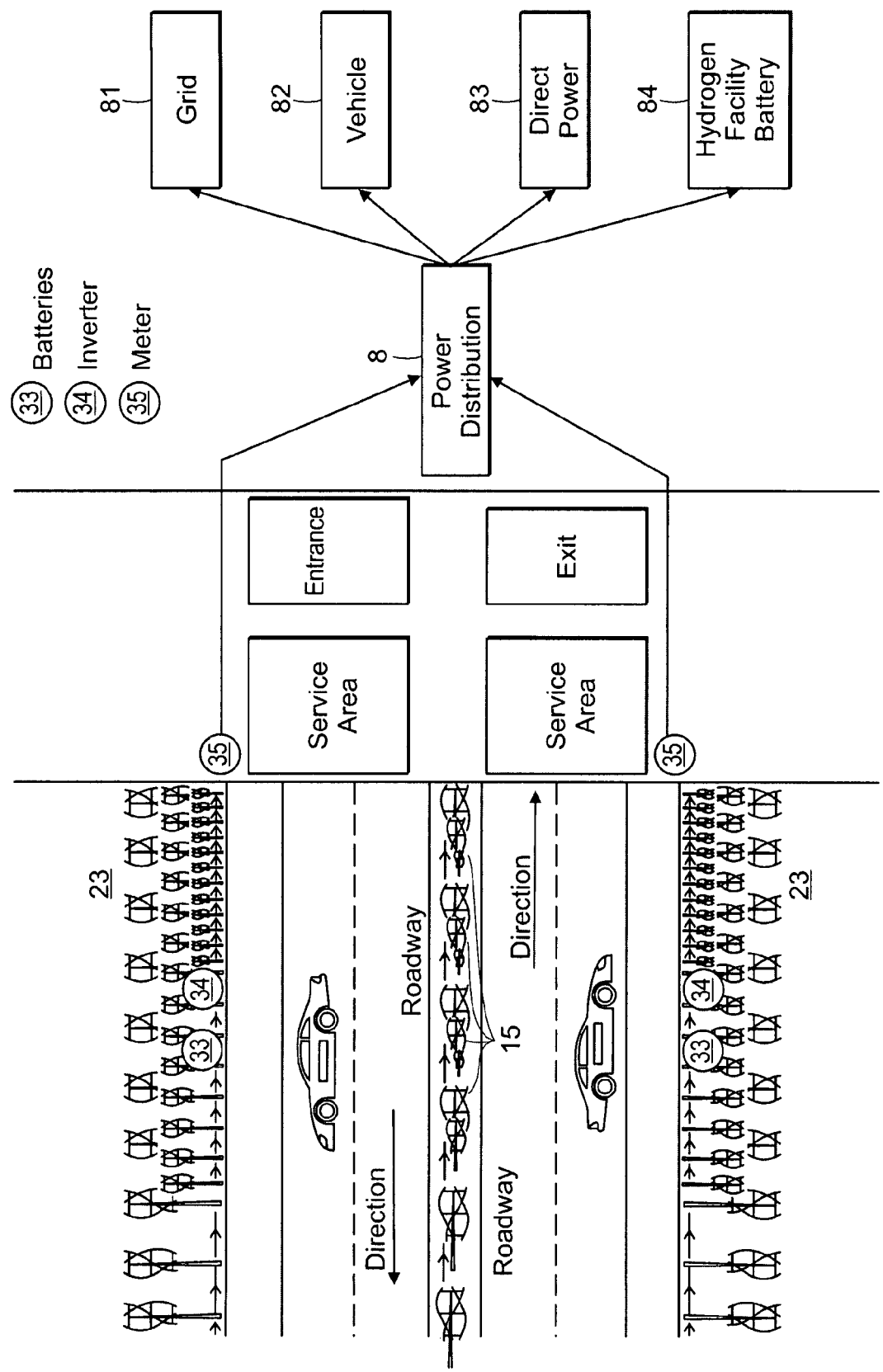
FIG. 5 illustrates the helix-designed wind turbines implemented in a stratum layered design along the median and breakdown lanes of a roadway by the present invention.

FIG. 5 illustrates helix type wind turbine generators implemented in stratum layered design along the median (Item 15) and breakdown lanes of a roadway (Item 23). Power generated from the wind turbine generators is passed to battery arrays (Item 33), then inverters (Item 34) and registered through meters (Item 35) before being distributed (Item 8) to the utility grid (Item 81), direct power of homes or businesses (Item 83), powering of vehicles (Item 82) or stored in auxiliary battery arrays or to a hydrogen facility (Item 84). The hydrogen facility (Item 84) can use the power to form hydrogen employing an electrolysis process, store the hydrogen, and release the energy stored in the hydrogen, that is, convert the hydrogen to produce power. The hydrogen facility could produce power from the stored hydrogen, for example, in times of an emergency or at peak demand times.

Figure 6:
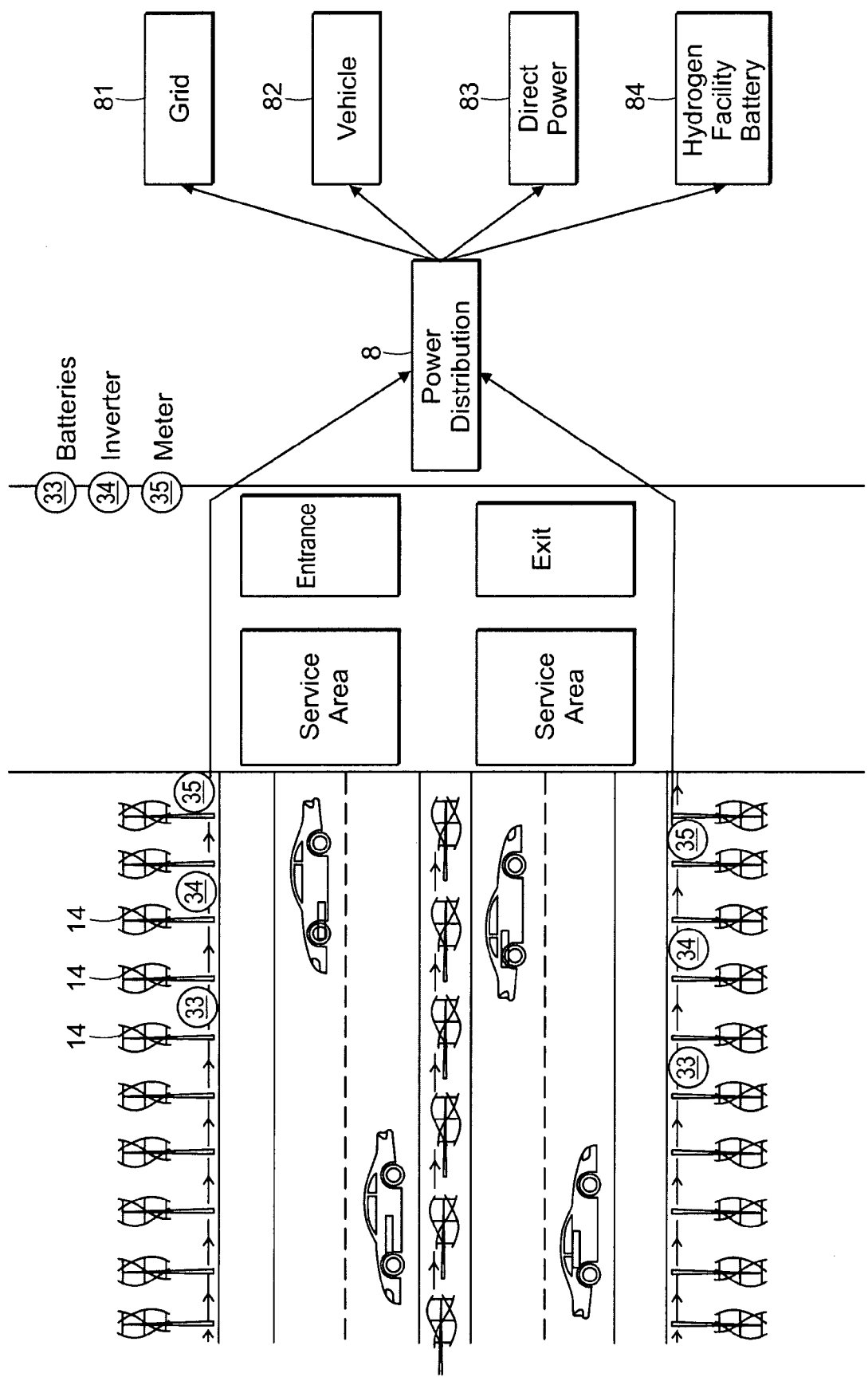
FIG. 6 illustrates the helix wind turbine power generation installed on roadways in a single uniform height by the present invention.

FIG. 6 illustrates helix type wind turbine generators (Item 14) implemented as a single uniform height turbine system delivering power into battery arrays (Item 33) which then pass the power to inverters (Item 34). Power at the output of inverters (Item 34) is registered in power meters (Item 35) and then distributed (Item 8) to the utility grid (Item 81), direct distribution (Item 83), auxiliary power storage (Item 84) or vehicle usage (Item 82).

Figure 7:
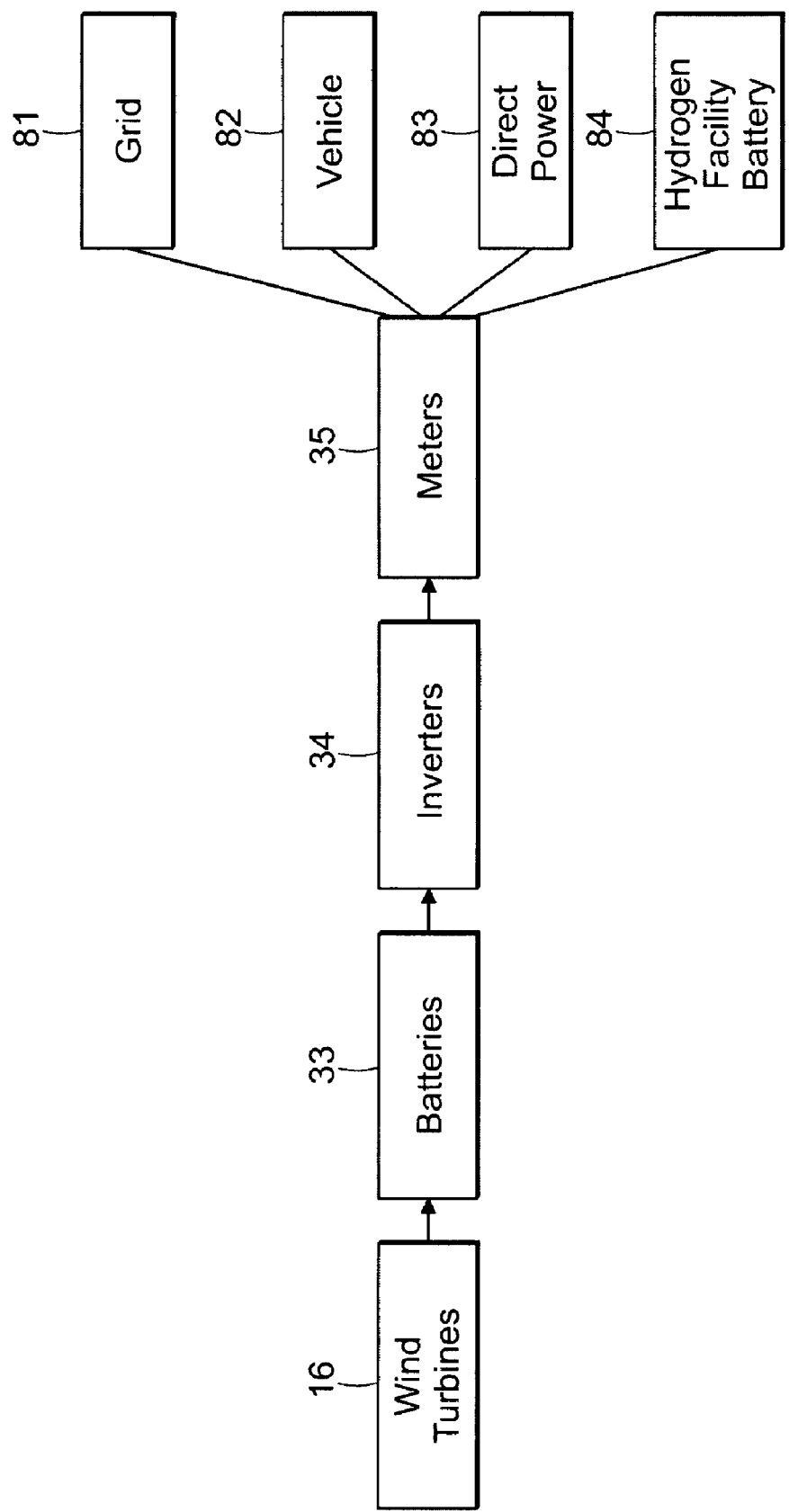
FIG. 7 illustrates a flow chart for how the wind energy generation by the helix designed turbines flows through the system by the present invention.

FIG. 7 illustrates schematically the flow of electrical energy or power generated by wind energy generating devices, for example, wind turbine generators (herein also "wind turbines") (Item 16) through a roadway system. The wind turbines generate energy (Item 16) which is passed via connected wiring to one or more ground-based energy storage systems, for example, battery arrays (Item 33). The energy is then passed from the battery in DC form to one or more inverters (Item 34) which change the electricity to AC form and conditions the electricity to the specifications needed by the distribution point. At a distribution point, the electricity is run through a meter (Item 35) then distributed to the utility grid (Item 81), one or more vehicles (Item 82), a direct distribution point such as a home or business (Item 83), and/or fueling of an electric or hydrogen electrolysis machine or further storage via hydrogen conversion electrolysis or auxiliary battery array storage (Item 84).

Figure 8:
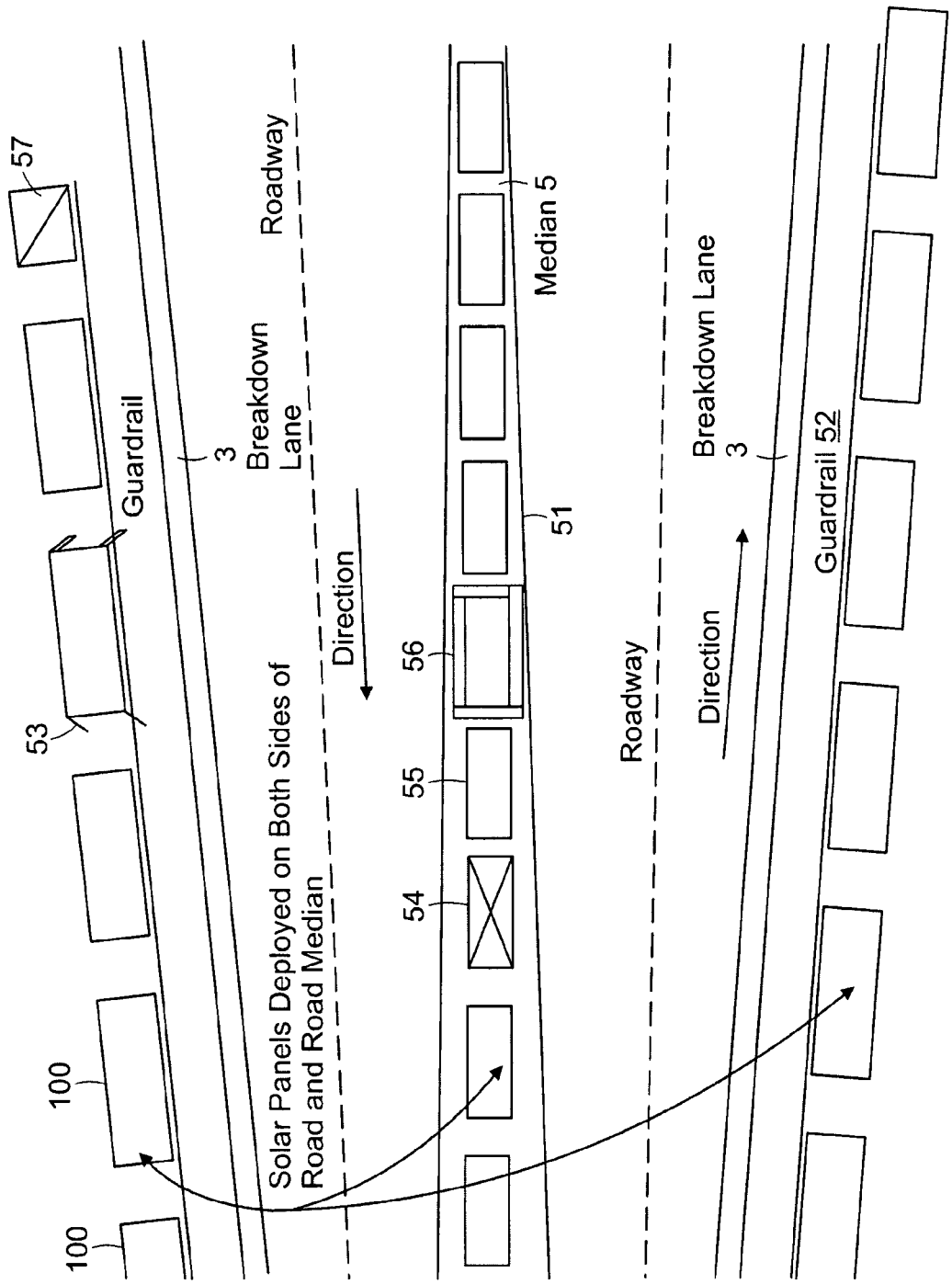
FIG. 8 illustrates solar panels positioned as contiguous strips of solar backed films deployed along the sides and the median of a roadway by the present invention.

FIG. 8 illustrates solar panels, which may also be contiguous strips of solar backed films (Item 100) deployed along the sides (Item 3) and the median (Item 5) of a roadway. Solar films may be easier to implement because they can be cut to fit and they can be printed out in miles of consecutive film during the manufacturing process. Some new films are also not using silicon and are using nanotechnology to create new kinds of solar films such as those developed by Nanosolar (nanosolar.com). The ability to manufacture miles of film or to cut smaller pieces in a variety of lengths and widths are preferable in view of road breaks, replacements, maintenance and physical and governmental building restrictions that are factors in individual roadway implementations. Panels or backed films may be mounted to median guardrails (Item 51) or roadside guardrails (Item 52) or may be erected upon rails or beam supporting devices that have been secured into the ground via depth or piling techniques (Item 53). Displays of the panels or films may include custom formation around objects, pyramid configurations (Item 54), facing flat towards the sky (Item 55), mirrored sides (Item 56), or electronic tilts (Item 57) built to maximize the solar gathering materials access to direct contact with the sun's rays.

Figure 9:
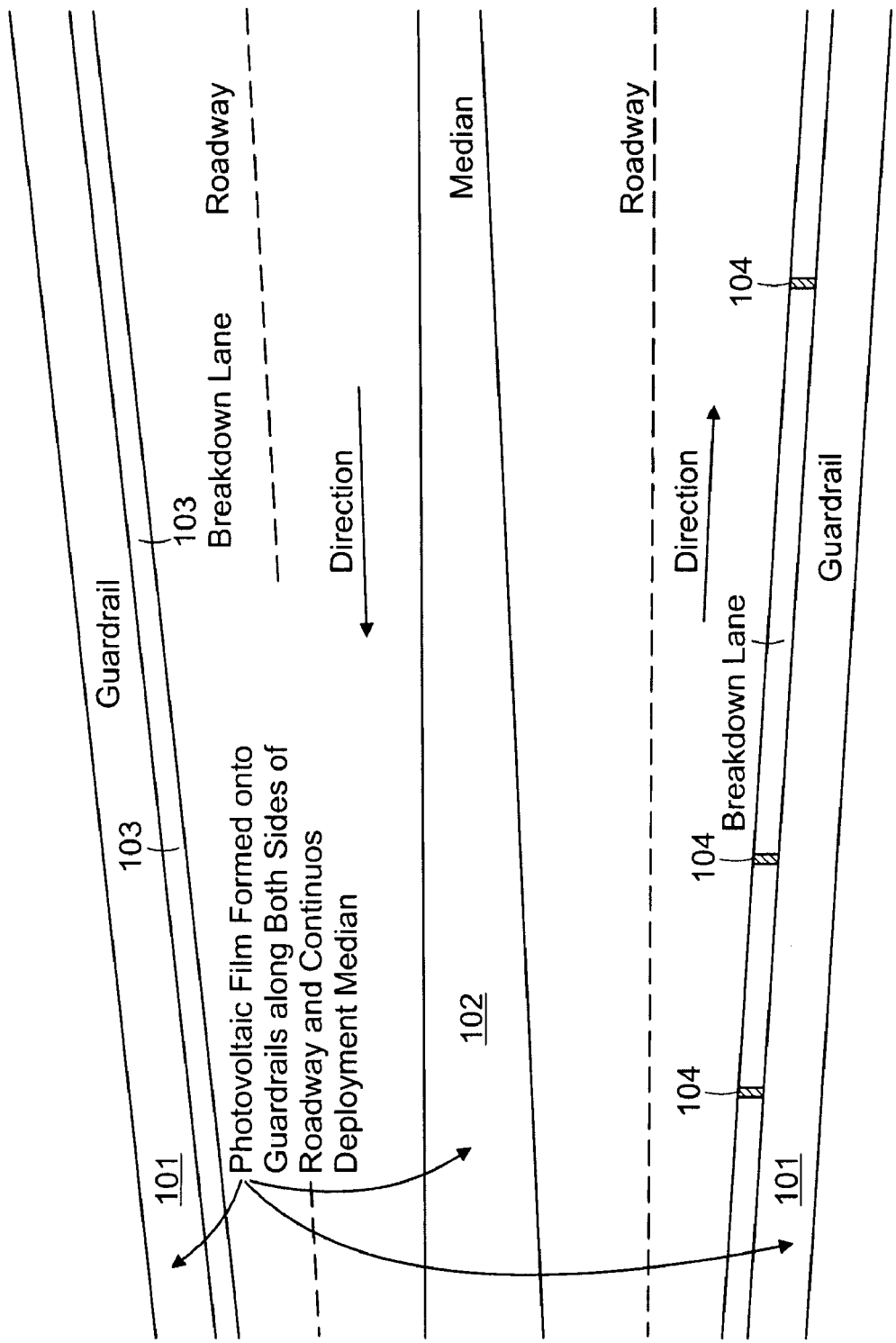
FIG. 9 illustrates solar film molded at the installation site to specific areas of installation to provide a cohesive and continuous or semi-continuous implementation by the present invention.

FIG. 9 illustrates how solar film can be molded at the installation site to specific areas of installation to provide a cohesive (Items 101, 102, and 103) and continuous (Item 101) or semi-continuous implementation of solar gathering material (Item 104) along a roadway on existing structures of uniform and non-uniform shapes such as guardrails on the side and median of roadways.

Figure 10:
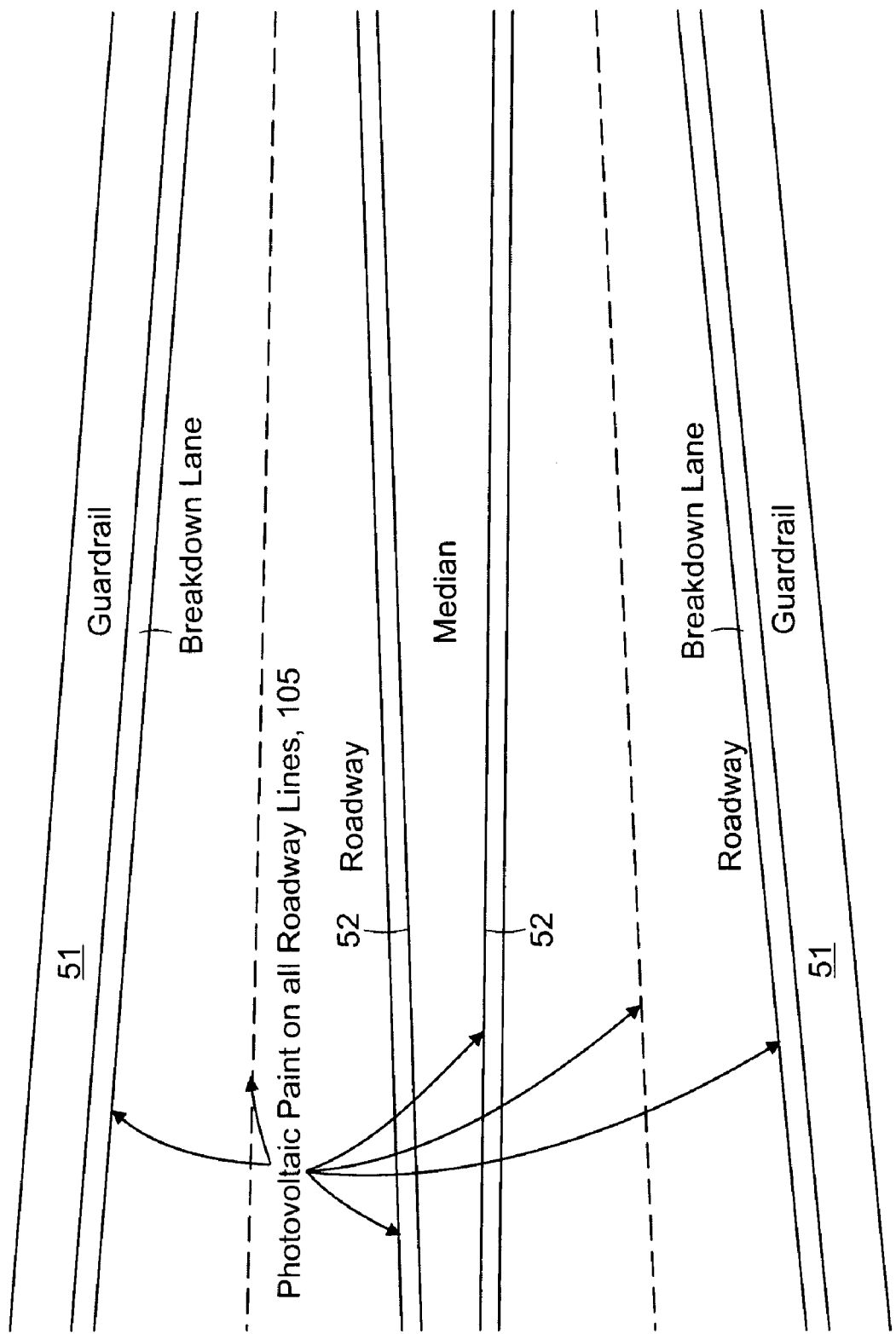
FIG. 10 illustrates the use of spray on solar power cells, herein referred to as solar voltaic paint which may be sprayed onto the roadway system by the present invention.

FIG. 10 illustrates the use of spray on solar power cells, herein referred to as solar voltaic paint which may be sprayed onto the roadway itself as lane markers (Item 105) or onto guardrails (Items 51 and 52) to collect both solar energy and infrared heat. This is accomplished using a spray on solar power cell material that utilizes nanotechnology to mix quantum dots with a polymer to create an energy gathering material that may be five times more efficient than current solar cell technology. The sprayed on materials have a conductive infrastructure underneath (substrate) similar to solar films and panels with efficiently planned depot points. This substrate receives the energy gathered by the sprayed on materials and transfers the gathered energy to battery arrays and inverters and then to energy distribution points such as the utility grid, direct distribution or auxiliary storage (See FIG. 5).

Figure 11:
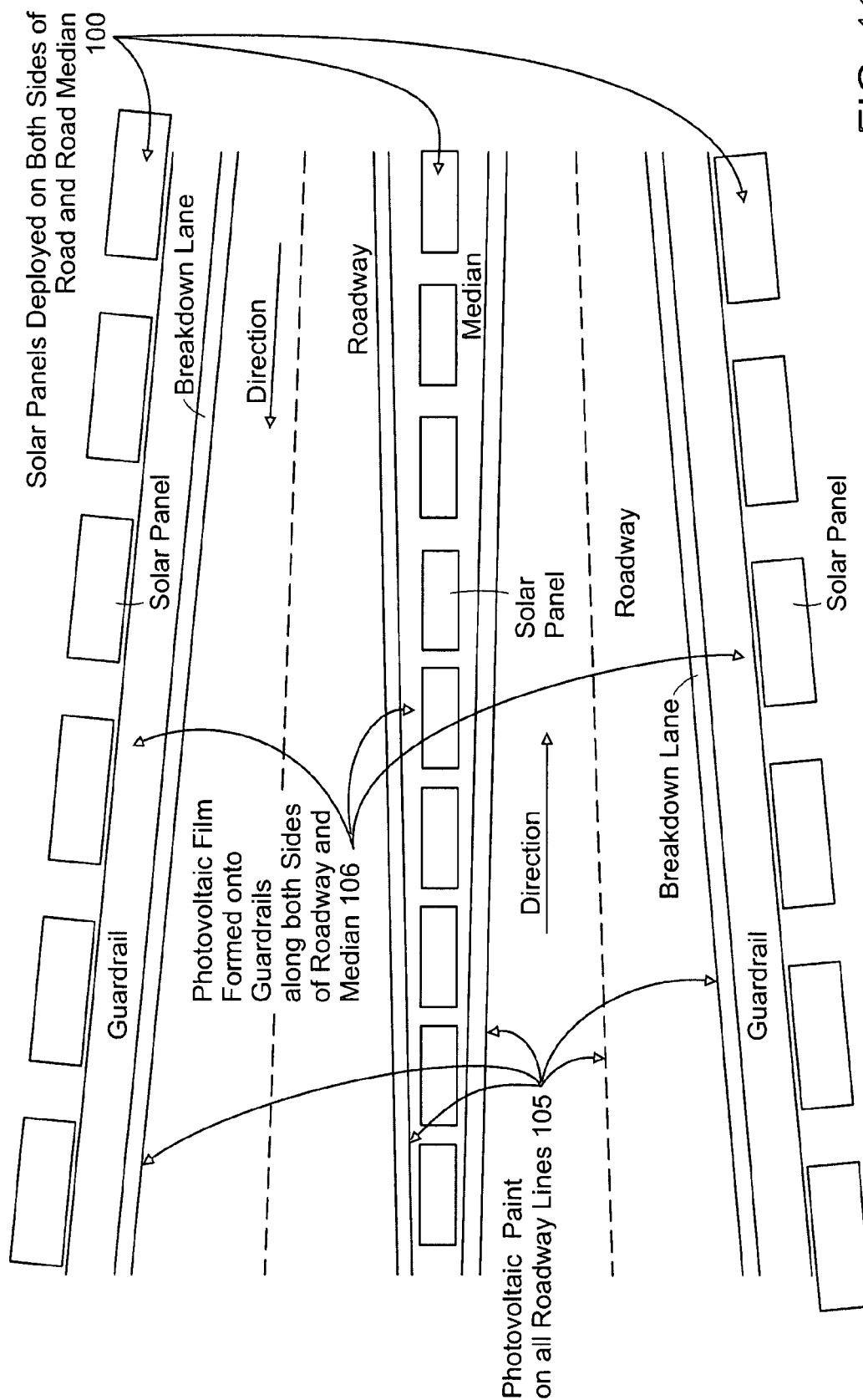
FIG. 11 illustrates solar panels deployed on the roadside lanes in a continuous manner complemented by formed solar films by the present invention.

FIG. 11 illustrates solar panels (Item 100) deployed on the roadside lanes in a continuous manner complemented by formed solar films with backing formed over guardrails (Item 106) and spray on solar material. Various solar technologies may be used in concert to implement a comprehensive and continuous or semi-contiguous implementation of solar energy gathering materials along a roadway system. The solar panels, which may also be solar films, deployed on the sides of the roadway and the median along with solar sprayed on power cells, "solar paint", sprayed as roadway markers (Item 105). These roadway markers may also be deployed in wider use on the roadway, particularly in breakdown lanes, to maximize coverage and power gathering potential.

Figure 12:
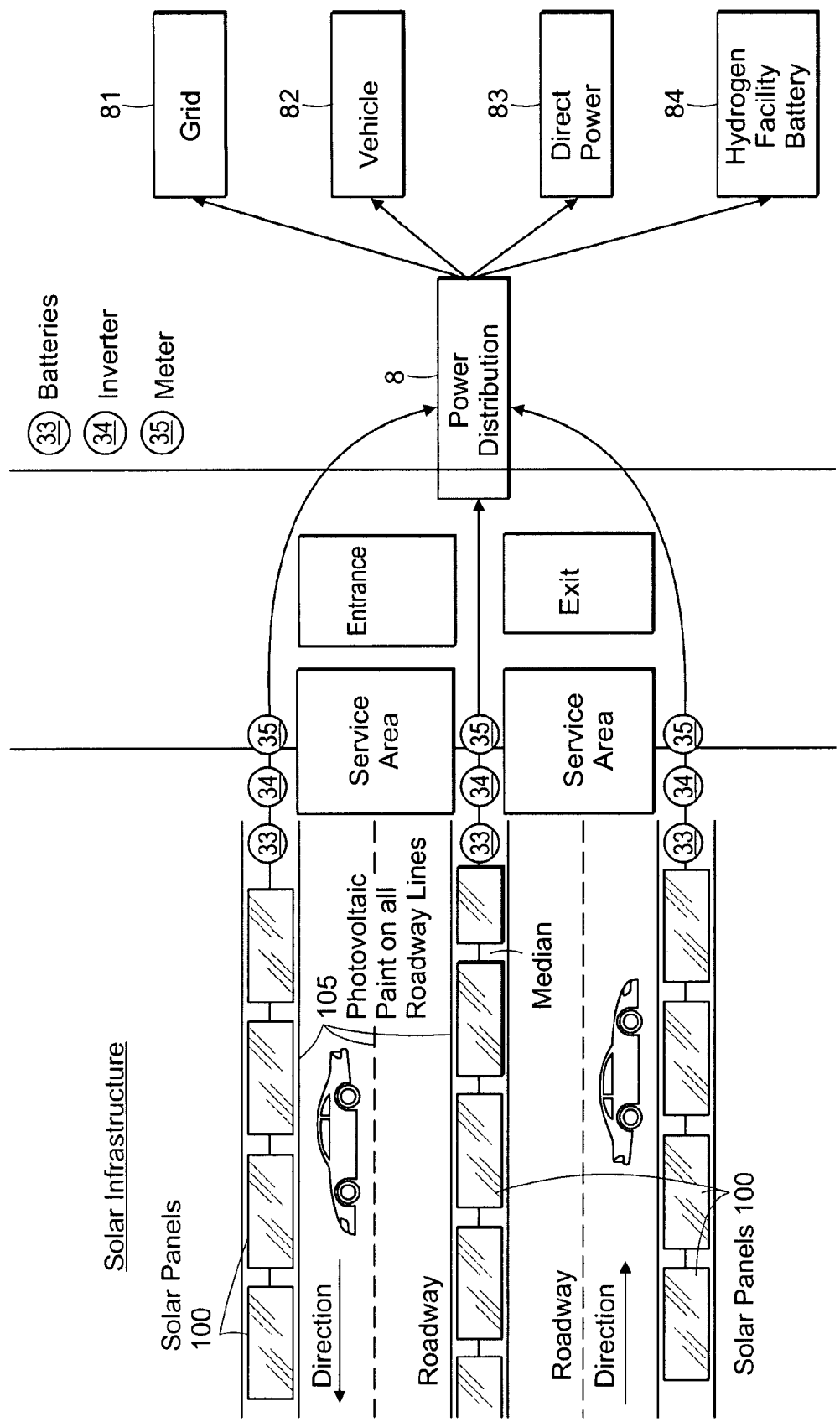
FIG. 12 illustrates solar panels, which may also be solar films, deployed on the sides of the roadway by the present invention.

FIG. 12 illustrates solar panels, which may also be solar films, deployed on the sides of the roadway (Item 100) and the median along with solar sprayed on power cells, "solar paint", sprayed as roadway markers (Item 105). These roadway markers may also be deployed in wider use on the roadway, particularly in breakdown lanes, to maximize coverage and power gathering potential. The gathered power is transferred via wired connection to battery (Item 33), then to inverters (Item 34) and then to meters (Item 35). In turn, meters (Item 35) register the amount of energy that is distributed (Item 8) to the utility grid (Item 81), to homes or businesses (Item 83), to vehicles (Item 82) or to an auxiliary energy storage or hydrogen facility (Item 84).

Figure 13:
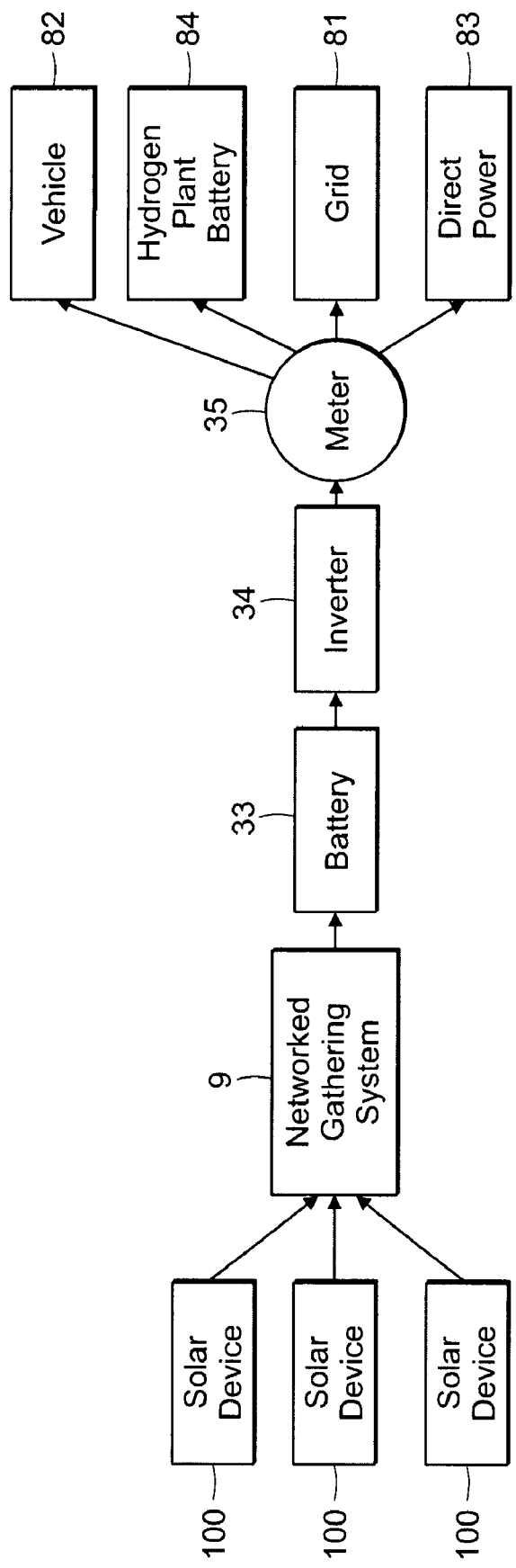
FIG. 13 illustrates a flow chart that defines the steps from gathering to distribution of the solar energy roadway system by the present invention.

FIG. 13 illustrates a flow chart that defines the steps from gathering to distribution of the solar energy in a roadway system. One or more solar gathering devices such as solar panels, solar films with backing and solar spray on power cells are installed along a roadway in a contiguous or semi-contiguous configuration (Item 100). The solar energy generating devices are networked through a roadway system electricity grid via wiring and input and output connections (Item 9) to efficiently take advantage of batteries and battery arrays as are standard in the solar energy gathering industry (Item 33). The energy stored in the batteries is then passed through an inverter or inverters (Item 34) to condition the energy transmission to a distribution point. As the energy is passed to a distribution point the electricity provided to that point is gauged via the use of an electricity meter (Item 35). Distribution points that may be delivered to include the utility grid (Item 81), a vehicle (Item 82), direct distribution to a business or home (Item 83), hydrogen electrolysis and storage facility or a battery storage facility (Item 84).

Figure 14:
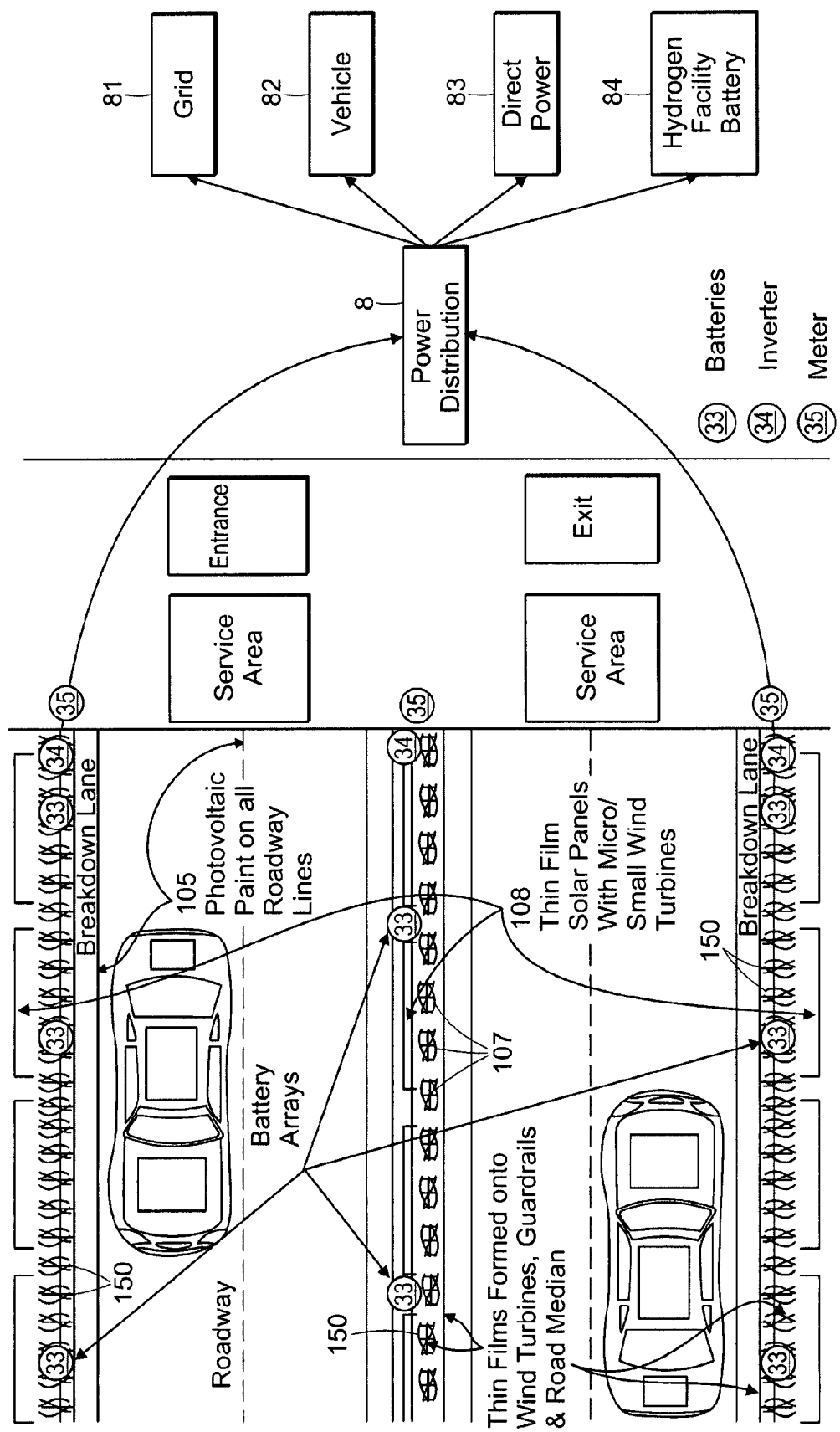
FIG. 14 illustrates the integration of both wind and solar energy gathering systems in tandem implementation along a roadway system by the present invention.

FIG. 14 illustrates the integration of both wind and solar energy gathering systems in tandem implementation along a roadway system. The system includes installations of both wind and solar systems side by side, next to and even within energy gathering devices. Wind energy generating devices are implemented in stratum layered design along the median and breakdown lanes of a roadway (Item 150). Power generated from the devices is passed to battery arrays (Item 33), then inverters (Item 34) and registered through meters (Item 35) before being distributed (Item 8) to the grid, direct power of homes or businesses, powering of automobiles or stored in auxiliary battery arrays or stored by converting to hydrogen using an electrolysis process and held until the power is needed. Example times of need include emergencies or peak demand where the power is strategically held to be sold to the grid system or direct distribution uses at peak demand times.

Wind energy generating devices may also be covered with solar energy generating devices, that is, they may be covered with solar gathering materials such as thin films or spray on solar power cells ("solar paint") that may be molded to parts of the device that do not interfere with the turbines fundamental operation (Item 107). Thin film solar panels may also be combined with small, for example, micrometer sized wind energy generating devices (Item 108). The solar energy that is gathered can either (i) be used to power the wind energy generating device, for example, the helix-type wind turbine generator directly when wind power is not available or to make the turbine of the helix-type wind turbine generator spin faster when wind is available, or (ii) the gathered solar power is fed to the central rod and carried down the base of the turbine where it is channeled, via wiring typical to the industry, into a battery pack or battery array deployment (Item 33), then to an inverter (Item 34), meter (Item 35) and then distributed as discussed above.

The wind system is part of a complimentary installation where designed areas are allotted for both wind and solar power systems implementation along roadways. The solar system alongside the wind system is comprised of one or more solar gathering devices such as solar panels, solar films with backing and solar spray on power cells are installed along a roadway in a contiguous or semi-contiguous configuration. The solar energy generating devices are then networked via wiring and input and output connections to efficiently take advantage of batteries and battery arrays as are standard in the solar energy gathering industry (Item 33).

Figure 15:
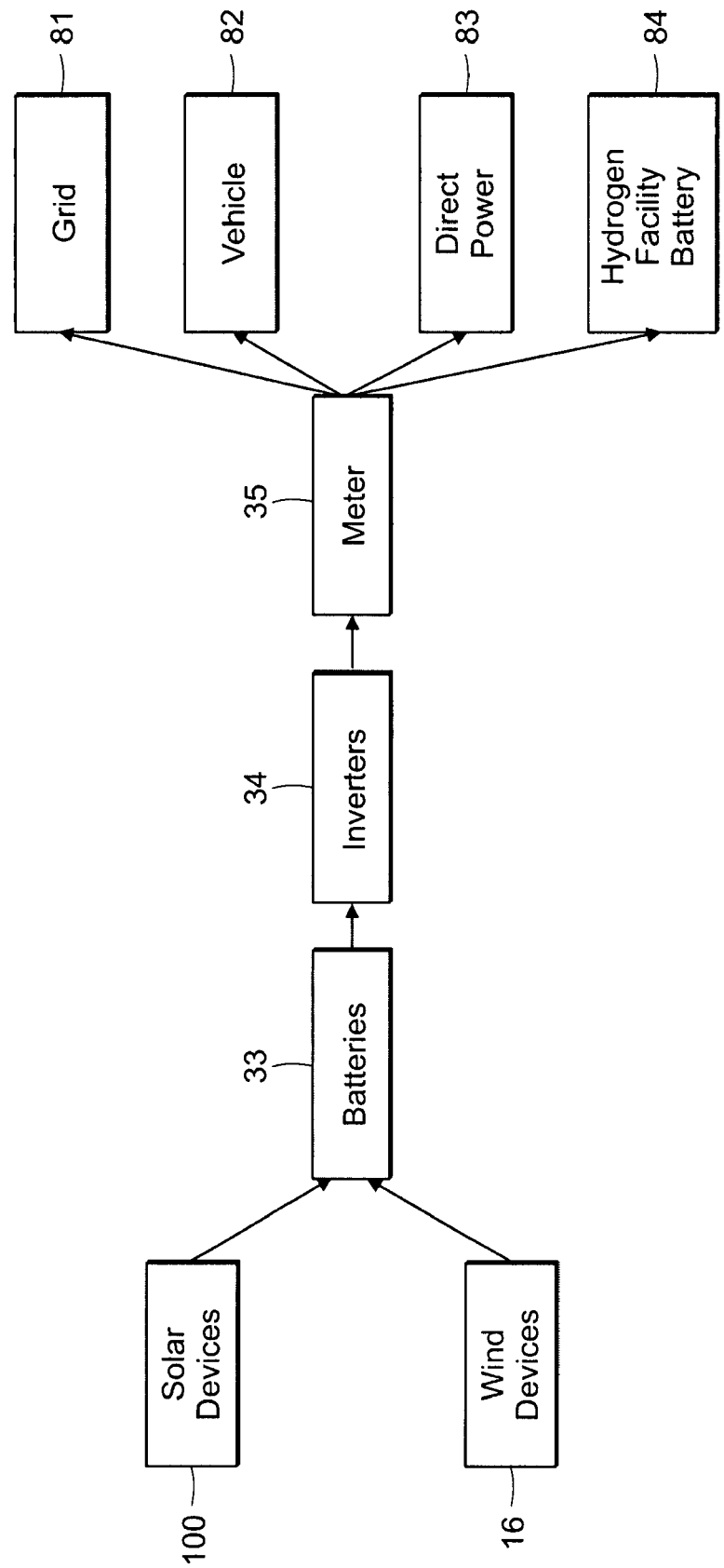
FIG. 15 illustrates a flow chart where both wind and solar energy gathering devices are implemented together by the present invention.

FIG. 15 illustrates a flow chart where both wind (Item 16) and solar energy generating devices (Item 100) as described in FIGS. 14 and 15 transfer their energy to batteries (Item 33) then to inverters (Item 34) then to distribution and/or storage points. Meters (Item 35) register the amount of energy before the energy is distributed to the utility grid (Item 81), vehicles (Item 82), direct distribution of homes and businesses (Item 83) or utilized as stored energy via large battery arrays or via conversion to hydrogen to be held in compressed tanks via the creation of hydrogen via electrolysis (Item 84).

Figure 16:
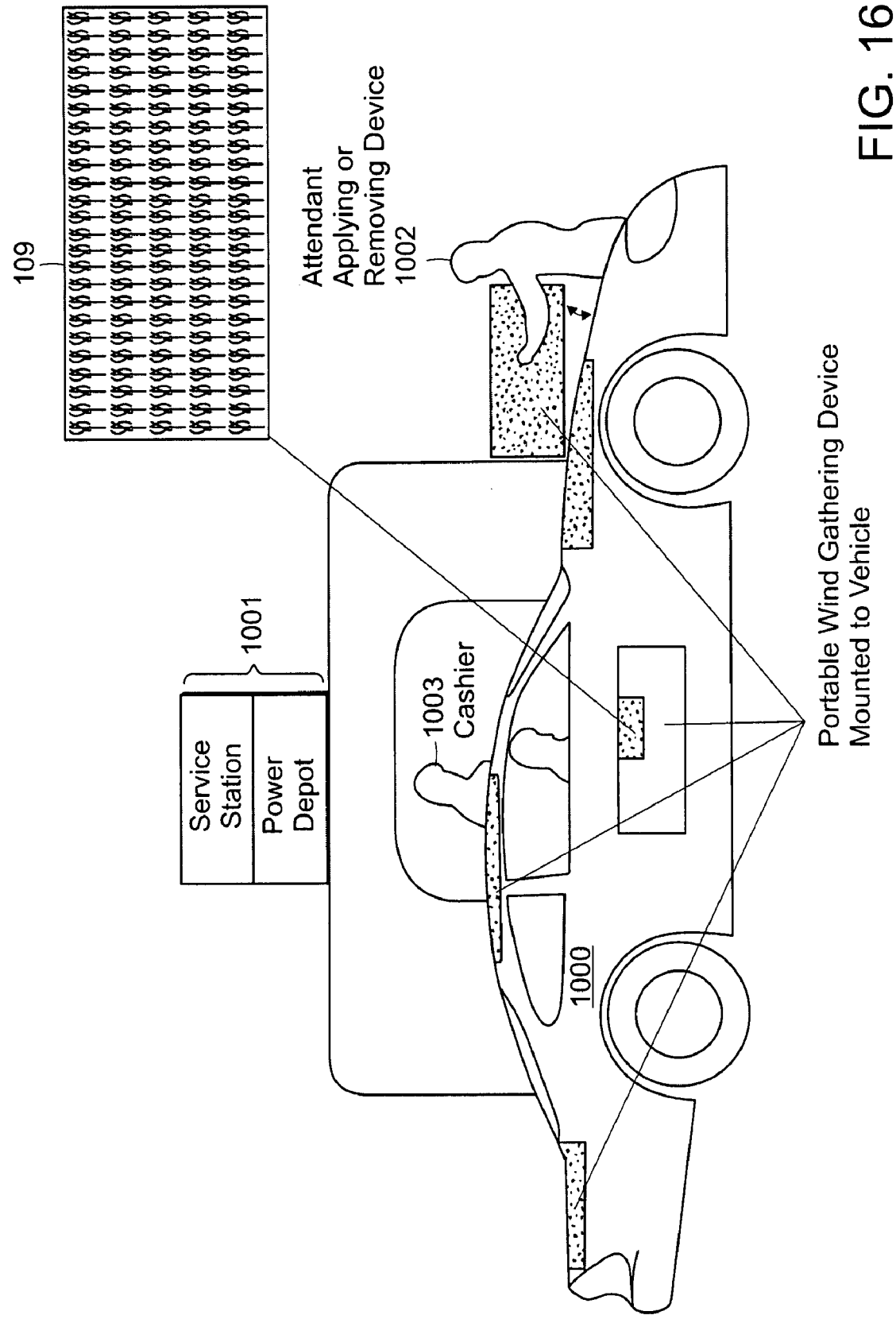
FIG. 16 illustrates the implementation and installation of portable small helix turbine wind energy gathering sheets being installed on a vehicle by the present invention.
Figure 17:
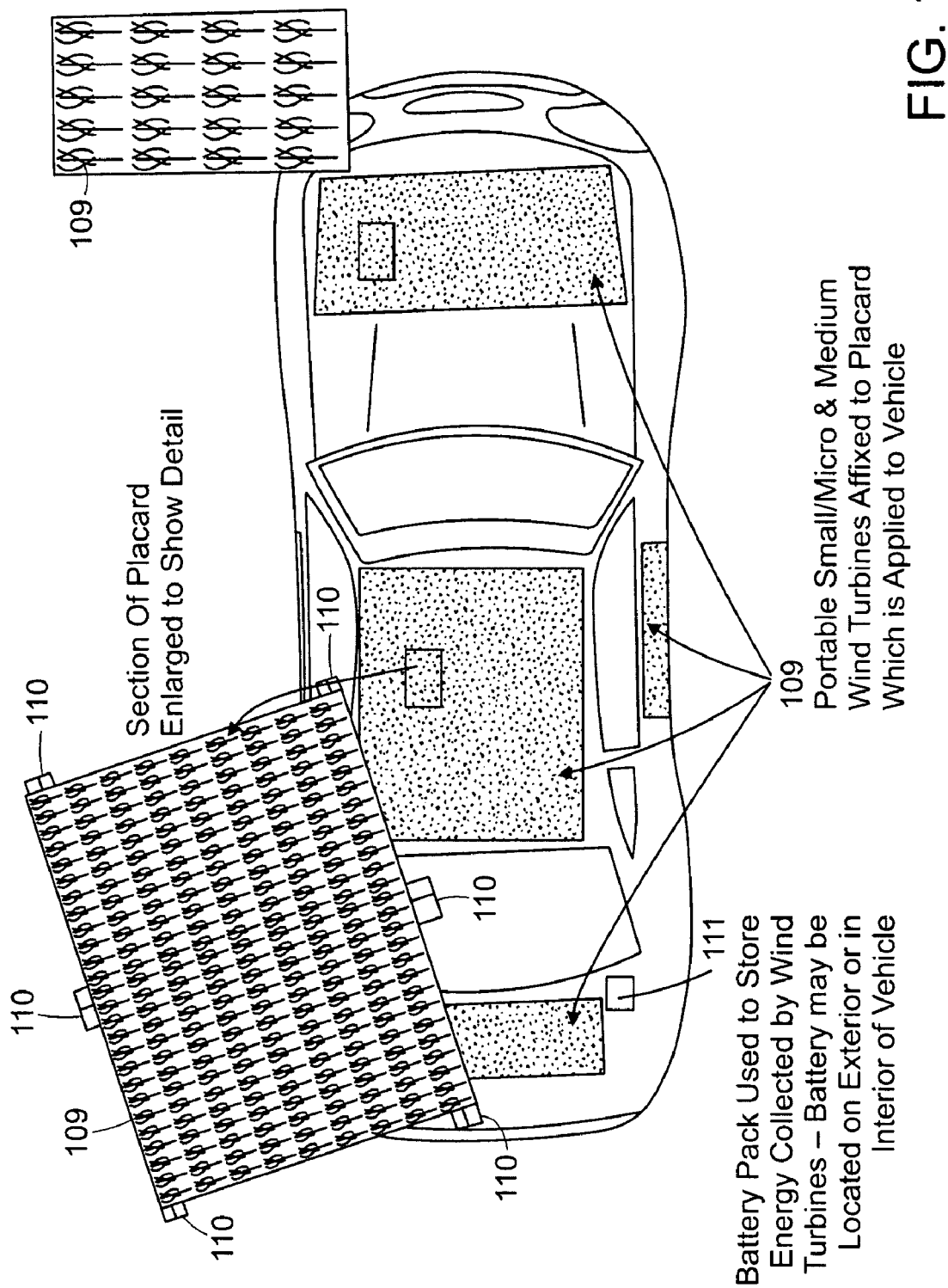
FIG. 17 illustrates the portable helix wind turbine vehicle installation sheets or placards being affixed to a vehicle by the present invention.

FIG. 16 illustrates the implementation and installation of portable small helix turbine wind energy gathering sheets (Item 109) being installed on a vehicle, for example, an automobile (Item 1000) at an authorized service station and power depot (Item 1001), which may be located at a toll booth, rest area, exit or other location. Once the vehicle and owner are registered into the system the solar gathering unit(s) may be self-installed by the vehicle operator or installed by a trained service center attendant (Item 1002). By way of example and not limitation, the helix turbine sheet unit (Item 109) can be installed on the top, bottom or sides of the vehicle. Power derived from the turbines is stored in the vehicle in one or more vehicle-based energy storage systems, for example, a battery or battery packs (FIG. 17, Item 111) which are delivered to service stations (Item 1001) when full for system credit for the energy gathered issued automated or by a cashier (Item 1003). The energy gathered may also be used to directly power elements of the vehicle and the owner would reap a discount for the metered power used or consumed by the vehicle in this situation similar in value to the credit that would be awarded for power gathered by the one or more vehicle-based energy storage systems, for example, a battery or battery pack (FIG. 17, Item 111). System credits can be reimbursed in the form of toll fee credits, cash payments, or credits at participating businesses including power companies and consumer goods companies.

FIG. 17 illustrates the portable helix wind turbine vehicle installation sheets or placards (Item 109) that are affixed to the vehicle via snap on clips (Item 110), adhesive, magnetic bonding, bonded by a static charge between the vehicle surface and the installation sheet (Item 109), via a locking screw mounting system, permanently or removable mounted during the vehicle manufacturing process or overlay bracing. The one or more vehicle-based storage systems, for example, a battery to store the power or battery array may be on the interior, exterior (Item 111), trunk or underbelly, or under the hood of the vehicle. The vehicle helix wind turbines (Item 109) may individually be as small as a micron or up to two feet in length. One turbine or millions of turbines may occupy a single vehicle installation sheet or placard (Item 109).

Figure 18:
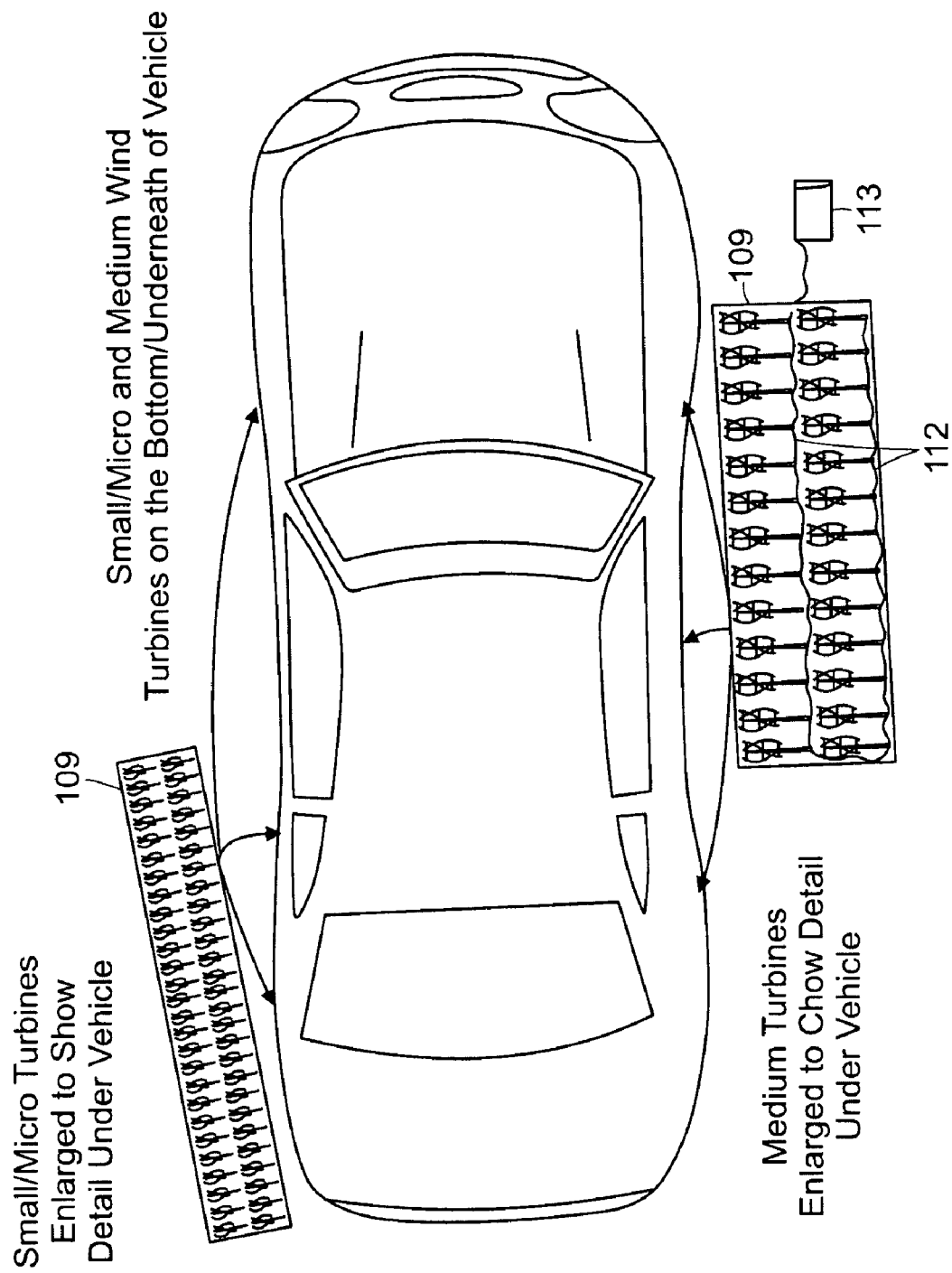
FIG. 18 illustrates helix wind turbine installation sheet are not just meant to be mounted on top of the vehicle but also in available for installation in areas under the vehicle by the present invention.

FIG. 18 illustrates that the helix wind turbine installation sheets are not just meant to be mounted on top (upper) surfaces of the vehicle but also are available for installation in areas under the vehicle (Item 109). The lack of uniform wind and the presence of 'dirty wind' makes the use of the helix turbine advantageous and efficient for collecting wind energy from different parts of the moving vehicle. In addition to securing the turbines the installation sheet (Item 109) forms a matrixes grid of wiring (Item 112) that is comprised of wiring taken from the generator of each individual turbine. The matrixes wiring from each turbine is then delivered to the battery for charging in one integrated wired output connection (Item 113).

Figure 19:
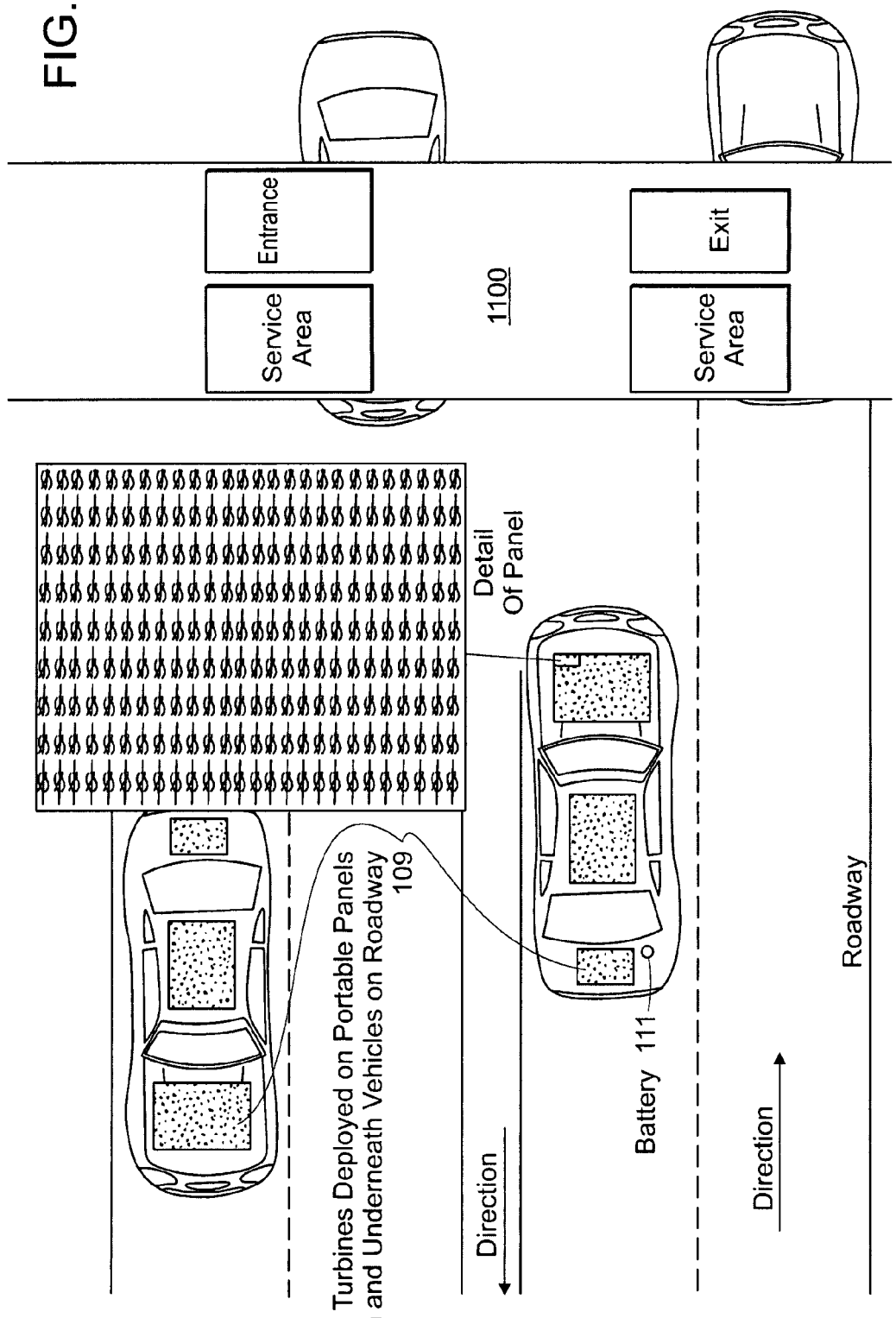
FIG. 19 illustrates an overhead view of vehicles deployed with the helix wind gathering installation sheets or placards including a composite view of an installation sheet by the present invention.

FIG. 19 illustrates an overhead view of vehicles deployed with the helix wind gathering installation sheets or placards (Item 109), with a composite view of an installation sheet, in operation, traveling along a roadway generating wind power stored in one or more vehicle-based energy storage systems, for example, a battery or battery packs (Item 111) and passing through toll booth service areas (Item 1001) where installation sheets (Item 109) may be installed, removed or where fully charged batteries can be switched out for new batteries or reinstalled. Maintenance and account information may also be obtained at the service areas.

Figure 20:
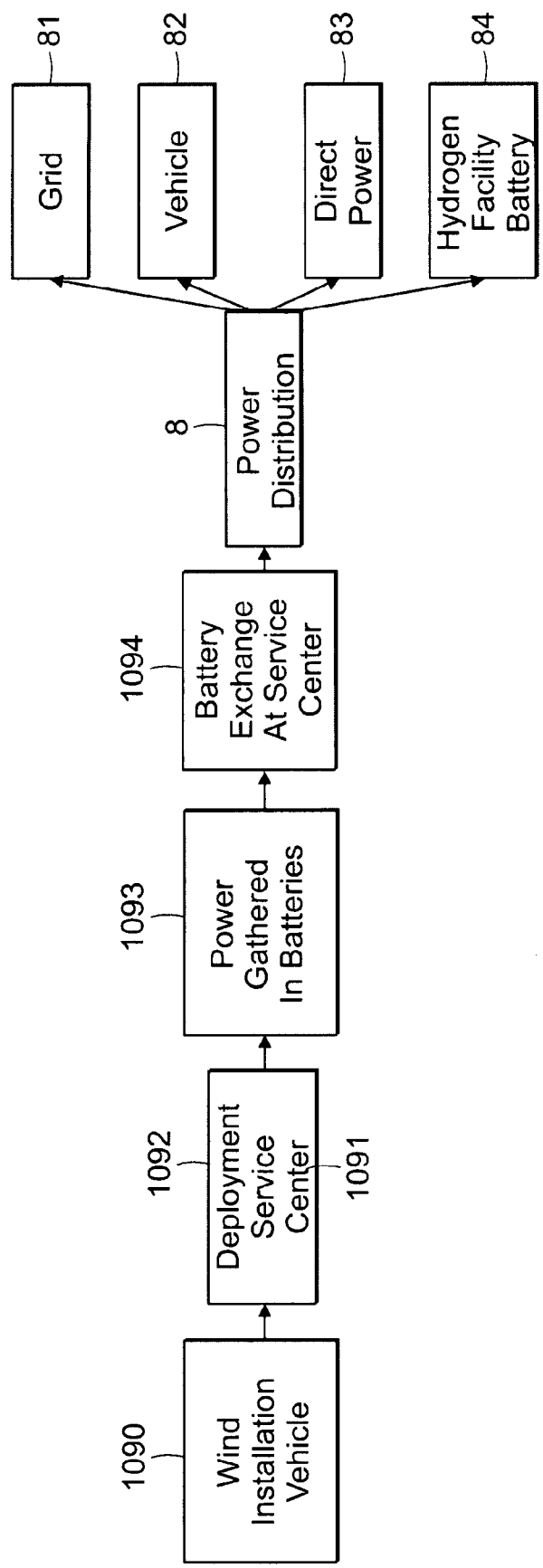
FIG. 20 illustrates a flow chart for the vehicle wind energy gathering system by the present invention.

FIG. 20 illustrates a flow chart for the vehicle wind energy gathering system. The process/system begins with the installation (Item 1090) of the manufactured wind helix turbine installation sheets or placards (Item 109) along with the battery or battery array system (Item 111). The completed installation of the vehicle wind energy gathering system is registered with the vehicle and owner at a service area (Item 1091) and deployed (Item 1092) onto the roadway system to gather energy using the installed one or more vehicle-based wind energy generating devices and vehicle-based energy storage systems (e.g., battery or battery arrays) (Item 1093). The wind gathering system fills the battery or battery arrays with energy stored as electricity by the battery or batter array. The battery packs may then be turned in or exchanged at a service center (Item 1094) where the power gathered by the vehicle wind energy gathering system identified with a vehicle and/or owner is registered and credited to the vehicle and/or owner. The power gathered in the batteries is then prepared for distribution into the system (Item 8) in the form of distribution into the utility grid (Item 81), necessitating a transfer of the battery power through an inverter. The battery power may be utilized directly by a vehicle (Item 82). The battery power may be attached to an inverter for direct powering of businesses or homes (Item 83) or the power may be stored in auxiliary battery arrays or used to convert hydrogen via electrolysis for energy storage or for power hydrogen energy needs (Item 84). By charging the vehicle owner nothing, very little and possibly securing a deposit against the value of the equipment, the vehicle owner gains incentive to create value for himself by participating in the gathering of clean energy with no financial investment needed during the service area registration process.

Figure 21:
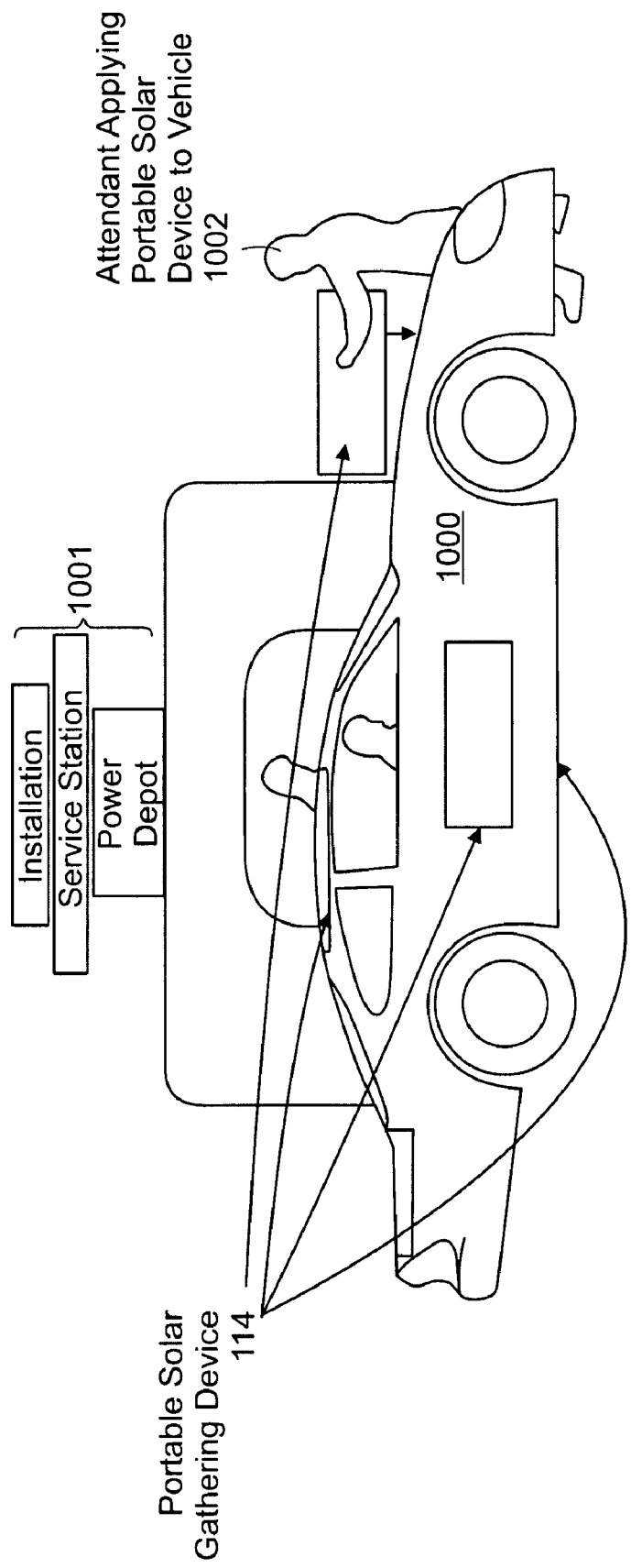
FIG. 21 illustrates the installation of a portable solar energy gathering system at a qualified service area by the present invention.

FIG. 21 illustrates the installation of a portable solar energy gathering system (Item 114) at a qualified service area (Item 1001) installed on a vehicle (Item 1000) by a service center trained installer (Item 1002). The solar installation sheets (Item 114) may be affixed to the vehicle via snap on clips, adhesive, magnetic bonding, bonded by a static charge between the vehicle surface and the installation sheet, by a locking screw mounting system, permanently or removable installation of a mounting during the vehicle manufacturing process or overlay bracing. The battery to store the power or battery array may be on the interior, exterior, trunk or underbelly, or under the hood of the vehicle. The solar installation sheets (Item 114) may be mounted on the top, hood, trunk or sides of a vehicle.

Figure 22:
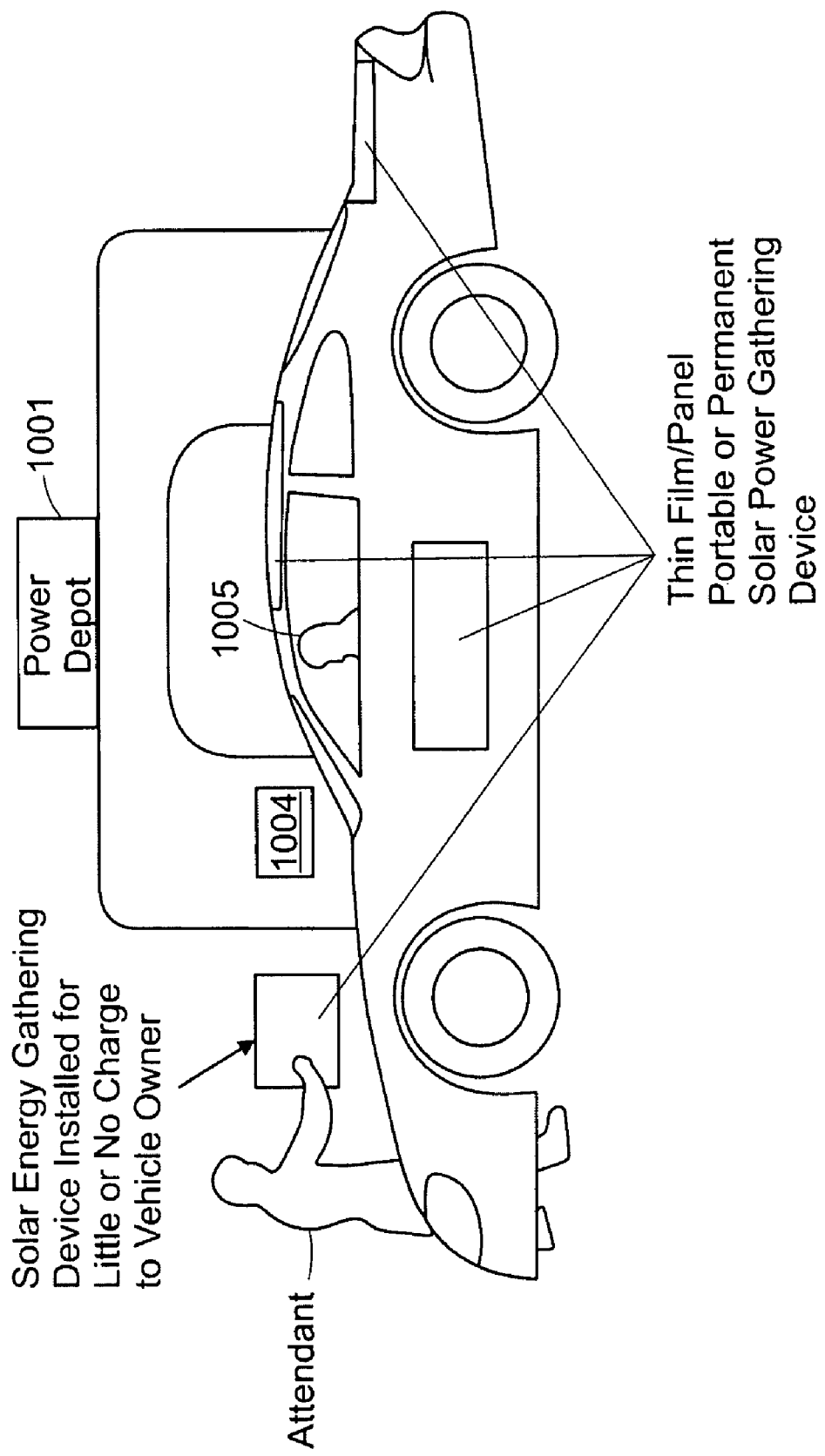
FIG. 22 illustrates that no cash transaction occurs at the time of installation at the power depot service station area by one embodiment of the present invention.

FIG. 22 illustrates that no cash transaction occurs at the time of installation at the power depot service station area (Item 1001), with the exception of a credit card or other security registration/deposit system (Item 1004). By charging the vehicle owner (Item 1005) nothing, very little and possibly securing a deposit against the value of the equipment the vehicle owner (Item 1005) gains incentive to create value for himself by participating in the gathering of clean energy with no financial investment needed.

Figure 23:
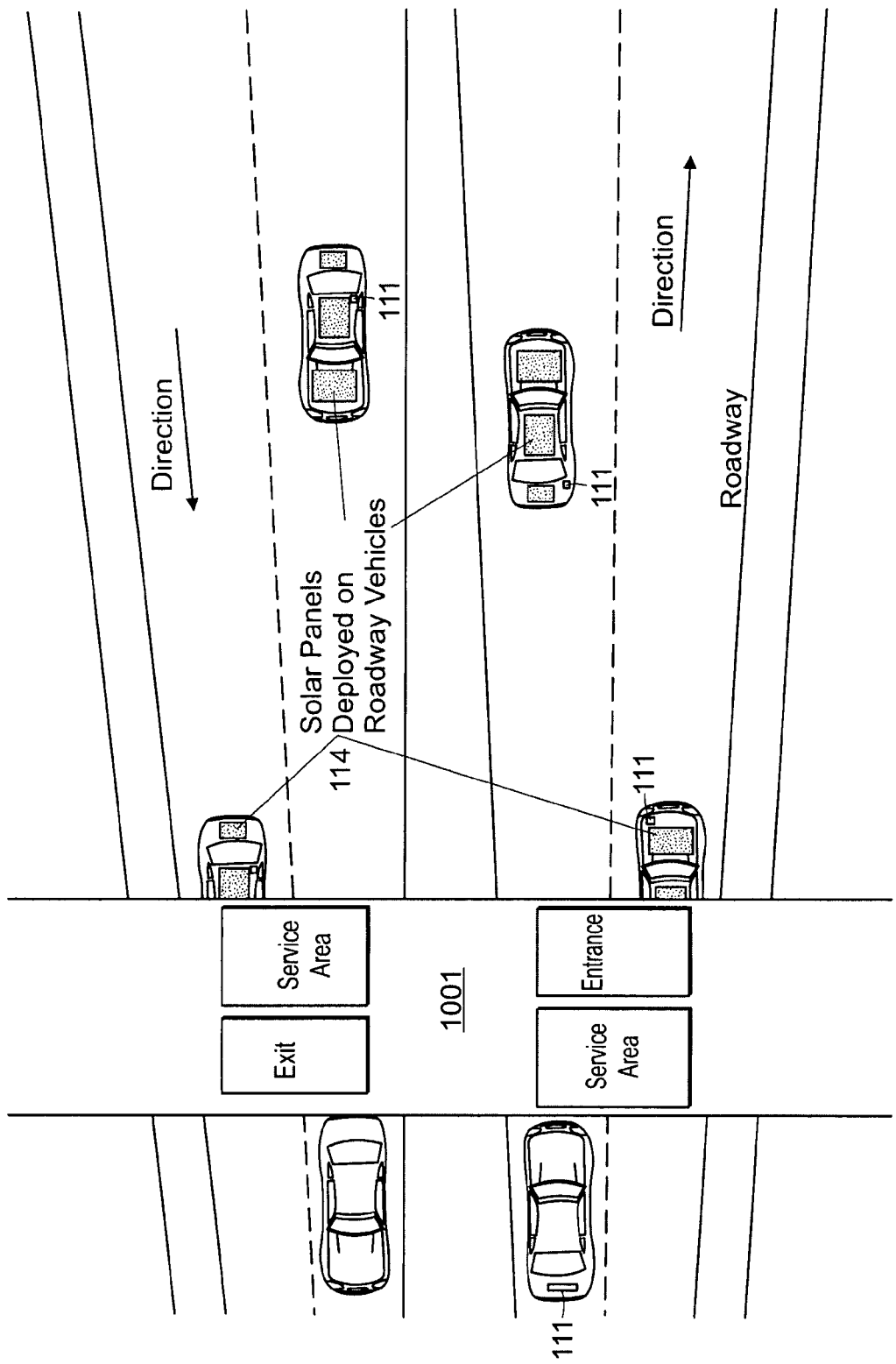
FIG. 23 illustrates an overhead view of vehicles with solar installation sheets traveling down the roadway system by the present invention.

FIG. 23 illustrates an overhead view of vehicles with solar installation sheets (Item 114) traveling down a road along with the integration of a service area (Item 1001) in a familiar toll plaza along the roadway route. Similar to the wind installation system, the solar installation sheets may be coupled to a battery outside or inside the vehicle. (Item 111).

Figure 24:
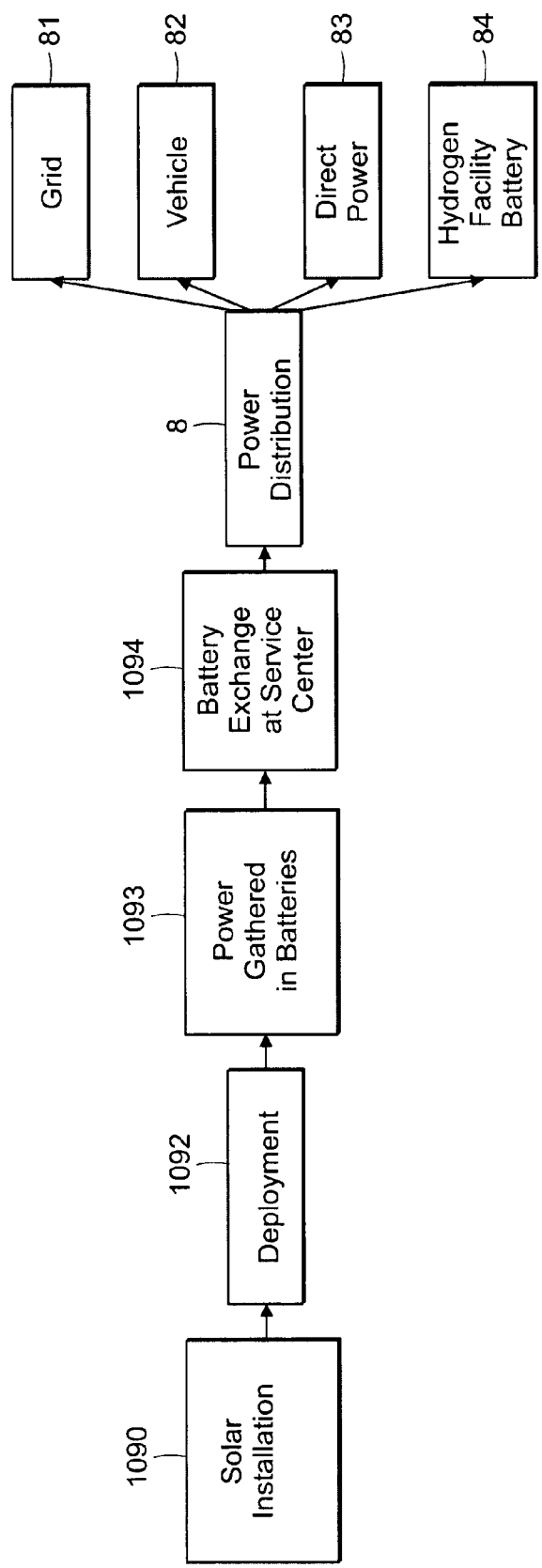
FIG. 24 illustrates a flow chart where the solar installation sheets and battery configuration are installed in the vehicle by one embodiment of the present invention.

FIG. 24 illustrates a flow chart where one or more solar installation sheets and battery configuration are installed in a vehicle (Item 1090). The vehicle is deployed, registered within the system with the installation sheets installed (Item 1092) and activated to capture and store energy in the batteries (Item 1093). Power is then gathered in the batteries and stored as electricity (Item 1094) for power distribution (Item 8). The batteries then feed the instant vehicle with power that is metered or the batteries are exchanged at a service center (1094) and the power gathered in the batteries is used to feed power into the grid (Item 81) after being sent through an inverter which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra power to fuel the electrolysis of water to create hydrogen (Item 84).

Figure 25:
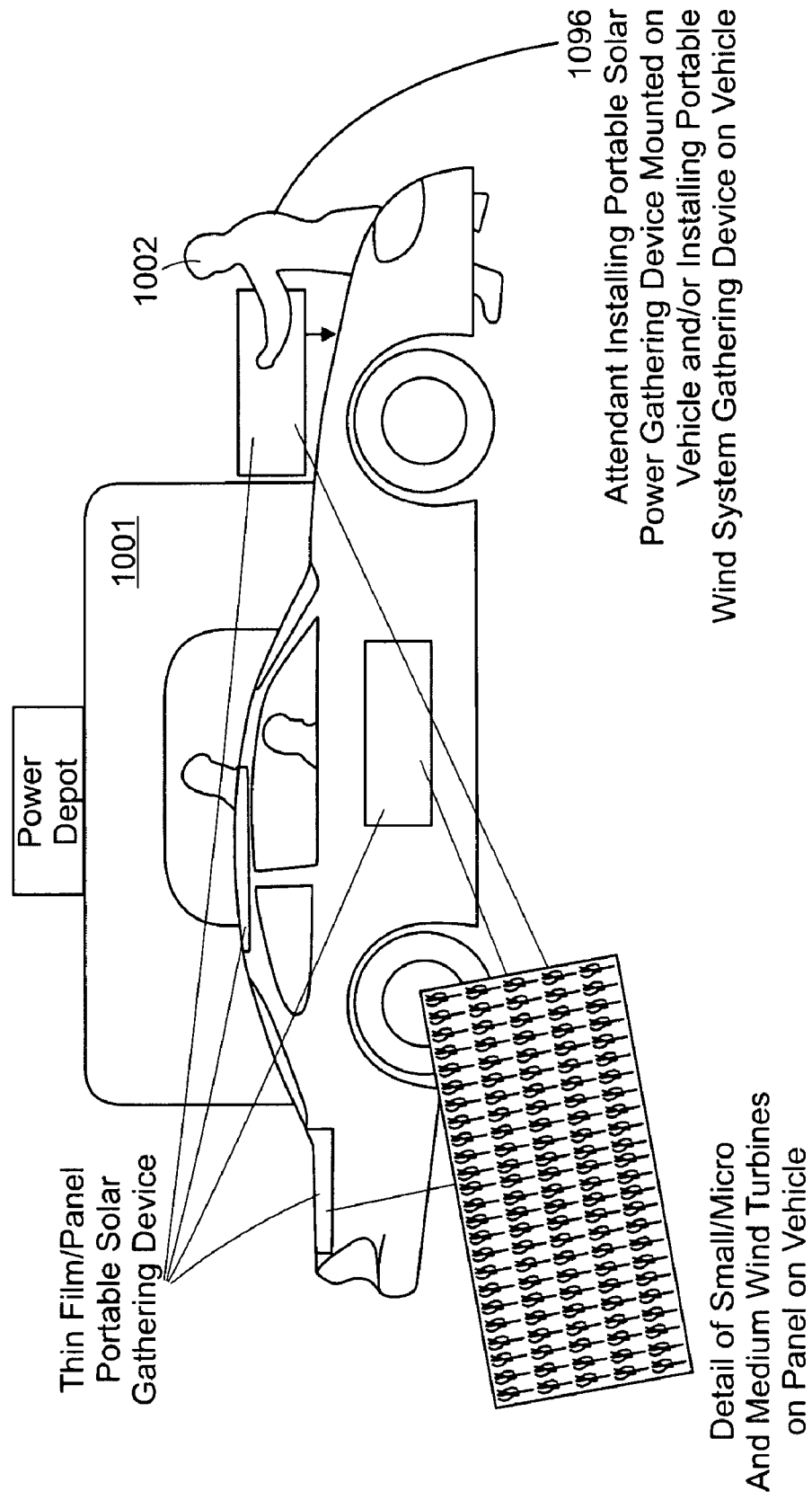
FIG. 25 illustrates portable solar and wind installation sheets being used in tandem separately and as unified, single sheets gathering both wind and solar energy simultaneously by the present invention.

FIG. 25 illustrates portable solar and wind installation sheets being installed (1096) in tandem separately and as unified, single sheets gathering both wind and solar energy simultaneously. The installation, acquisition and customer service station centers (Item 1001) function identically as in the previous Figures. The surfaces of the turbine sheets including the turbines themselves may be sprayed with spray on power cells to maximize the potential of simultaneous solar and wind energy gathering from the same installation panel. Alternatively the solar material may be non-silicon film or standard silicon panelized structure. Wiring on the installation sheets may be dual in nature with solar energy going into specific batteries and wind energy into its own batteries or the energy may be put into the same batteries. Solar energy may also be used to power the wind turbines, thus creating only wind energy that is being used to charge the battery or battery array.

Figure 26:
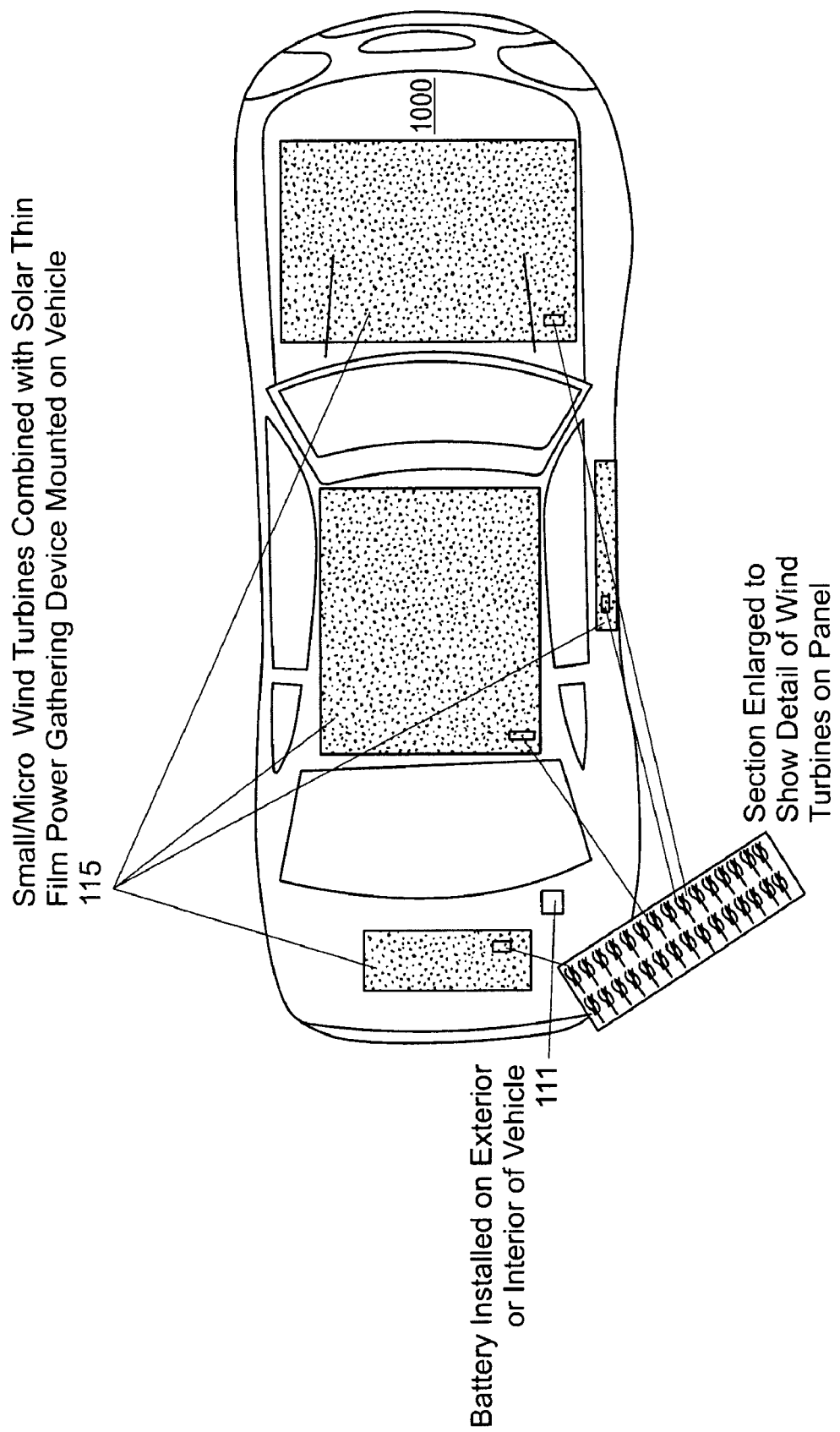
FIG. 26 illustrates an overhead view of a vehicle installed with the solar and wind integrated panels by one embodiment of the present invention.

FIG. 26 illustrates an overhead view of a vehicle installed with the solar and wind integrated panels (Item 115). These panels may incorporate both solar and wind gathering systems in a single installation sheet or separately with wind alone installation sheets and solar alone installation sheets functioning and simultaneously deployed on a vehicle (Item 1000) participating in the system. The composite illustration of the installation sheet once again demonstrates tiny helix designed turbines, too small to be legibly seen without composite form drawing deployed on the vehicle with attendant solar gathering materials incorporated within the surface of the same installation sheets. Energy gathered by the sheets is transferred to the battery array (Item 111).

Figure 27:
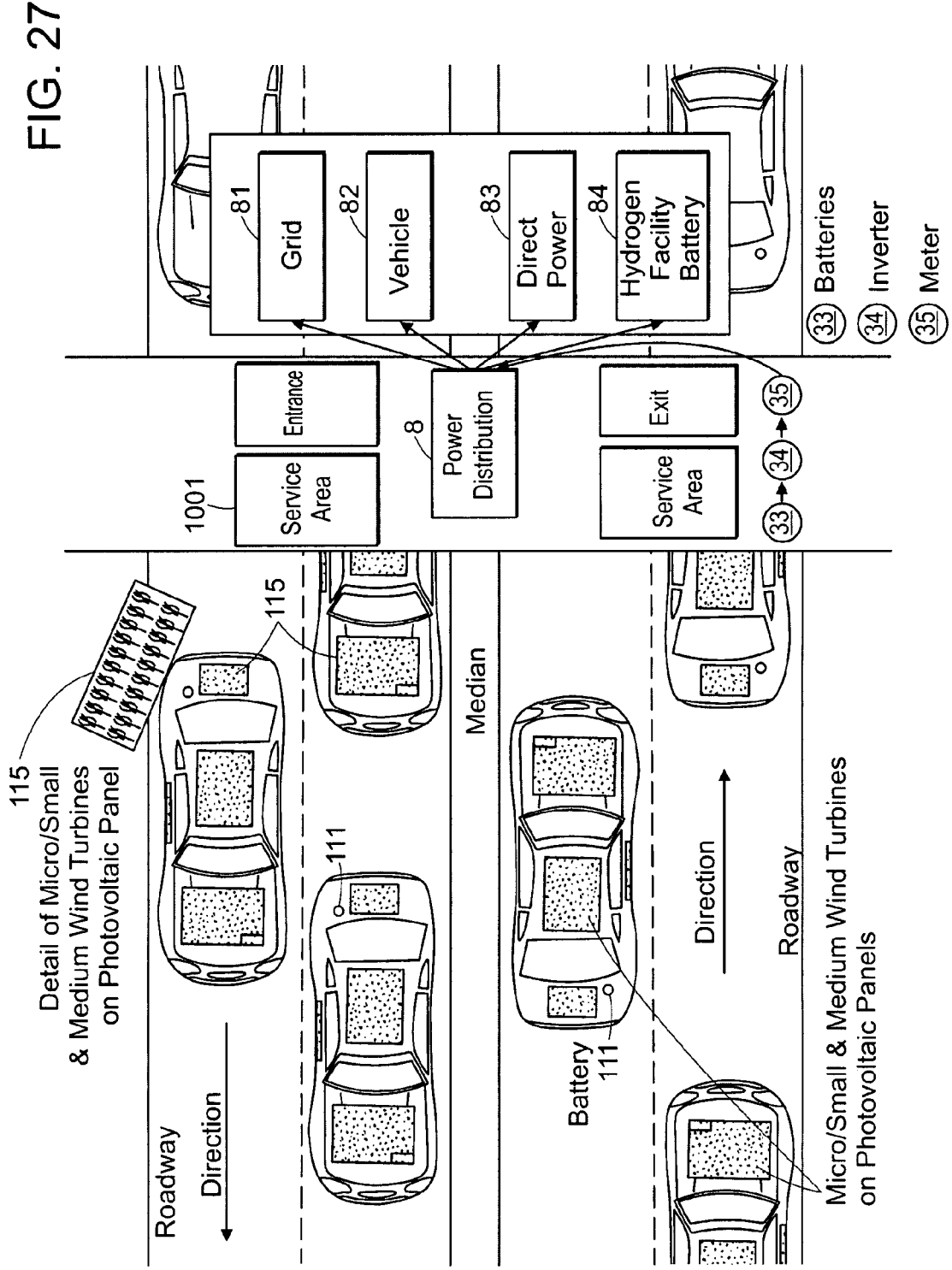
FIG. 27 illustrates an overhead view of vehicles deployed with solar and wind installation sheets moving in and out of service center areas for the installation, registration, updating and maintenance of said systems by the present invention.

FIG. 27 illustrates an overhead view of vehicles deployed with solar and wind installation sheets (Item 115) moving in and out of service center areas (Item 1001) for the installation, registration, updating and maintenance of the solar and wind energy generating devices. System installation sheets are displayed deployed on vehicles and composite diagrams give a feel for the large amount (density) of tiny wind turbines that can be deployed on a single vehicle installation sheet. As charged batteries (Item 111) are collected at the service center (Item 1001) power is distributed using inverters and meters to store, condition, transmit and track power distributed from the system for direct use in vehicles (Item 82), for use in the utility grid (Item 81), for use in 3rd party vehicles (Item 82), which may pick up charged batteries as they pass through the service center, for direct powering of homes and businesses (Item 83) and for storage as reserve battery power or utilizing the battery energy to conduct the electrolysis of hydrogen for use in hydrogen powered systems as well as for storage of reserve energy (Item 84).

Figure 28:
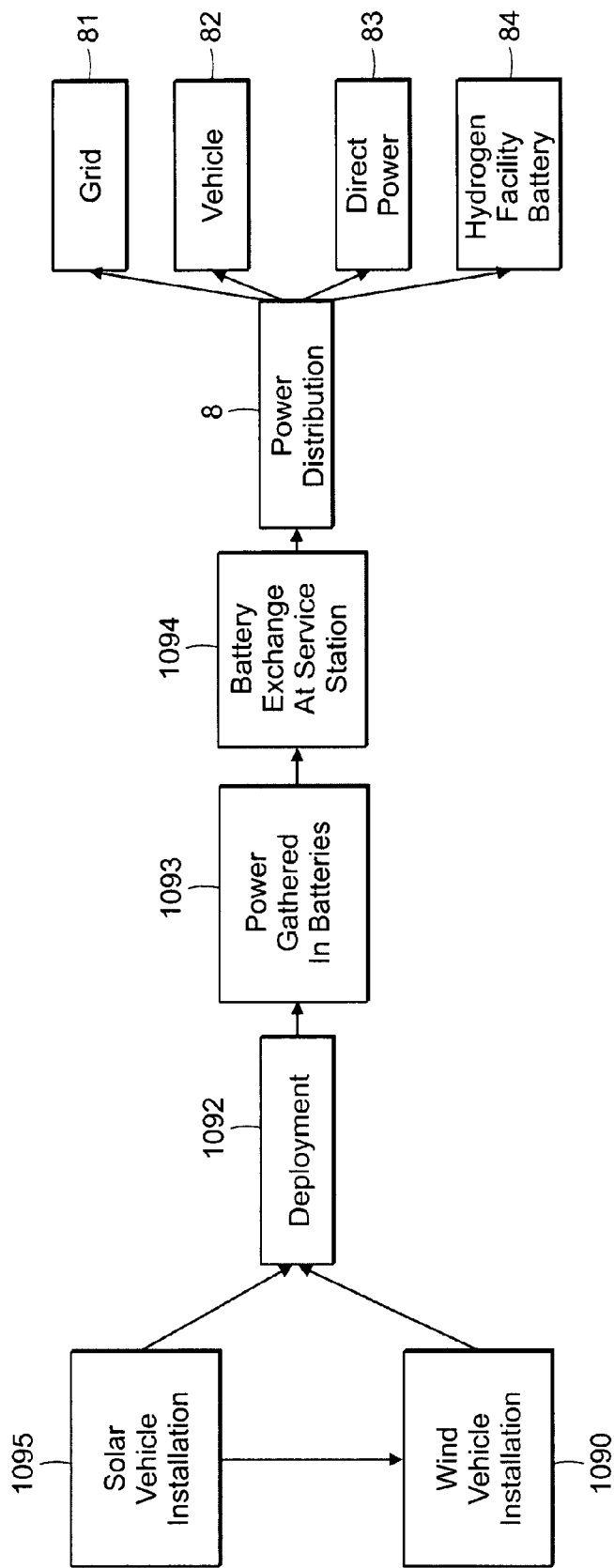
FIG. 28 illustrates a flow chart that combines the flow of energy generated by both wind and solar installation sheets by the present invention.

FIG. 28 illustrates a flow chart that combines the flow of energy generated by both wind (Item 1090) and solar installation sheets (Item 1095) into the portable vehicle system (Item 1092), or solar energy may be used to power the wind energy installation and create a uniform, wind energy only, power source flowing into the battery or battery array (Item 1093). The vehicle is deployed (Item 1092), registered within the system with the installation sheets installed and activated to capture and store energy in the batteries (Item 1093). Power is then gathered in the batteries and stored as electricity. The batteries then feed the instant vehicle with power that is metered or the batteries are exchanged at a service center (Item 1094) and the power gathered in the batteries is distributed (Item 8) to be used feed power into the grid (Item 81) after being sent through an inverter which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra battery power to fuel the electrolysis of water to create hydrogen, which may be stored compressed and utilized for hydrogen engines or converted back to electricity using hydrogen fuel cell technology and distributed to third parties at times when peak energy needs create premium pricing demand (Item 84).

Figure 29:
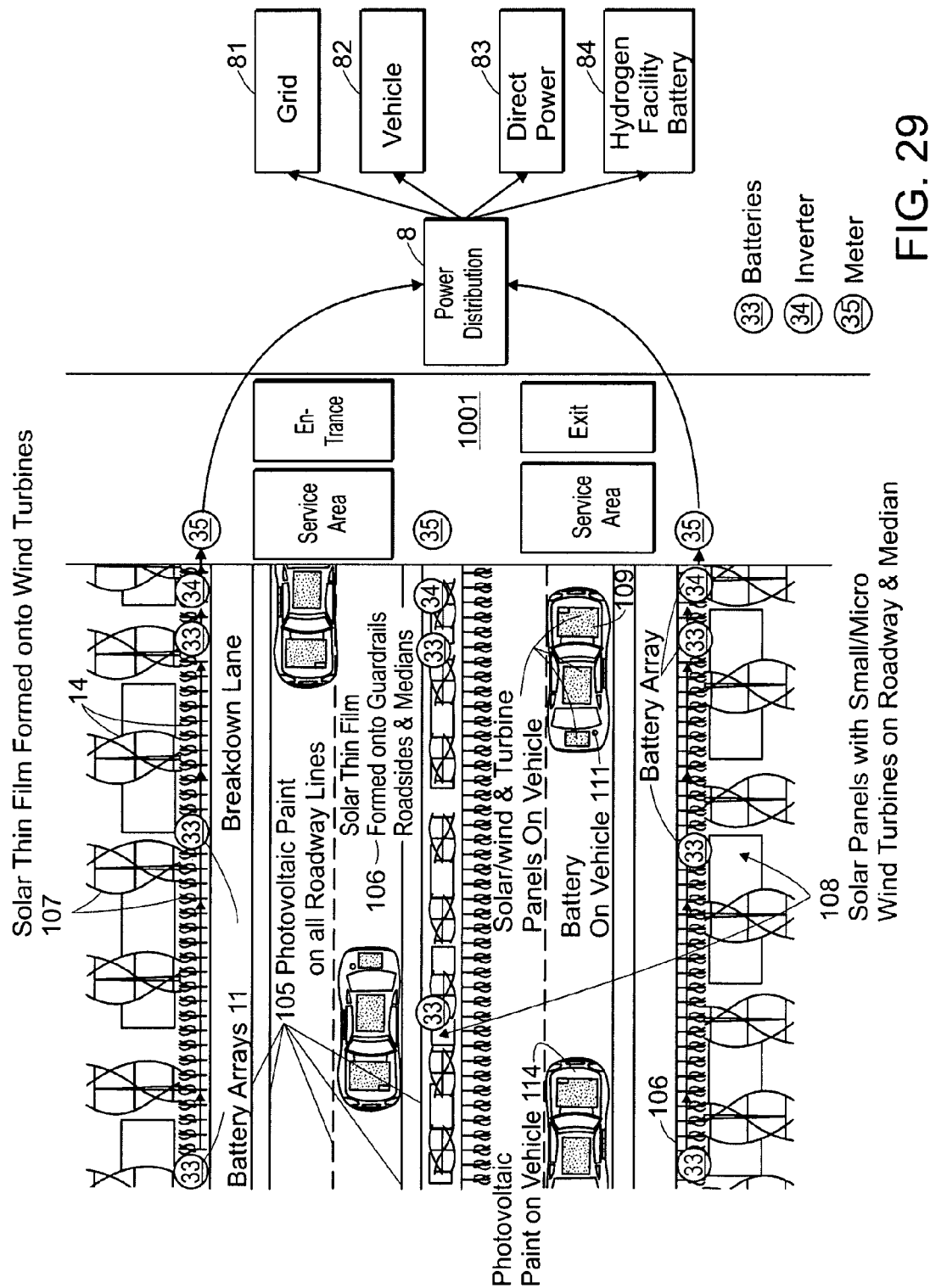
FIG. 29 illustrates a full integration of the fixed and portable roadway integrated wind and solar energy gathering roadway system by the present invention.

FIG. 29 illustrates an integration of the fixed and portable roadway integrated wind and solar energy gathering roadway system. Ground and vehicle-based wind energy generating devices of different type along with ground and vehicle-based solar energy generating devices of different type are shown schematically (e.g., solar thin film formed on wind turbine generators of different size (Item 107), photovoltaic paint on roadway lines (Item 105), solar thin film formed onto roadside and median guardrails (Item 106), photovoltaic paint on vehicles (Item 114), solar/wind turbine generator panels/installation sheets on vehicles (Item 109), solar panels with small/micro wind turbines on roadway median and edge of breakdown lane (Item 108). Power gathered by these various energy generating devices is transferred to ground and vehicle based energy storage systems, for example, ground and vehicle-based batteries and battery arrays (Items 33 and 111) for storing. The batteries then feed the system with power that is metered (Item 35) or the batteries are exchanged at a service center (Item 1001) and the power gathered in the batteries (Item 111) is used to feed power, either at a service center (Item 1001) or along a convenient roadway location into a utility grid (Item 81) after being sent through an inverter (Item 35) which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra battery power to fuel the electrolysis of water to create hydrogen, which may be stored compressed and utilized for hydrogen engines or converted back to electricity using hydrogen fuel cell technology and distributed to third parties at times when peak energy needs create premium pricing demand (Item 84). This integrated 4-pronged approach creates a comprehensive clean energy power gathering system that may be deployed throughout the entire roadway and highway systems converting the massive available space and energy available to conversion into a stable clean energy source with efficient geographical infrastructure for distribution.

Figure 30:
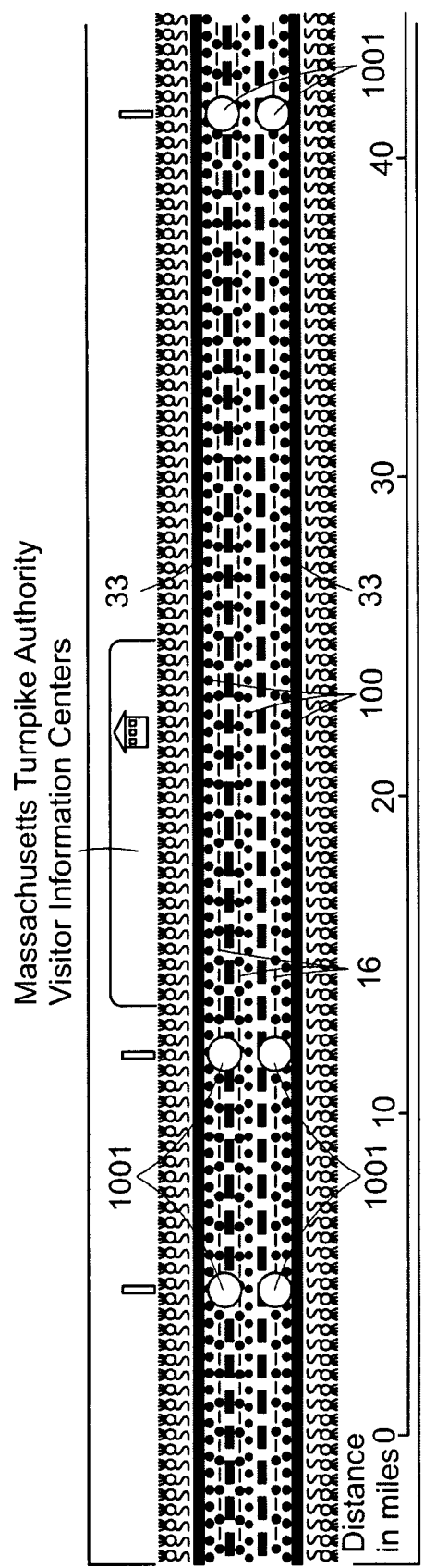
FIG. 30 illustrates the implementation of a roadway system across the entirety of a major roadway for the example of the Massachusetts Turnpike by the present invention.
Figure 31:
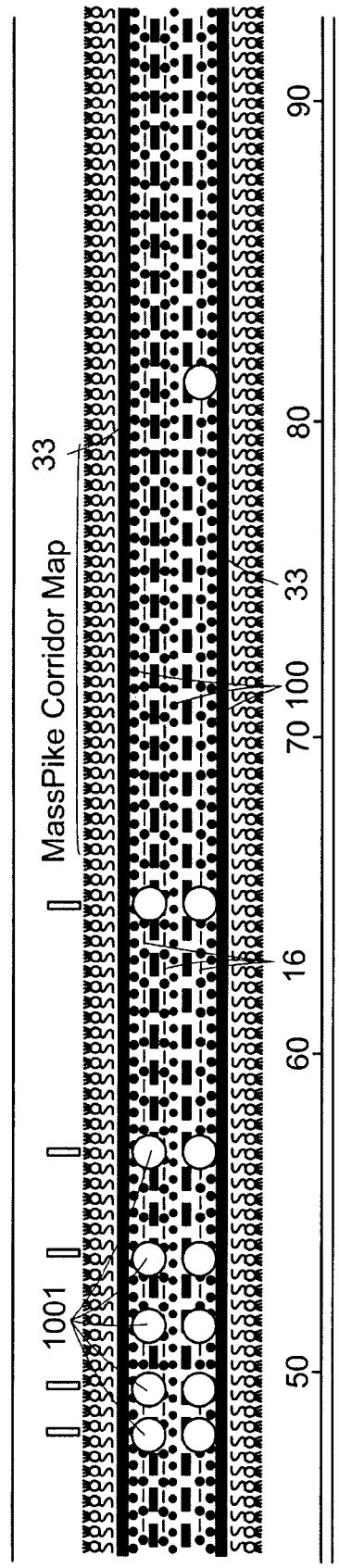
FIG. 31 is another illustration of the implementation of a roadway system across the entirety of a major roadway for the example of the Massachusetts Turnpike by the present invention.
Figure 32:
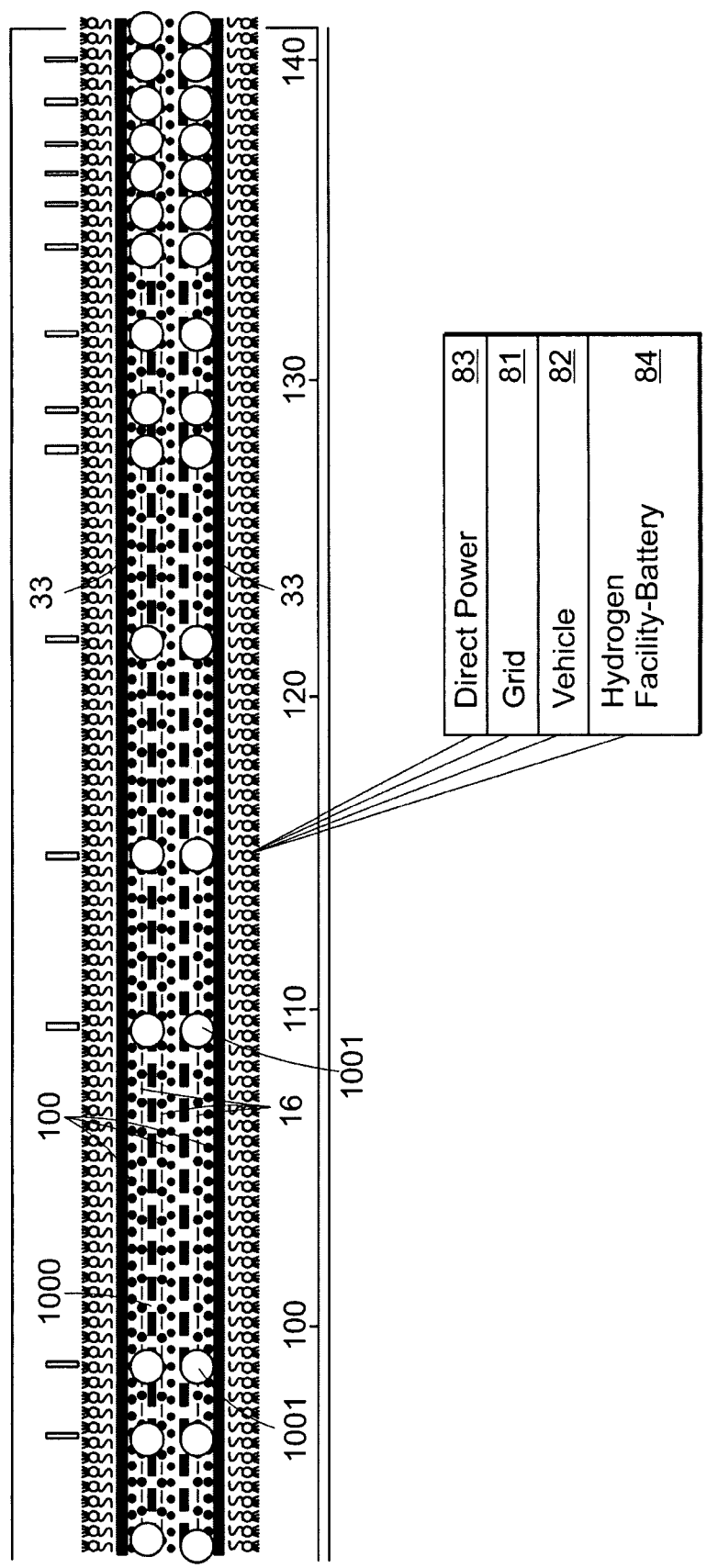
FIG. 32 further illustrates the implementation of a roadway system across the entirety of a major roadway for the example of the Massachusetts Turnpike by the present invention.

FIGS. 30 to 32 illustrate the implementation of the system across the entirety of a major roadway, herein being the Massachusetts Turnpike by way of example and not limitation. In each of these Figures, a service area is shown as dot (Item 1001). Battery arrays which although represented in the Figure in a contiguous manner due to spacing issues are actually (i.e., in the roadway system) spaced apart in implementation and are represented as solid black areas (Item 33). Roadway fixed solar and wind systems, in which the technologies may be utilized within the same implementation sheet, panel or turbine or utilized as separate technologies with wind turbine generators shown as dash-dotted areas (Item 16) and solar arrays shown as dotted areas (Item 100) and roadway lanes shown as dashed areas. FIGS. 30 and 31 show the first about 90 miles of the Massachusetts Turnpike with mile markers indicated at each 10 mile increment.

FIG. 32 represents the distribution of gathered power fed through the inverters and registered in meters to the various end distribution points including direct powering of businesses (Item 83), powering being sold back to the grid system (Item 81), power being utilized by vehicles (Item 82) or stored as excess generated energy in the form of auxiliary battery arrays or via the conversion to hydrogen by electrolysis and the subsequent storage of compressed hydrogen in tanks to be sold back to the utility at times of peak need or value (Item 84). Vehicles outfitted with portable solar and wind gathering systems contemplated by this system travel along this roadway and utilize the service areas and toll booths to install, maintain and in some cases receive credit for energy gathered by the system installed upon the vehicle (Item 1000).

Figure 33:
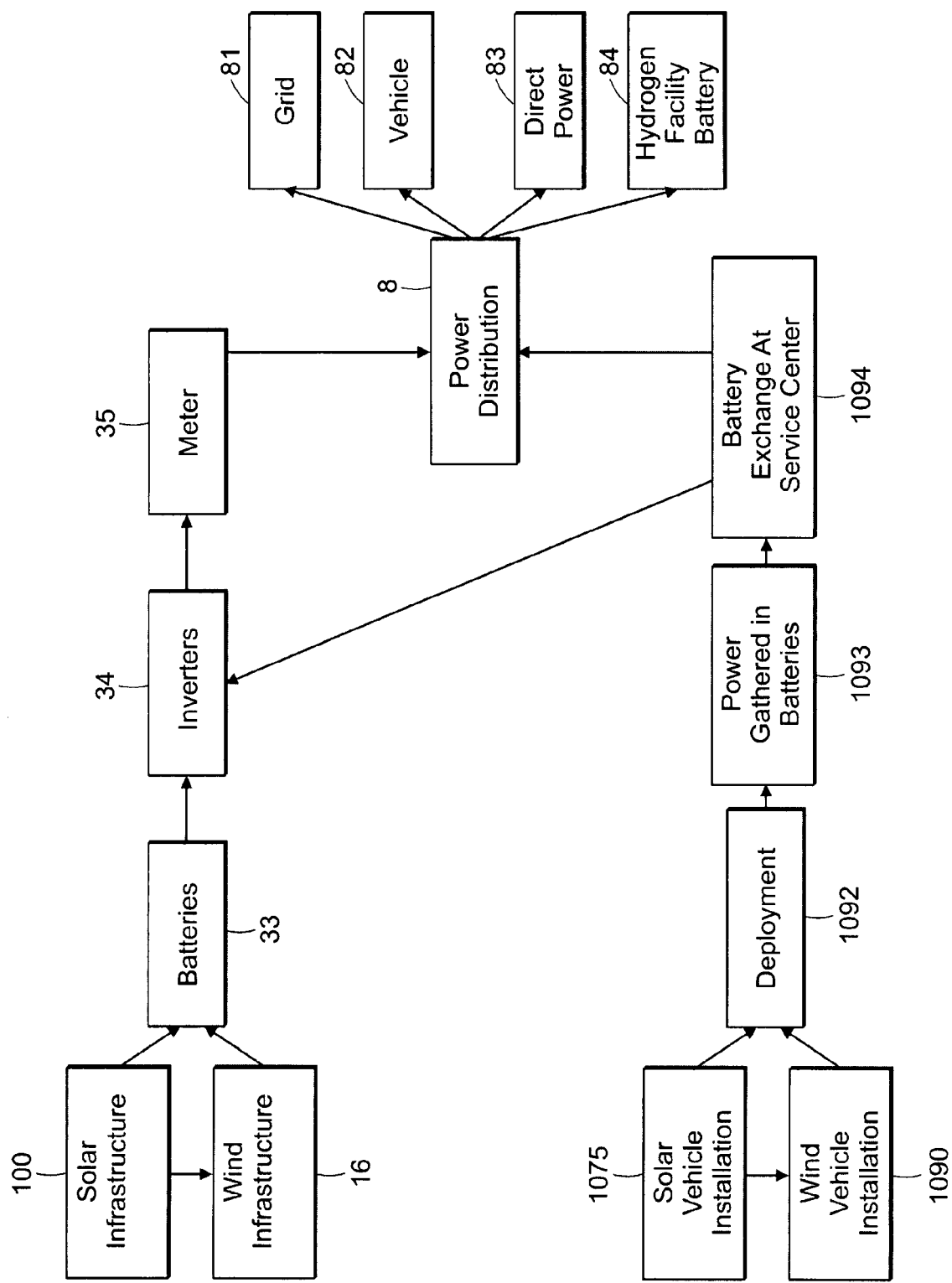
FIG. 33 illustrates the flow chart of the full integration of the wind and solar energy gathering roadway system by the present invention.

FIG. 33 illustrates the flow chart of a full integration of the wind and solar energy gathering roadway system. This flow chart features both solar and wind gathering fixed and portable systems (Items 100, 16, 1075 and 1090) integrated into the flow chart with the portable vehicle system flow of energy generated by both wind and solar installation sheets into the portable vehicle system. Or solar energy may be used to power the wind energy installation and create a uniform, wind energy only, power source flowing into the battery or battery array (Items 33 and 1093). The one or more vehicles are deployed (Item 1092), registered within the system with the installation sheets installed and activated to capture and store energy in the batteries (Item 1093). Power is then gathered in the batteries and stored as electricity. The batteries may feed the instant vehicle with power that is metered. Or the batteries (Item 1093) are exchanged at a service center (Item 1094) and the power gathered in the batteries is used to feed power into the grid after being sent through inverters (Item 34). Each inverter (Item 34) brings the power into the proper technical condition for the grid (Item 81) according to specifications provided by the grid operator, or to power another vehicle (Item 82), direct power a business or home (Item 83) or to have the energy stored in a reserve power form such as batteries. Other reserve power forms via a manufacture and storage of hydrogen by using the extra battery power to fuel the electrolysis of water to create hydrogen. Hydrogen may be stored compressed and utilized for hydrogen engines or converted back to electricity using hydrogen fuel cell technology and distributed to third parties at times when peak energy needs create premium pricing demand (Item 84).

The fixed wind and solar roadway systems illustrates a flow chart where both wind and solar energy gathering devices as described previously transfer their energy to batteries (Item 33) then to inverters (Item 34) then registering the amount of energy via the meters (Item 35) before being distributed (Item 8) to the utility grid (Item 81), vehicles (Item 82), direct distribution of homes (Item 83) and businesses or utilized as stored energy via large battery arrays or via conversion to hydrogen to be held in compressed tanks via the creation of hydrogen via electrolysis (Item 84).

Figure 34:
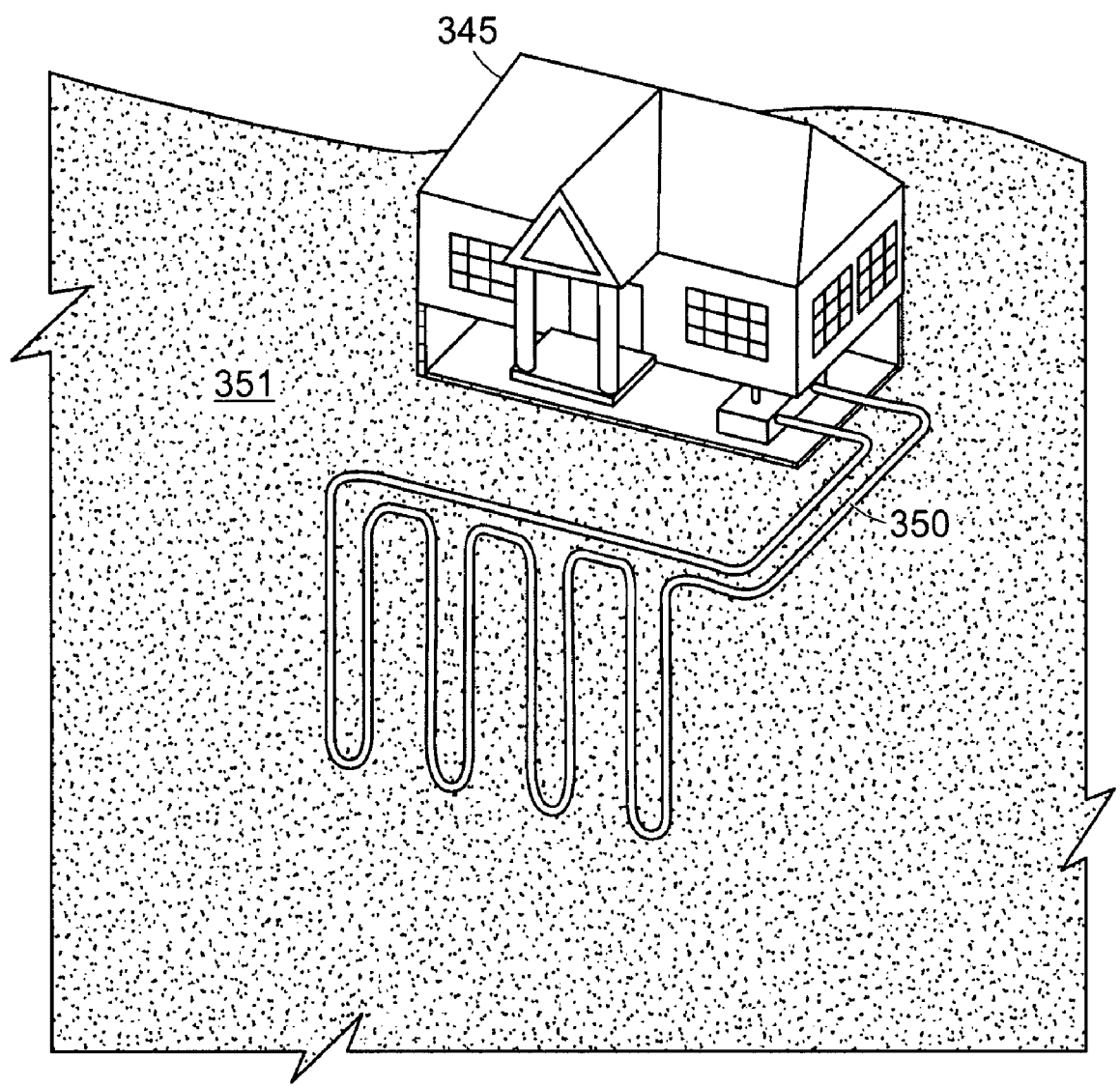
FIG. 34 is an illustration of an individual house equipped with a geothermal heating and cooling system by the present invention.

FIG. 34 illustrates an individual house (Item 345) equipped with a geothermal heating and cooling system. Typically, an owner of a house (Item 345) or business (not shown) that wants a geothermal heating and cooling system would have to invest a large sum of money to build the geothermal infrastructure. The geothermal infrastructure may include underground loops of piping (Item 350) in the riparian body (Item 351), such as ocean, rivers, lakes, streams, ponds, aquifers, or any combination thereof to act as a heat exchanger. Some riparian body may not have the proper water, soil and rock composition for efficient heat transfer between the ground loop (Item 350) and the surrounding riparian body. Water and soil properties and the thermal performance of rocks vary widely. These variations indicate the importance of an accurate estimate before any geothermal loop design can be finalized. Although the earth's temperature changes in response to weather conditions, the impact on the earth's temperature is not as pronounced at greater depths. Even if the soil content is ideal for a geothermal system, regulatory requirements may discourage and not allow such use.

Figure 35A:
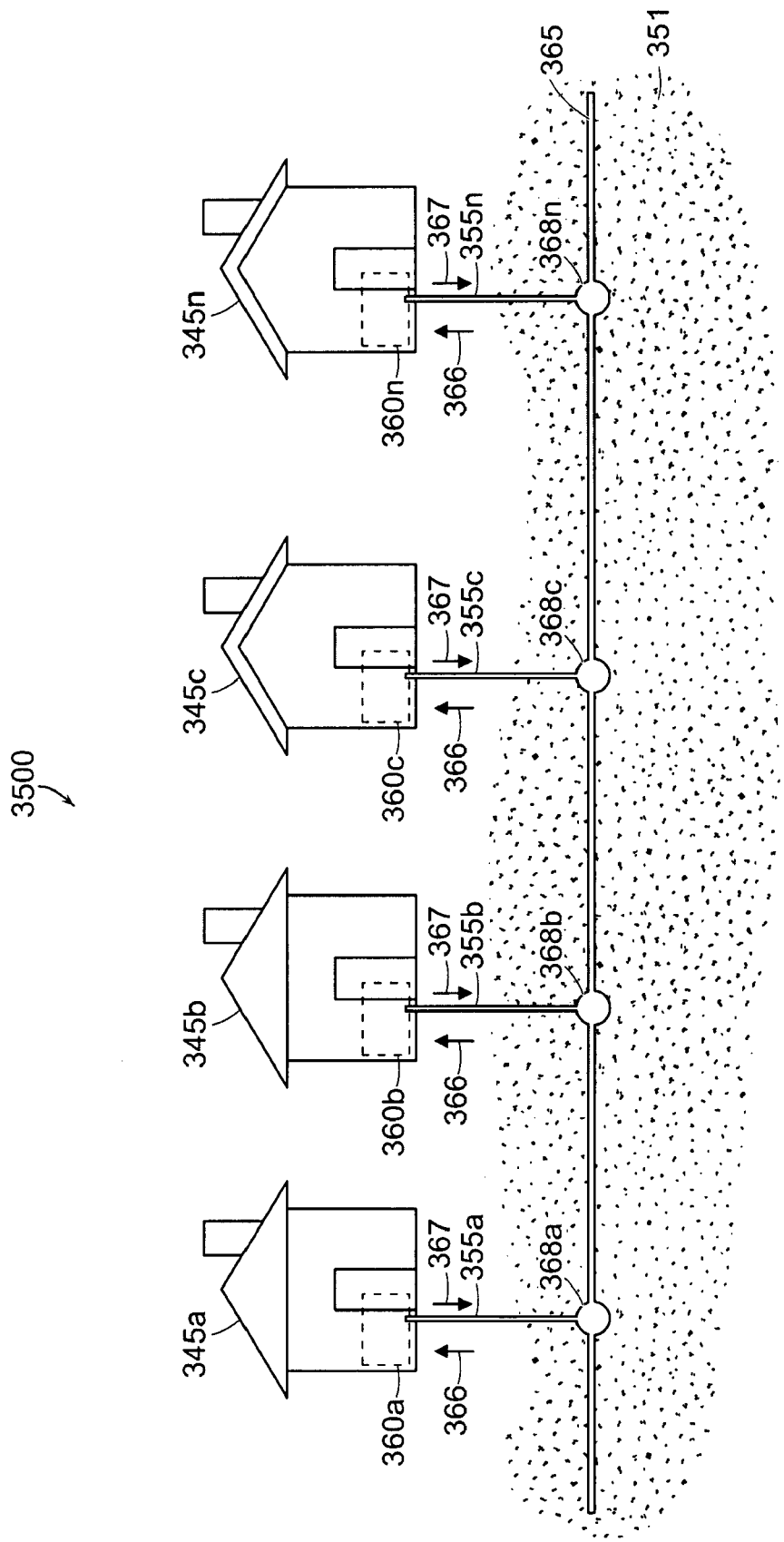
FIGS. 35A-35B are exemplary block diagrams of residential homes configured to connect to a main distribution line for providing geothermal heating and cooling system by the present invention.

FIG. 35A illustrates an exemplary geothermal roadway system (Item 3500) by the present invention. The system (Item 3500) includes residential homes (Items 345*a*, 345*b*, 345*c*, . . . , 345*n*) configured to connect to at least one main line (Item 365) to act as a heat exchanger. The main line (Item 365), at any point, is connected to one end of a distribution line (Items 355*a*, 355*b*, 355*c*, . . . , 355*n*). The main line (Item 365) may be connected to the distribution lines (Items 355*a*, 355*b*, 355*c*, . . . , 355*n*) via respective valves (Items 368*a*, 368*b*, 368*c*, . . . , 3368*n*). Each valve (Items 368*a*, 368*b*, 368*c*, . . . , 3368*n*) may regulate the flow of substances (either gases, fluidized solids, slurries, or liquids) by opening, closing, or partially obstructing various passageways. The valves (Items 368*a*, 368*b*, 368*c*, . . . , 3368*n*) may be 2-port way, 3-port way, or n-port way. The valves (Items 368*a*, 368*b*, 368*c*, . . . , 3368*n*) may also be regulating, throttling, metering, or needle valves.

The other end of the distribution line (Items 355*a*, 355*b*, 355*c*, . . . , 355*n*) is connected to a desired location, such as an energy exchanger (Items 360*a*, 360*b*, 360*c*, 360*n*) in a house (Item 345). The desired location may also be an office building or geothermal power plant. The distribution line (Items 355*a*, 355*b*, 355*c*, . . . , 355*n*) has a forward flow line (Items 366*a*, 366*b*, 366*c*, . . . , 366*n*) and a return flow line (Items 367*a*, 367*b*, 367*c*, . . . , 367*n*) for circulating a loop fluid (not shown) to homes (Items 345*a*, 345*b*, 345*c*, . . . , 345*n*). The forward flow line (Items 366*a*, 366*b*, 366*c*, . . . , 366*n*) takes fluid from the main flow line (Item 365) to the homes (Items 345*a*, 345*b*, 345*c*, . . . , 345*n*) via distribution lines (Items 355*a*, 355*b*, 355*c*, . . . , 355*n*). The return flow line (Items 367a, 367b, 367c, . . . , 367n) takes fluid exiting the homes (Items 345a, 345b, 345c, . . . , 345n) via distribution lines (Items 355a, 355b, 355c, . . . , 355n) and re-circulates it into the main flow line (Item 365).

The internal inflow and external outflow hookups to the system (Item 3500) may be a single pipe (Items 355a, 355b, 355c, . . . , 355n) or tube or may be a grid like structure of pipes and/or tubes depending on the configuration. Fluid is forced through the system (Item 3500) using both gravity configurations wherever possible as well as an energy exchanger system (Items 360a, 360b, 360c, . . . , 360n) to force the fluid to circulate throughout the external infrastructure as well as the infrastructure inside the home (Items 345a, 345b, 345c, . . . , 345n) or business. The infrastructure outside the home may be dug, tunneled or snaked and piping laid in various configurations along, under and/or adjacent to a riparian body (Item 351). Some main flow lines (Item 365), headers (not shown) and distribution lines (Items 355a, 355b, 355c, . . . , 355n) that are submerged in the riparian body (Item 351) may be anchored to docks (not shown) or piers (not shown) at or near the bottom. The main flow line (Item 365) may be made of steel, polyethylene, polybutylene, or any combination thereof.

A good loop fluid is vital to the operation of a geothermal energy exchanger (Items 360a, 360b, 360c, . . . , 360n), such as a heat pump. Typical loop fluids may be a corrosion-inhibited antifreeze solution with a freezing point of 10 degrees or more below the minimum expected temperature. The antifreeze solutions are biodegradable, non-toxic, non-corrosive and have properties that will minimize pumping power needed. Some examples of loop fluids are glycols and alcohol and water mixtures. Glycols, specifically ethylene or propylene, are relatively safe and generally non-corrosive, have fair heat transfer and medium cost. Alcohol and water mixtures, including methyl (methanol), isopropyl or ethyl (ethanol), are relatively non-corrosive, have fair heat transfer and medium cost. Ordinary water can be used in warmer climates where the ground temperature stays warm and the heat pump's heat exchanger refrigerant temperature does not drop below freezing.

The main line (Item 365) may be buried to a sufficient depth within a riparian body (Item 351) for converting the loop fluid from a first phase to a second phase. For example, the first and second phases of the loop fluid may be in a gas, liquid, or steam phase. The geothermal piping or tubing (Item 365) is laid usually at least 4-5 feet below the riparian's surface, which may vary depending on specific geologic and topographic conditions, to the area that is clearly below the permafrost/frost level. At such depths, one may take advantage of subterranean level conditions of a fairly constant 55 degree Fahrenheit temperature range. In particular, the loop fluid from the geothermal infrastructure can be warmed or cooled based upon the incoming condition of the fluid then warmed or cooled via the buried infrastructure and re-circulated through connected homes (Items 345a, 345b, 345c, . . . , 345n), businesses (not shown) or municipal structures (not shown). The buried system infrastructure (Item 365) may run for less than a mile or for more than a thousand miles allowing for multiple homes (Items 345a, 345b, 345c, . . . , 345n) and businesses to connect to the geothermal roadway system (Item 3500). The system (Item 3500) built along the riparian body (Item 351), may eventually be used to reduce the fossil fuel power demands of millions of homes, municipal structures and businesses. The main flow line (Item 365) may be buried vertically, horizontally, or any combination thereof. The main flow line (Item 365) may be in the form of a spiraling or spiral shaped coil.

Rates for use of the system may include an installation fee and usage fees based upon the size and usage parameters of the residential (Items 345a, 345b, 345c, . . . , 345n), commercial (not shown) or industrial system (not shown) user. Specific equipment may be used to gauge the volume of usage by specific customers measuring inflow and outflow volume as well as pump usage depending on how the pumps (Items 360a, 360b, 360c, . . . , 360n) for the system (Item 3500) are configured.

Pumps (Items 360a, 360b, 360c, . . . , 360n) may be operated by the system infrastructure to pump fluid for the underground infrastructure as well as, in some cases, the internal customer infrastructure. Pumps (Items 360a, 360b, 360c, . . . , 360n) may be powered by grid energy or may be powered by alternative energy sources directly as described above. Additional billing to customers may be initiated by the geothermal system based upon the powering of the pumps (Items 360a, 360b, 360c, . . . , 360n) from grid based or alternative energy direct powering sources.

Pressure pumps (Items 369a, 369b, 369c, . . . , 369e) may be coupled to the main flow line (Item 365) to move fluid above the riparian level (Item 351) and/or re-circulate the fluid in the main flow line (Item 365). The pumps (Items 369a, 369b, 369c, 369e) are selected for processes not only to raise and transfer fluids, but also to meet other criteria such as constant flow rate or constant pressure. Pumps (Items 369a, 369b, 369c, . . . , 369e) may be dynamic pumps and positive displacement pumps. The dynamic pumps may be centrifugal or axial pumps. Positive displacement pumps may be reciprocating, metering, and rotary pumps.

In FIG. 35A, the energy exchangers (Items 360a, 360b, 360c, . . . , 360n) are placed inside the homes (Items 345a, 345b, 345c, . . . , 345n), however, a plurality of energy exchangers (Items 360a, 360b, 360c, . . . , 360n) may be installed in a riparian body (Item 351) or along the main flow line (Item 365) of the geothermal roadway system (Item 3500). The plurality of energy exchangers (Items 360a, 360b, 360c, . . . , 360n) may form a riparian network of geothermal energy, wherein each of substantially all of the plurality of energy exchangers (Items 360a, 360b, 360c, . . . , 360n) is electrically connected to the roadway system electricity grid and positioned on part of one of the roads or near to the one or more roads.

Figure 35B:
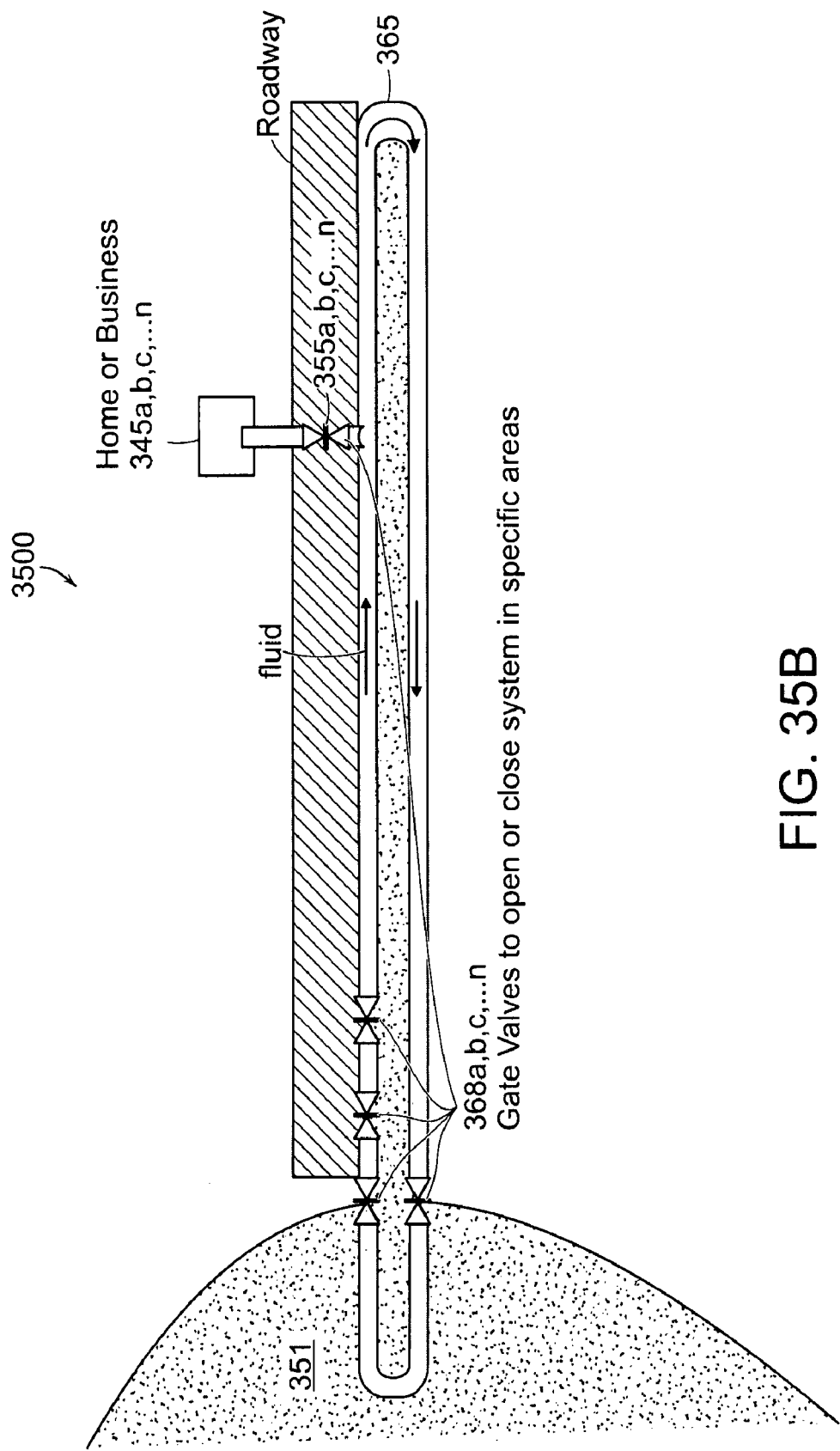

FIG. 35B illustrates another exemplary geothermal roadway system (Item 3500) by the present invention. Part of the main flow line (Item 365) may be buried deep into the earthly body along the roadway and the other part may be submerged in the riparian body (Item 351). Gate valves (Item 368) are utilized to open and/or close the system (Item 3500) in specific areas along the roadway and/or edge of the riparian body (Item 351) as illustrated in FIG. 35B.

Figure 36:
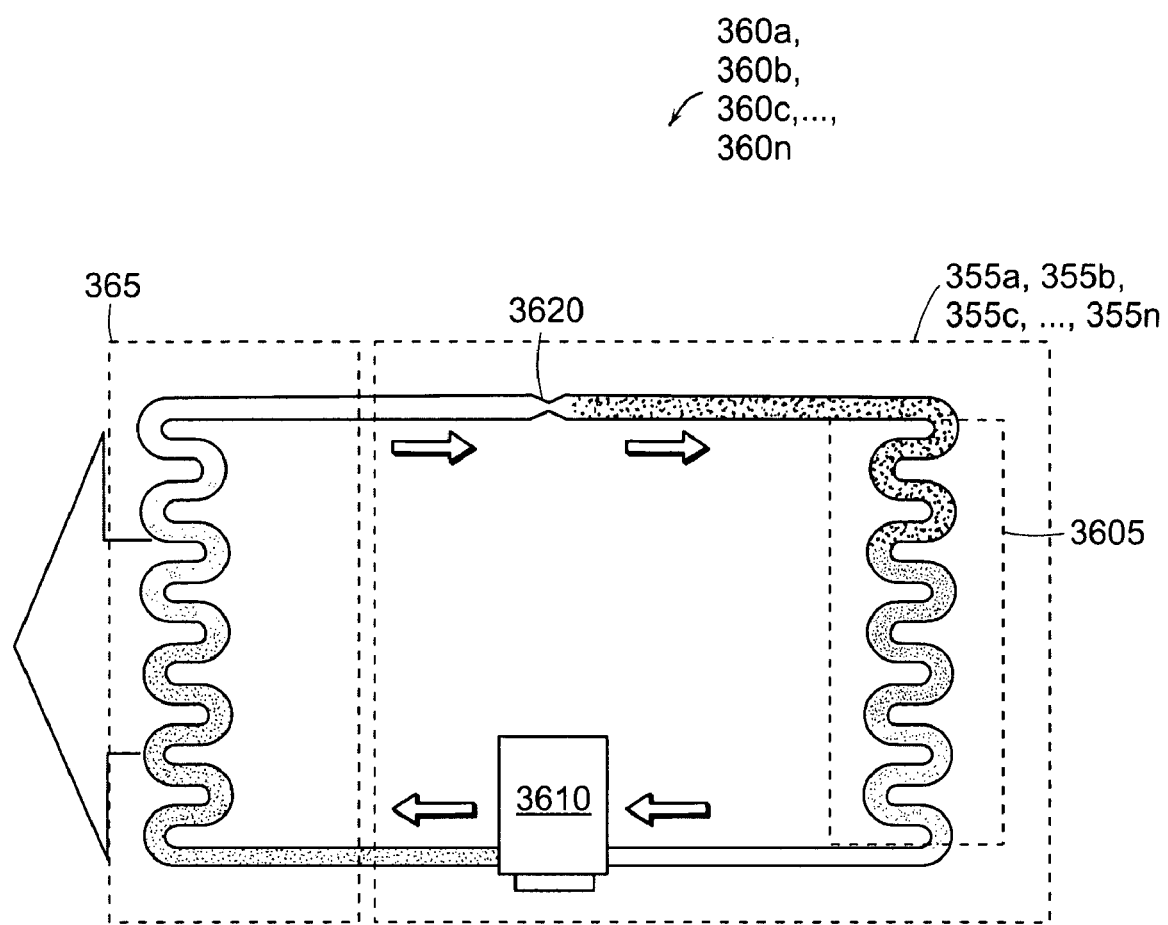
FIG. 36 is a schematic view of a heat pump by the present invention.

FIG. 36 illustrates a schematic of one type of energy exchanger (Items 360a, 360b, 360c, . . . , 360n), a heat pump in an exemplary embodiment. A heat pump (Items 360a, 360b, 360c, . . . , 360n) is similar to a refrigerator. Instead of producing heat like a conventional furnace, the heat pump (Items 360a, 360b, 360c, . . . , 360n) moves heat from one place to another, from the ground to the homes (Items 345a, 345b, 345c, . . . , 345n). During the summer, the cool liquid refrigerant enters the indoor coil (Item 3605) during cooling. As it enters the coil (Item 3605), the temperature of the refrigerant may be between 40 and 50 degrees Fahrenheit. As warm, moist air passes over the cool coil, the refrigerant inside absorbs the heat. The produced new cooler drier air is circulated back into the room with a blower fan (not shown).

The refrigerant moves into the compressor (Item 3610), which is a pump that raises the pressure so the refrigerant will move through the system. The increased pressure from the compressor (Item 3610) causes the refrigerant to heat to roughly 120 to 140 degrees Fahrenheit. This generates hot vapor. The hot vapor now moves into contact with the condenser coil (Item 365) (the underground loops), where the refrigerant gives up its heat to the cooler ground loop, and as a result condenses back into liquid.

As the refrigerant leaves the compressor (Item 3610), it is still under high pressure. It reaches the expansion valve (Item 3620), where the pressure is reduced. The cycle is complete as the cool liquid refrigerant re-enters the evaporator (Item 3605) to pick up room heat.

During the cold weather, the reversing valve (Item 3620) switches the indoor coil (Item 3605) to function as the condenser, and the underground piping (Item 365) acts as the evaporator.

According to the present invention, applicants combine the geothermal roadway system of FIGS. 35A-35B, 36, and 39 with the comprehensive clean energy power gathering roadway system of FIGS. 28-33 as follows.

Figure 37:
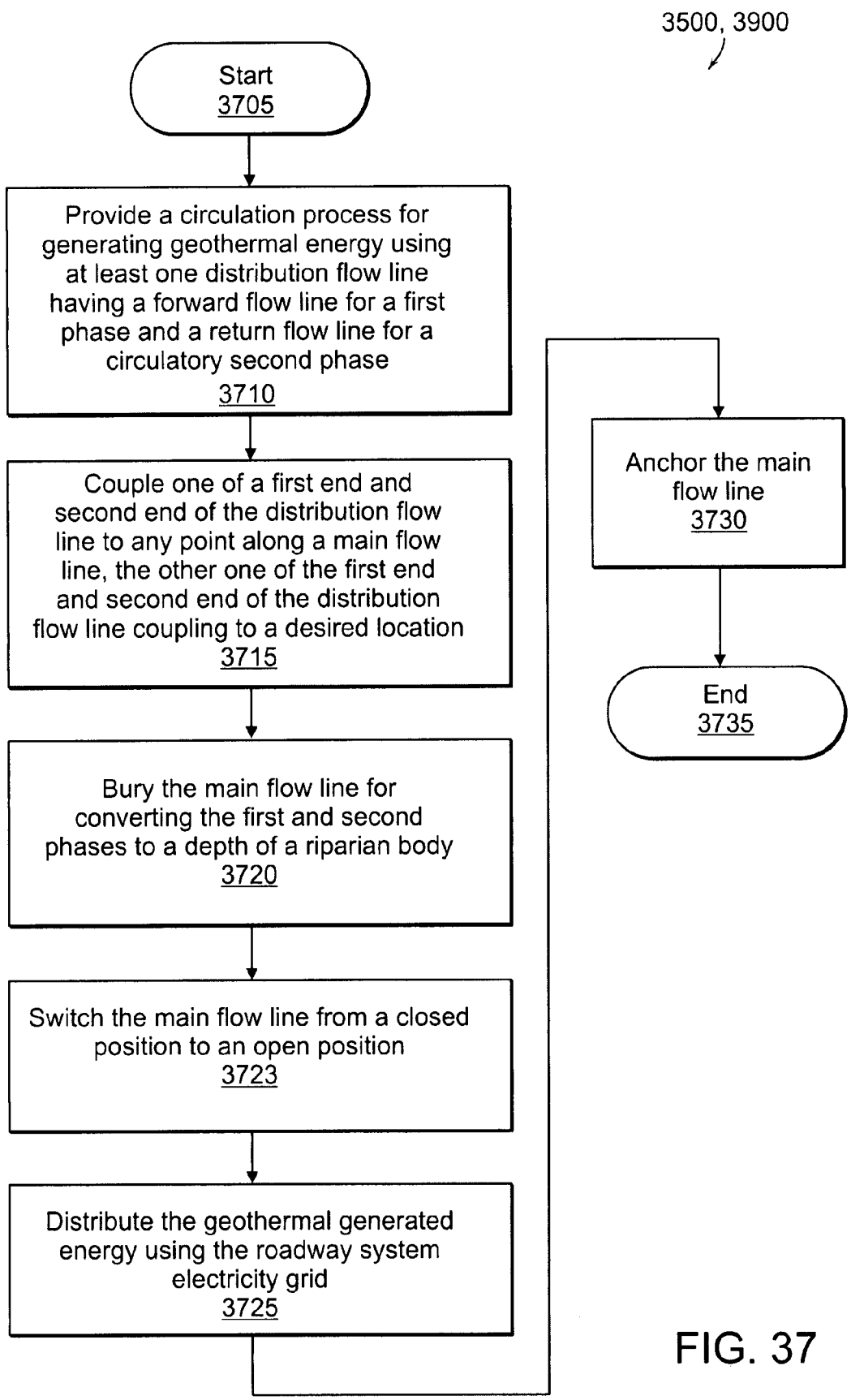
FIG. 37 is an exemplary flow diagram of a roadway system for geothermal generation and distribution system performed in accordance with an embodiment of the present invention.

FIG. 37 is an exemplary flow diagram (Item 3500, 3900) of a roadway system for geothermal generation and distribution system (Item 3500, 3900) performed in accordance with one embodiment of the present invention. The roadway system for geothermal generation and distribution system (Item 3500, 3900) starts at 3705 and provides a circulation process for generating geothermal energy using at least one distribution flow line (Items 355a, 355b, 355c, . . . , 355n) having a forward flow line (Items 366a, 366b, 366c, . . . , 366n) for a first phase and a return flow line (Items 367a, 367b, 367c, . . . , 367n) for a circulatory second phase (at 3710). The circulation process may be set in motion by means of at least one energy exchanger (Items 360a, 360b, 360c, . . . , 360n), such as a heat pump. One of a first end and a second end of the at least one distribution flow line (Items 355a, 355b, 355c, . . . , 355n) is configured to couple to any point along a main flow line (Item 365). The other one of the first end and second end of the at least one distribution flow line (Items 355a, 355b, 355c, . . . , 355n) is configured to couple to a desired location (at 3715). The desired location may be a home (Items 345a, 345b, 345c, . . . , 345n), office building, geothermal power plant, or at least one energy exchanger (Items 360a, 360b, 360c, . . . , 360n). The energy exchangers (Items 360a, 360b, 360c, . . . , 360n) may be a heat pump.

In FIG. 37, the main flow line (Item 365) may then be configured to be buried to a sufficient depth within a riparian body (Item 351) for converting the first and second phases (at 3720). The main flow line (Item 365) may be buried deep enough within the riparian body (Item 351) to sufficiently cause the first and second phases to convert the liquid in the main flow line (Item 365) to a gas, liquid, or steam phase. The main flow line (Item 365) may be installed in a vertical, horizontal, or any combination thereof within the riparian body (Item 351).

The geothermal generation and distribution system (Item 3500) may switch the main flow line (Item 365) from a closed position to an open position (at 3723). In the open position, the main flow line (Item 365) receives a fluid at one end of the main flow line (Item 365) and circulates the fluid through the main flow line (Item 365) and the at least one distribution flow line (Items 355a, 355b, 355c, . . . , 355n). The fluid exits at another end of the main flow line (Item 365). In the closed position, the main flow line (Item 365) re-circulates the fluid through the main flow line (Item 365) and the at least one distribution flow line (Items 355a, 355b, 355c, . . . , 355n).

The system (Item 3500) may distribute the geothermal generated energy using the roadway system electricity grid (at 3725). A plurality of energy exchangers (Items 360a, 360b, 360c, . . . , 360n), along one or more roads, form a network of geothermal energy for distribution. Each, or substantially all, of the plurality of energy exchangers (Items 360a, 360b, 360c, . . . , 360n) is electrically connected to the roadway system electricity grid and positioned on part of one of the roads or near to the one or more roads.

Before ending at 3735, the main flow line (Item 365) may be securely anchored to the bottom of the riparian body, docks, or piers or similar structure (at 3730).

Figure 38:
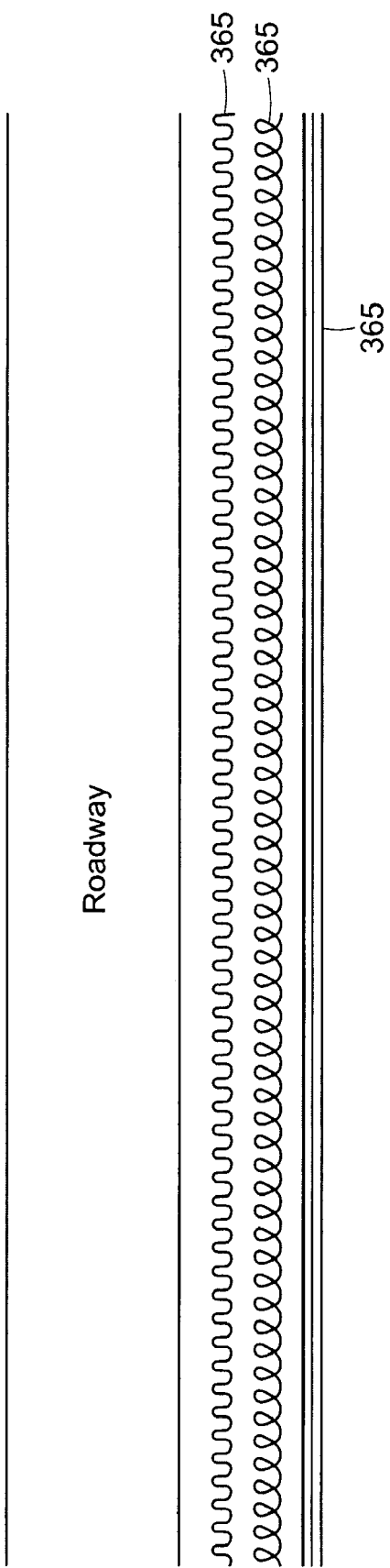
FIG. 38 illustrates various shapes of an exemplary main flow line by the present invention.

In FIG. 38, the main flow line (Item 365) may be in the shape of a coil, spiral, straight or any combination thereof configuration.

Figure 39:
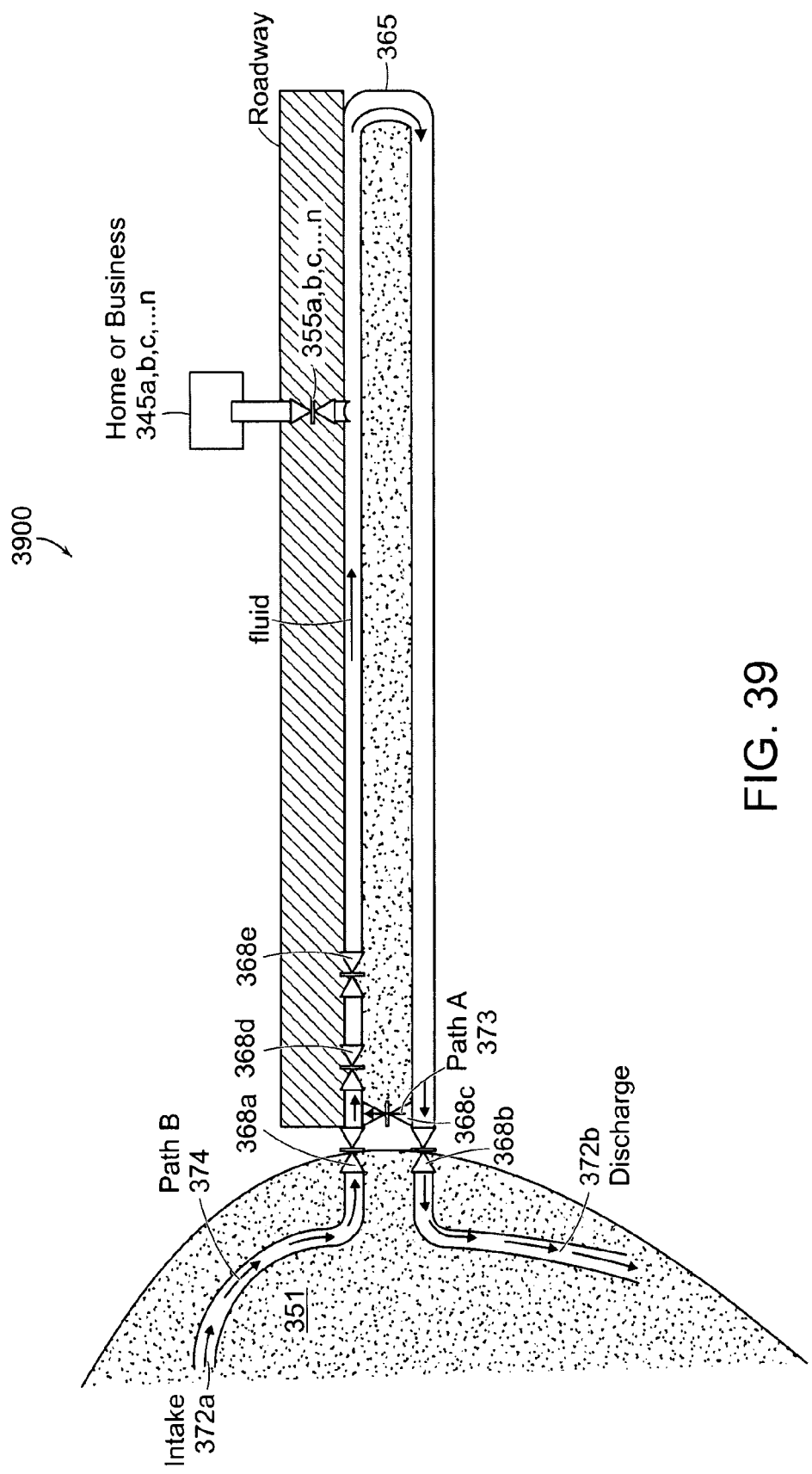
FIG. 39 is an exemplary block diagram of an open loop with an optional closed loop riparian geothermal infrastructure by the present invention.

FIG. 39 is an exemplary block diagram of an open loop with an optional closed loop riparian geothermal infrastructure (Item 3900) by the present invention. The system (Item 3900) operates similarly to the system (Item 3500) described above in FIGS. 35A-35B but the system (Item 3900) of FIG. 39 has the ability to switch from an open loop to a close loop position or vice-versa. The main line (Item 365), at any point, is connected to one end of a distribution line (Items 355a, 355b, 355c, . . . , 355n). The main line (Item 365) may be connected to the distribution lines (Items 355a, 355b, 355c, . . . , 355n) via respective valves (Items 368a, 368b, 368c, . . . , 3368n). The positioning (e.g., open and close) of the valves (Items 368a, 368b, 368c, . . . , 3368n) switches the system (3900) from an open loop to a closed loop position. The opening and closing positions of the valves (Items 368a, 368b, 368c, . . . , 3368n) may cause the fluid in the main line (Item 365) to circulate via either Path A (Item 373) or Path B (Item 374). For example, if valve 368a and 368b are closed and valve 368c is open, the substance circulates via Path A (Item 373). The system (3900) is then considered to be in a closed loop position, thus the substance re-circulates through the continuous main line (Item 365).

Conversely, the system (Item 3900) is in an open loop position when valve (Item 368c) is in a closed position and valves (Items 368a and 368b) are in an open position. In the open loop, the substance is drawn from an intake (Item 372a) of the main line (Item 365), passes through the plurality of energy exchangers (FIG. 35A, Items 360a, 360b, 360c, . . . , 360n), and is discharged to another end (Item 372b) of the main line (Item 365) at a distance from the intake (Item 372a). It will be understood by those skilled in the art that there are many other positioning of the valves (Items 368a, 368b, 368c, . . . , 368n) for switching the system (3900) from an open position to a closed position or vice versa. It should be further understood that one skilled in the art will understand that there are many mechanisms for closing and opening the valves (Items 368a, 368b, 368c, . . . , 368n). For example, a technician may use a wrench to physically turn the valves (Items 368a, 368b, 368c, . . . , 368n) to make it close or open. Another example, is the technician may control the valves (Items 368a, 368b, 368c, . . . , 368n) remotely by using an actuator or button at a service center (not shown) to electrically turn the valves (Items 368a, 368b, 368c, . . . , 368n). Furthermore, the technician may use a handheld wireless device to send a command signal to cause the valves (Items 368a, 368b, 368c, . . . , 368n) to open or close.

There are many benefits of having a system (3900) with the ability to be in the open or closed position. For example, during the winter time, the riparian body (Item 351) may freeze due to cold temperature. In such a situation, the system (Item 3900) may operate in a closed position. Therefore, the system (Item 3900) may continue to provide geothermal energy regardless of the season or weather condition.

In the closed position, the technician may add different types of solution to obtain a good loop fluid, such as softening, hardening or non corrosive solution. Moreover, the technician may replace or mix the riparian fluid with another fluid, such as an antifreeze solution that is biodegradable, non-toxic, and non-corrosive, by draining the main line (Item 365).

FIG. 40 illustrates an example roadway system (Item 4000) for solar and wind energy generation and distribution tied in with the geothermal energy infrastructure (3500, 3900). The roadway system (Item 4000) utilizing solar energy gathering devices is disclosed in U.S. patent application Ser. No. 11/624,987, entitled "System and Method for Creating a Networked Infrastructure Distribution Platform of Solar Energy Gathering Devices", by Gene S. Fein and Edward Merritt, which is incorporated herein by reference. The roadway system (Item 4000) utilizing wind energy gather devices is disclosed in U.S. patent application Ser. No. 11/739,934, entitled "Stratum Deployment of Wind Turbines", by Gene S. Fein and Edward Merritt, which is incorporated herein by reference.

Continuing with FIG. 40, the energy exchangers (Items 360*a*, 360*b*, 360*c*, . . . , 360*n*) (e.g., heat pumps) and pressure pumps (Items 369*a*, 369*b*, 369*c*, . . . , 369*e*) are tied into the roadway system (Item 4000). The energy exchangers (Items 360*a*, 360*b*, 360*c*, . . . , 360*n*) and pressure pumps (Items 369*a*, 369*b*, 369*c*, . . . , 369*e*) may not utilize electrical energy from traditional power plant. Instead the energy exchangers (Items 360*a*, 360*b*, 360*c*, . . . , 360*n*) and pressure pumps (Items 369*a*, 369*b*, 369*c*, . . . , 369*e*) may be powered by the roadway system electricity grid (Item 3510) utilizing solar and wind energy harnessing devices.

A plurality of energy harnessing devices, such as solar panels (Item 100) of FIG. 12 and/or roadway lines painted with photovoltaic paint (Item 105) of FIG. 12 form at least one solar strip array (Items 3505*a* . . . 3505*f*, generally Item 3505) and a plurality of wind turbines (Items 3506*a*, 3506*b*, . . . , 3506*n*, generally Item 3506). The at least one solar strip array (Item 3505) gathers or otherwise harnesses energy from the sun and generates "solar generated energy." Throughout this disclosure, the phrase solar generated energy is used interchangeably with the phrase "solar generated power." Similarly, the phrase wind generated energy is used interchangeably with the phrase "wind generated power."

The at least one solar strip array (Item 3505) and the plurality of wind turbines (Item 3506) are located or otherwise positioned on part of a road or near to one or more roads. As such, the potential installation footprint is of hundreds of thousands of miles of available roadways. Compared to solar arrays affixed to roof tops of buildings, such as a home, or solar arrays located in remote areas, such as a desert, positioning the at least one solar strip array (Item 3505) on part of a road or near to one or more of roads allows for easier access for maintenance crews. Furthermore, there is greater access to a utility grid and additional direct powering opportunities to homes and businesses.

Additionally, by locating or otherwise positioning the at least one solar strip array (Item 3505) and the plurality of wind turbines (Item 3506) on part of a road or near to one or more roads to generate solar and wind generated energy, it may be said that a roadway network or system of solar and wind generated energy is formed.

In some embodiments, the at least one solar strip array (Item 3505) and the plurality of wind turbines (Item 3506) may be positioning on part of a road or near to one or more of roads in such a manner which maximizes the amount of energy from the sun and wind which may be gathered and thus generated into solar and wind energy. For example, roads running latitudinally (i.e., east to west and west to east) are able to "track" the sun as the sun "moves" across the sky. In another example, roads running longitudinally (i.e., north to south and south to north) are able to gather energy from the sun along a line of longitude.

Continuing with FIG. 40, the at least one solar strip array (Item 3505) (e.g. 3505*a*, 3505*b*, and 3505*c*) and the plurality of wind turbines (Item 3506) (e.g., Items 3506*a*, 3506*b*, . . . , 3506*n*) are electrically connected, in parallel, to the roadway system electricity grid (Item 3510) by a power line (Item 3515). Alternatively, the at least one solar strip array (Item 3505) (e.g. 3505*d*, 3505*e*, and 3505*f*) and the plurality of wind turbines (Item 3506) (e.g., Items 3506*a*, 3506*b*, . . . , 3506*n*) are electrically connected to the roadway system electricity grid (Item 3510) by a battery pack system (Item 3520). Furthermore, the at least one solar strip array (Item 3505) and the plurality of wind turbines (Item 3506) may be electrically connected to a roadway system electricity grid (Item 3510) in such a manner as to form a parallel circuit, a series circuit or a combination parallel and series circuit.

Solar and wind generated energy are power conditioned by inverters (Items 3525*a* and 3525*b*). Electricity meters (Items 3530*a* and 3530*b*) measure an amount of solar and wind generated energy which are generated by the at least one solar strip array (Item 3505) and the plurality of wind turbines (Item 3506). As such, the roadway system electricity grid (Item 3510) measures an amount of conditioned solar and wind generated energy provided by the at least one solar strip array (Item 3505) and the plurality of wind turbines (Item 3506).

Solar generated energy generated by the at least one solar strip array (Item 3505) and the plurality of wind turbines (Item 3506) (e.g., Items 3506*a*, 3506*b*, . . . , 3506*n*); and provided to the roadway system electricity grid (Item 3510), are distributed by the roadway system electricity grid (Item 3510) through distribution points (Items 3535*a* . . . 3535*f*, generally Item 3535). The distribution points (Item 3535) are configured to distribute solar and wind generated energy to, for example, a utility grid (e.g., Item 81 of FIG. 12), a vehicle (e.g., Item 82 of FIG. 12), directly to a business or a home (e.g., Item 83 of FIG. 12), a hydrogen electrolysis and storage facility or a battery storage facility (e.g., Item 84 of FIG. 12), energy exchangers (e.g., Items 360*a*, 360*b*, 360*c*, . . . , 360*n*), or pressure pumps (e.g., Items 369*a*, 369*b*, 369*c*, . . . , 369*e*). As such, the roadway system electricity grid (Item 3510) is configured for mass distribution of electricity.

In contrast, a solar array located on a building (e.g., the rooftop of a house) or located on private land (e.g., a field abutting farm land) is configured to provide solar generated energy for private consumption. That is, it is the intention an entity, such as homeowner or a farmer to use such a solar array to produce solar generated energy for the entity's own use. For example, a homeowner installs solar panels onto the homeowner's house to reduce the cost of providing energy to the house. In another example, a farmer installs solar panels in a field to provide power for a well pump to irrigate an isolated parcel of farmland, which has no access to utilities.

Consequently, with such located solar arrays there is neither a need nor desire to distribute the solar generated energy to others, i.e., to mass distribute the solar generated energy. Moreover, with such located solar arrays there is neither a need nor desire for a roadway system electricity grid configured to mass distribute the solar generated energy, which is in stark contrast with the roadway system electricity grid (Item 3510) of the present invention.

Electricity meters (Items 3540*a* ... 3540*g*, generally 3540) measure an amount of solar and wind generated energy distributed to, for example, a direct power user, such as a home. As such, the roadway system electricity grid (Item 3510) measures an amount of conditioned solar and wind generated energy provided by the roadway system electricity grid (Item 3510).

The roadway system electricity grid (Item 3510) may include, for example, a battery backup (Item 3545) to store solar and wind generated energy in an event the roadway system electricity grid (Item 3510) fails or is otherwise inoperable. In this way, solar and wind generated energy generated by the at least one solar strip array (Item 3505) and the plurality of wind turbines (Item 3506), respectively, can be stored without substantial loss despite an inability to distribute such generated energy. The solar and wind generated energy stored by the battery backup (Item 3545) may then be distributed once the roadway system electricity grid (Item 3510) are operable.

The roadway system electricity grid (Item 3510) may also include, for example, a switch (Item 3550) to pass, in an automated manner, solar and wind generated energy from a first solar strip array to a second solar strip array or wind turbine (Item 3506) are based on use or distribution demand. For example, solar generated energy generated by a first solar strip array (e.g., Item 3505*a*) may be distributed by the roadway system electricity grid (Item 3510) to a direct power load or user, such as a business or home. The amount of solar and wind generated energy distributed to the direct power load may be insufficient to meet the present demands of the direct power load, e.g., an increase use of air conditioning. The roadway system electricity grid (Item 3510), sensing the increase demand from the direct power load, passes or reroutes solar energy generated by a second solar strip array (e.g., Item 3505*d*) to add or otherwise augment energy already being distributed to the direct power load. In this way, the roadway system electricity grid (Item 3510) is responsive to distribution demands.

Alternatively, the roadway system electricity grid (Item 3510) may be programmed to distribute solar and wind generated energy according to a projected or otherwise anticipated distribution demand. For example, during business hours, a demand for solar and wind generated energy by businesses is higher than a demand for solar and wind generated energy by homes. During non-business hours or weekends, however, the demand by homes is higher than the demand by businesses. As such, the roadway system electricity grid (Item 3510) may pass solar and wind generated energy from a solar strip array and wind turbines, respectively, near homes and distribute such power to businesses during business hours and vice versa during non-business hours or weekends.

The roadway system electricity grid (Item 3510) may also include, for example, an energy distribution depot (Item 3555) to store, channel and recondition solar and wind generated energy.

While this invention has been particularly shown and described with references to example embodiments thereof, it will be understood by those skilled in the art that various changes in form and details may be made therein without departing from the scope of the invention encompassed by the appended claims.

What is claimed is:

1. A roadway system for energy generation and distribution, comprising:
    a plurality of energy harnessing devices;
    a roadway system electricity grid configured for mass distribution of electricity, the roadway system electricity grid being based on a roadway system having one or more roads; and
    a plurality of energy exchangers configured to electrically connect to the roadway system electricity grid;
    wherein each of substantially all of the energy harnessing devices, is electrically connected to the roadway system electricity grid and positioned on part of one of the roads or near to one or more of the roads;
    the roadway system further including a geothermal infrastructure electrically connected to the plurality of energy exchangers, the geothermal infrastructure comprising:
    at least one distribution flow line having a forward flow line for a first phase and a return flow line for a circulatory second phase;
    one of a first end and a second end of the at least one distribution flow line configured to couple to any point along a main flow line, the other one of the first end and second end of the at least one distribution flow line configured to couple to a desired location; the main flow line configured to be buried to a depth within a riparian body for converting the first and second phases; and
    at least one anchor configured to secure the main flow line.

2. The roadway system of claim 1 wherein the geothermal infrastructure further including:
    at least one switching mechanism configured to switch the main flow line from a closed position to an open position, in the open position, the main flow line is configured to:
    receive a fluid at one end of the main flow line;
    circulate the fluid through the main flow line and the at least one distribution flow line; and
    exit the fluid at another end of the main flow line; and
    in the closed position, the main flow line is configured to re-circulate the fluid through the main flow line and the at least one distribution flow line.

3. The roadway system of claim 1 wherein the geothermal infrastructure further including:
    at least one first valve configured to regulate the flow of a fluid in the main flow line to the at least one distribution flow line; and
    at least one pressure pump configured to transfer the fluid in the main flow line, the at least one pressure pump configured to electrically connect to the roadway system electricity grid.

4. The roadway system of claim 1 wherein the depth is deep enough within the riparian body to sufficiently cause the first phase to be in a gas, liquid, or steam phase.

5. The roadway system of claim 1 wherein the depth is deep enough within the riparian body to sufficiently cause the second phase to be in a gas, liquid, or steam phase.

6. The roadway system of claim 1 wherein the plurality of energy exchangers are configured to provide circulatory flow in at least one distribution flow line.

7. The roadway system of claim 1 wherein the desired location is a home, office building, geothermal power plant, or the plurality of energy exchangers.

8. The roadway system of claim 1 wherein the plurality of energy exchangers are heat pumps, each of the plurality of heat pump includes:

at least one evaporator having a series of piping configured to connect to an air handler, the air handler configured to blow air and thereby the at least one evaporator absorbing heat from the air;

at least one condenser configured to condense the first phase to the second phase by transferring heat to cooler surrounding air, water, or earth;

at least one second valve in communications with the at least one evaporator and the at least one condenser, the at least one second valve configured to control a flow of the fluid; and at least one compressor configured to increase pressure and temperature of the fluid, thereby causing the fluid to flow.

9. The roadway system of claim 8 wherein the fluid is a refrigerant.

10. The roadway system of claim 8 wherein the fluid is from a riparian body.

11. The roadway system of claim 1 wherein the plurality of energy harnessing devices are solar energy generating devices, wind energy generating devices, or any combination thereof.

12. The roadway system of claim 1 wherein each of the one or more roads is of any type of highway; turnpike; pike; toll road; state highway; freeway; clearway; expressway; parkway; causeway; throughway; interstate; speedway; autobahn; superhighway; street; track for railroad, monorail, and magnetic levitation; track for subterranean, ground level, and elevated forms of public transit or mass transit; car race track; or airplane runway.

13. A method for generating and distributing geothermal energy, comprising:

generating energy using a plurality of energy harnessing devices, along one or more roads, the plurality of energy harnessing devices forming a roadway network of harnessed energy;

distributing the generated energy using a roadway system electricity grid, wherein each of substantially all of the energy harnessing devices is electrically connected to the roadway system electricity grid and positioned on part of one of the roads or near to the one or more roads; and connecting electrically a plurality of energy exchangers to the roadway system electricity grid; the method further including:

providing a circulation process for generating geothermal energy using at least one distribution flow line having a forward flow line for a first phase and a return flow line for a circulatory second phase;

coupling one of a first end and second end of the at least one distribution flow line to any point along a main flow line, the other one of the first end and second end of the at least one distribution flow line coupling to a desired location;

burying the main flow line for converting the first and second phases, the burying of the main flow line being to a depth of a riparian body;

distributing the geothermal generated energy; and anchoring the main flow line.

14. The method according to claim 13 further including:

switching the main flow line from a closed position to an open position, in the open position, the main flow line receiving a fluid at one end of the main flow line;

circulating the fluid through the main flow line and the at least one distribution flow line; and exiting the fluid at another end of the main flow line; and in the closed position, the main flow line re-circulating the fluid through the main flow line and the at least one distribution flow line.

15. The method of claim 13 further including:

regulating the flow of a fluid in the main flow line to the at least one distribution flow line; and transferring the fluid in the main flow line using at least one pressure pump; and connecting electrically the at least one pressure pump to the roadway system electricity grid.

16. The method of claim 13 wherein the depth is deep enough within the riparian body to sufficiently cause the first phase to be in a gas, liquid, or steam phase.

17. The method of claim 13 wherein the depth is deep enough within the riparian body to sufficiently cause the second phase to be in a gas, liquid, or steam phase.

18. The method of claim 13 wherein providing the circulation process is set in motion by at least one energy exchanger.

19. The method of claim 13 wherein providing the circulation process is set in motion by pressure.

20. The method of claim 13 wherein the desired location is a home, office building, geothermal power plant, or at least one energy exchanger.

21. The method of claim 13 wherein the at least one energy exchanger is a heat pump.

22. The method of claim 13, wherein distributing the generated energy using the roadway system electricity grid includes:

power conditioning the generated energy provided by the plurality of energy harnessing devices to the roadway system electricity grid;

measuring an amount of conditioned generated energy provided by the plurality of energy harnessing devices; and measuring an amount of the conditioned generated energy provided by the roadway system electricity grid.

23. The method of claim 13, wherein distributing the generated energy using the roadway system electricity grid includes storing the generated energy provided by the plurality of energy harnessing devices in an event the roadway system electricity grid fails.

24. The method of claim 13, wherein distributing the generated energy using the roadway system electricity grid includes electrically connecting the plurality of energy harnessing devices to the roadway system electricity grid using a battery pack system.

25. The method of claim 13, wherein distributing the generated energy using the roadway system electricity grid includes storing, channeling and reconditioning the generated energy.

26. The method of claim 13, wherein distributing the generated energy using the roadway system electricity grid includes distributing the conditioned generated power to an entity of any type of utility grid, vehicle, energy storage system, direct power user, plurality of energy exchangers, at least one pressure pump, and combinations thereof.

* * * * *